US011127189B2

(12) United States Patent
Le Floch

(10) Patent No.: US 11,127,189 B2
(45) Date of Patent: Sep. 21, 2021

(54) 3D SKELETON RECONSTRUCTION FROM IMAGES USING VOLUMIC PROBABILITY DATA

(71) Applicant: CANON KABUSHIKI KAISHA, Tokyo (JP)

(72) Inventor: Hervé Le Floch, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 16/280,854

(22) Filed: Feb. 20, 2019

(65) Prior Publication Data

US 2019/0266780 A1   Aug. 29, 2019

(30) Foreign Application Priority Data

Feb. 23, 2018  (GB) .................................... 1802950
Apr. 27, 2018  (GB) .................................... 1806949
Apr. 27, 2018  (GB) .................................... 1806951

(51) Int. Cl.
*G06T 15/04* (2011.01)
*G06T 15/08* (2011.01)

(52) U.S. Cl.
CPC .............. *G06T 15/04* (2013.01); *G06T 15/08* (2013.01)

(58) Field of Classification Search
CPC ......... G06T 15/04; G06T 15/08; G06T 7/593; G06T 2207/10012; G06T 2207/30196; G06T 7/75; G06T 13/40; G06T 17/00
See application file for complete search history.

(56) References Cited

U.S. PATENT DOCUMENTS

| 2003/0052878 A1* | 3/2003 | Han ....................... G06T 15/205 345/420 |
| 2009/0122058 A1* | 5/2009 | Tschesnok .............. G06T 7/564 345/420 |
| 2011/0080336 A1 | 4/2011 | Leyvand et al. |
| 2011/0210915 A1* | 9/2011 | Shotton .............. G06K 9/00369 345/157 |
| 2011/0267344 A1* | 11/2011 | Germann .............. G06T 15/205 345/420 |

(Continued)

FOREIGN PATENT DOCUMENTS

| CN | 104102343 A1 | 10/2014 |
| EP | 1271411 A2 | 1/2005 |
| WO | 2012/098534 A1 | 7/2012 |

*Primary Examiner* — Kee M Tung
*Assistant Examiner* — Khoa Vu
(74) *Attorney, Agent, or Firm* — Canon U.S.A., Inc. IP Division

(57) ABSTRACT

To generate 3D skeletons of a scene volume, a first approach retrieves probabilities from source images capturing the scene to detect parts of the objects, next merges the probabilities in 3D space. The merged or joint probabilities are then used to robustly detect the parts of the objects in the 3D space. This approach advantageously reduces complexity of the 3D skeleton reconstruction. In particular, at 2D level (i.e. on the source images), it avoids conflict resolutions to be performed between conflicting parts detected from different source images. It turns that real time reconstructions and subsequent displays or human motion detection are better achieved. The present approach efficiently works on complex scenes like sport events with multiple players in a stadium, with an ability to detect a wide number of inter-operating 3D objects like multiple players.

21 Claims, 26 Drawing Sheets

(56) References Cited

U.S. PATENT DOCUMENTS

| | | |
|---|---|---|
| 2011/0292036 A1 | 12/2011 | Sali et al. |
| 2012/0128208 A1* | 5/2012 | Leyvand ............ G06K 9/00342 |
| | | 382/103 |
| 2013/0028517 A1* | 1/2013 | Yoo .................... G06K 9/00375 |
| | | 382/173 |
| 2013/0243255 A1* | 9/2013 | Williams ................ G06F 3/011 |
| | | 382/103 |
| 2015/0023557 A1 | 1/2015 | Yoo et al. |
| 2017/0213320 A1 | 7/2017 | Yucer et al. |
| 2018/0211438 A1 | 7/2018 | Gonzalez Aguirre et al. |
| 2019/0171870 A1* | 6/2019 | Vajda .................... G06K 9/623 |

* cited by examiner

Elementary link weight from PAF₁ = 0.9    Elementary link weight from PAF₂ = 0.7

Weight for NC1-HC1 = 1.6

Elementary link weight from PAF₁ = 0.1    Elementary link weight from PAF₂ = 0.15

Weight for NC2-HC2 = 0.25

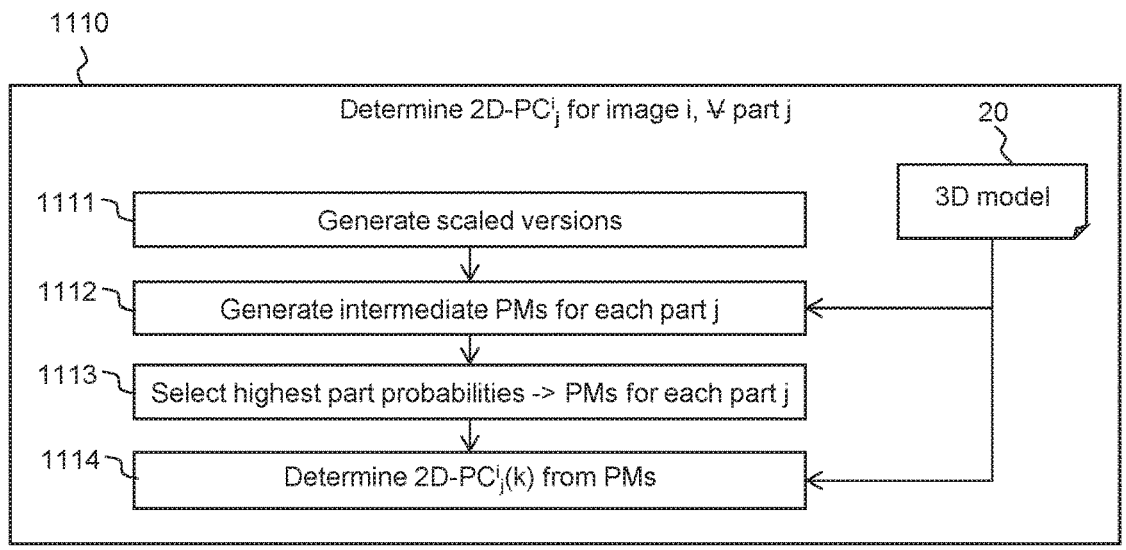
Fig. 11a
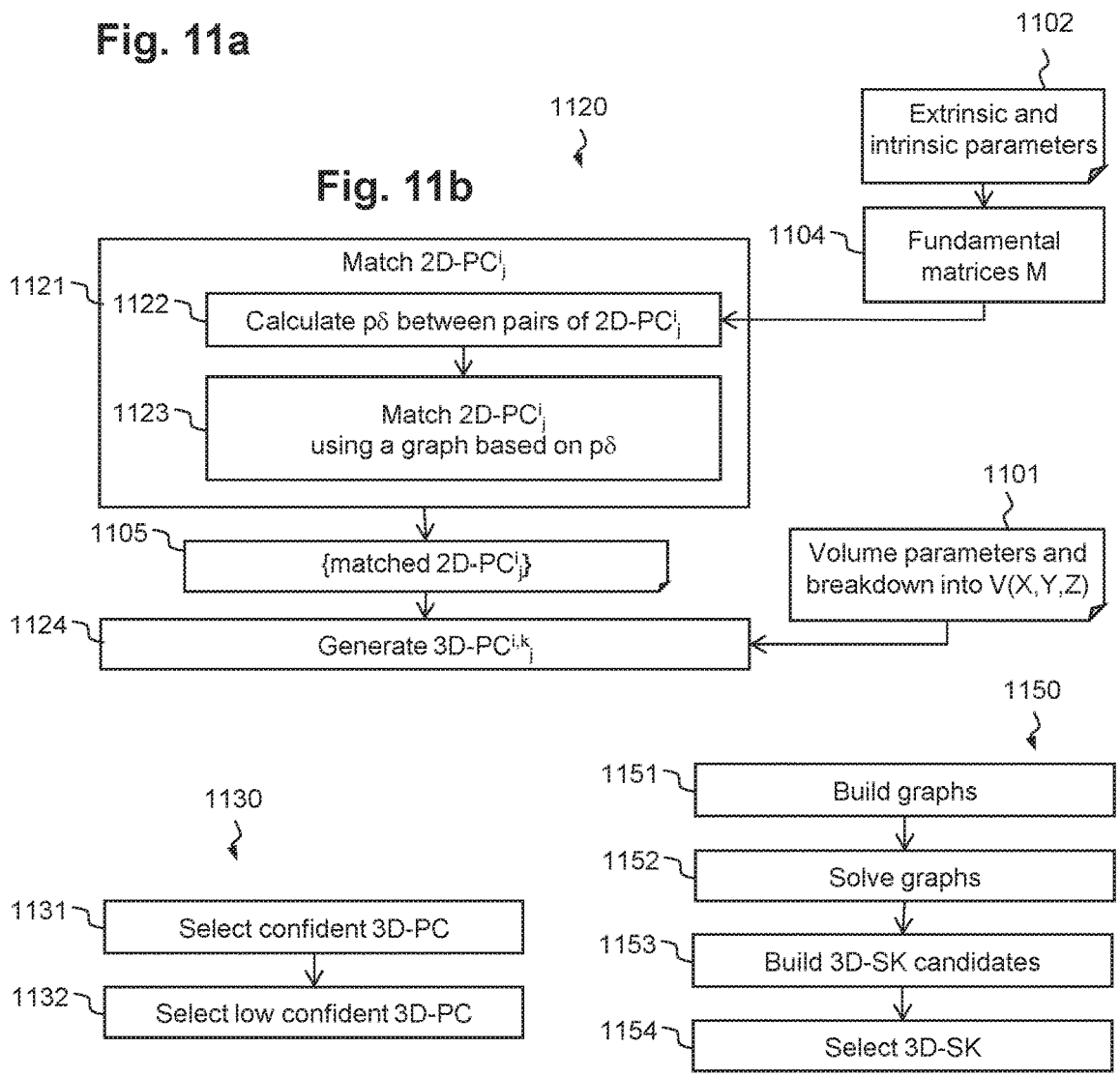
Fig. 11b
Fig. 11c
Fig. 11d

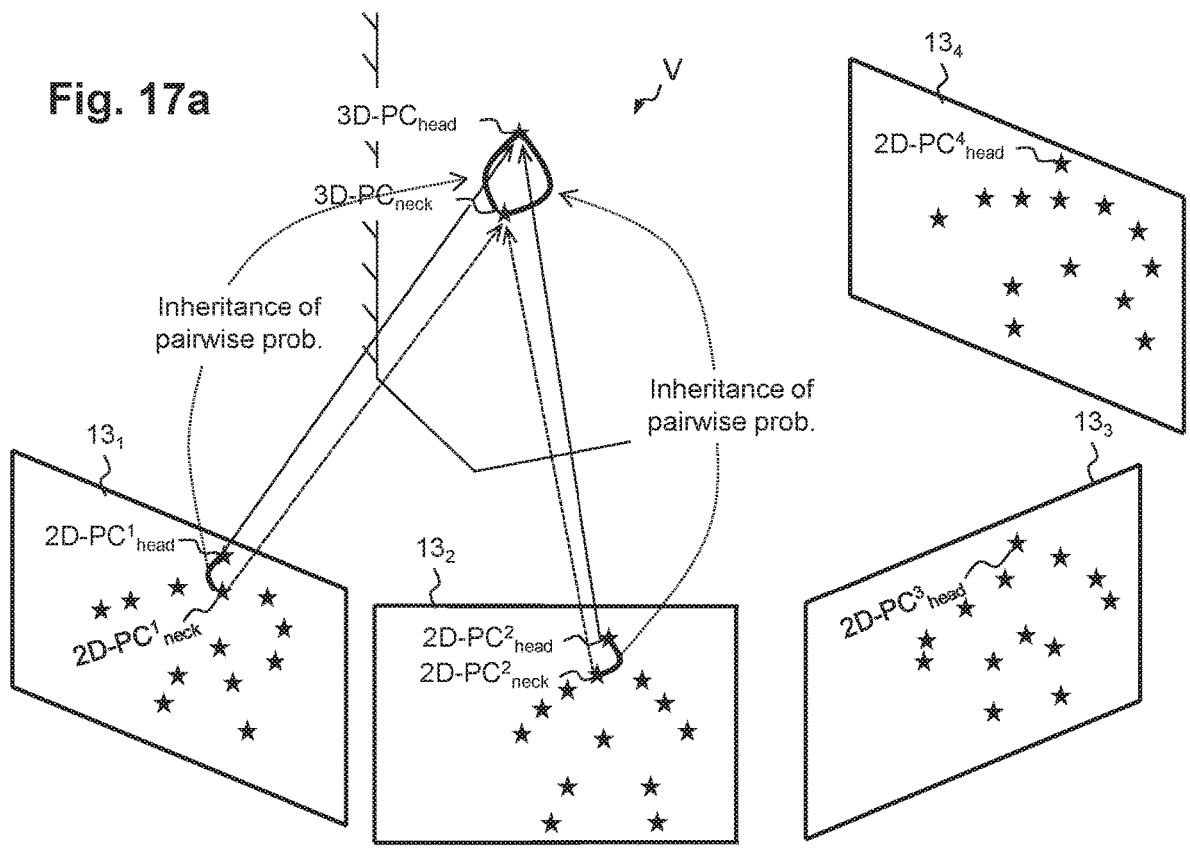

(A)

(B)

(C)

3D SKELETON RECONSTRUCTION FROM IMAGES USING VOLUMIC PROBABILITY DATA

CROSS-REFERENCE TO RELATED APPLICATIONS

This application claims the benefit under 35 U.S.C. § 119(a)-(d) of United Kingdom Patent Application No. 1802950.4, filed on Feb. 23, 2018, United Kingdom Patent Application No. 1806949.2, filed on Apr. 27, 2018, and United Kingdom Patent Application No. 1806951.8, filed on Apr. 27, 2018. The above cited patent applications are incorporated herein by reference in their entirety.

FIELD OF THE INVENTION

The present invention relates generally to reconstruction of 3D skeletons from views of one or more 3D real world objects. Improved 2D or 3D images of the 3D real world objects can be generated from the reconstructed 3D skeletons

BACKGROUND OF THE INVENTION

Reconstruction of 3D skeletons, also known as 3D object pose estimation, is widely used in image-based rendering. Various applications for 3D object pose estimation and virtual rendering can be contemplated, including providing alternative views of the same animated 3D object or objects from virtual cameras, for instance a new and more immersive view of a sport event with players.

Various attempts to provide methods and devices for 3D skeleton reconstruction have been made, including U.S. Pat. No. 8,830,236 and publication "3D Human Pose Estimation via Deep Learning from 2D annotations" (2016, fourth International Conference on 3D Vision (3DV), Ernesto Brau, Hao Jiang). However, the efficiency of the techniques described in these documents remains insufficient in terms of performances, including memory use, processing time (for instance nearly real time such as less than a few seconds before rendering), ability to detect a maximum number of 3D real world objects in the scene.

SUMMARY OF INVENTION

New methods and devices to reconstruct 3D skeletons from source images of the same scene are proposed.

A first approach is proposed.

In the first approach, a method for generating a 3D skeleton of a 3D real world object observed by source cameras in a scene volume comprises the following steps performed by a computer system:

obtaining, from memory of the computer system, two (or more) simultaneous source images of the scene volume recorded by the source cameras;

generating, from each source image, one or more part maps for one or more respective parts of the 3D real world object, each part map for a given part comprising part probabilities for respective samples (e.g. pixels) of the source image representing probabilities that the respective samples correspond to the given part;

generating one or more sets of part volume data for respectively the one or more parts, wherein generating a set of part volume data for a respective part includes:

projecting elementary voxels of the scene volume onto projection samples of the part maps;

computing a joint part probability for each elementary voxel based on the part probabilities of its projection samples in the part maps corresponding to the respective part;

generating one or more parts of the 3D skeleton using the one or more sets of part volume data generated.

Retrieving probabilities for object parts in the 2D space from the source images and then combining them into joint part probabilities in the 3D space makes it possible to reduce overall complexity of the 3D skeleton reconstruction. In particular, no 2D skeletons need to be generated from the source images and then processed. Also, there is no need to solve any conflict between two generated 2D skeletons that would not perfectly match in the 3D space Robustness of the 3D skeleton reconstruction is obtained through the actual determination of the 3D skeleton from the joint part probabilities, that is directly from probabilities in the 3D space.

Correspondingly, a system, which may be a single device, for generating a 3D skeleton of a 3D real world object observed by source cameras in a scene volume is proposed. It comprises at least one microprocessor configured for carrying out the steps of:

obtaining, from memory of the computer system, two (or more) simultaneous source images of the scene volume recorded by the source cameras;

generating, from each source image, one or more part maps for one or more respective parts of the 3D real world object, each part map for a given part comprising part probabilities for respective samples of the source image representing probabilities that the respective samples correspond to the given part;

generating one or more sets of part volume data for respectively the one or more parts, wherein generating a set of part volume data for a respective part includes:

projecting elementary voxels of the scene volume onto projection samples of the part maps;

computing a joint part probability for each elementary voxel based on the part probabilities of its projection samples in the part maps corresponding to the respective part;

generating one or more parts of the 3D skeleton using the one or more sets of part volume data generated.

Optional features are contemplated. Some of these features are explained here below with reference to a method, while they can be transposed into system features dedicated to any system according to the first approach.

In embodiments, the method may further comprise using a first set of part volume data to restrict an amount of elementary voxels to be projected on part maps to generate a second set of part volume data. This approach aims at reducing computational costs of the overall method.

In specific embodiments, using the first set of part volume data includes:

determining part candidates of the 3D real world object from the first set of part volume data, defining bounding 3D boxes around the determined part candidates in the scene volume, wherein the amount of elementary voxels to be projected on the part maps to generate a second set of part volume data is restricted to the defined bounding boxes.

The bounding boxes thus define various sub-volumes where 3D objects are detected. Using such bounding boxes advantageously allows independent processing to be performed on each of them, thereby reducing complexity.

In other embodiments, generating a part map from a source image for a respective part includes:

obtaining one or more scaled versions of the source image, generating, from each of the source image and its scaled versions, an intermediary part map for the respective part, the intermediary part map comprising part probabilities for respective samples of the source image or its scaled version representing probabilities that the respective samples correspond to said part, and forming the part map with, for each sample considered, the highest part probability from the part probabilities of the generated intermediary part maps for the same sample considered.

The approach seeks to increase robustness of 3D object detection, and thus of 3D skeleton reconstruction.

In yet other embodiments, the method further comprises generating, from each source image, a part affinity field for the two adjacent parts that includes affinity vectors for respective samples of the source image, the magnitude and direction of each affinity vector representing estimated orientation probability and orientation of an element connecting, according to the 3D model, two said adjacent parts at the respective sample in the source image, wherein the weights set for the weighted links are based on the generated part affinity fields.

This approach also increases robustness of 3D skeleton reconstruction. This is because the part affinity fields give additional information on how candidate parts belong to two adjacent parts should be connected.

A second approach is proposed.

In the second approach, a method for generating a 3D skeleton of one or more 3D real world objects observed by cameras comprises the following steps performed by a computer system:

obtaining (possibly from memory of the computer system) a plurality of simultaneous images of the 3D real world objects recorded by the cameras, determining, from each image, one or more sets of 2D part candidate or candidates for one or more respective parts of the 3D real world object (e.g. head, left hand, . . . of a human-like object), each 2D part candidate corresponding to a sample (e.g. pixels) of the corresponding image, generating, in 3D space, 3D part candidates from the 2D part candidates from two or more images, e.g. one to each 3D part candidate is determined from 2D part candidates determined from two or more images, converting generated 3D part candidates representing the same part into a single 3D part candidate, and then, generating at least one 3D skeleton from the 3D part candidates.

The second approach offers a balanced split between operations performed at 2D level, here the determination of 2D part candidates, and operations performed at 3D level, here the conversion of 3D part candidates with a view of forming the 3D skeleton. It involves converting the 2D part candidates into 3D part candidates.

This split advantageously offers a good balance between processing complexity and speed performance as the amount of 3D data to be handled is substantially reduced by the 2D part candidate determining.

Correspondingly, a system, which may be a single device, for generating a 3D skeleton of one or more 3D real world objects observed by cameras is also proposed. It comprises at least one microprocessor configured for carrying out the steps of:

obtaining, from memory of the computer system, a plurality of simultaneous images of the 3D real world objects recorded by the cameras, determining, from each image, one or more sets of 2D part candidate or candidates for one or more respective parts of the 3D real world object, each 2D part candidate corresponding to a sample of the corresponding image, generating, in 3D space, 3D part candidates from the 2D part candidates from two or more images, e.g. one to each 3D part candidate is determined from 2D part candidates determined from two or more images, converting generated 3D part candidates representing the same part into a single 3D part candidate, and then, generating at least one 3D skeleton from the 3D part candidates.

Optional features are contemplated. Some of these features are explained here below with reference to a method, while they can be transposed into system features dedicated to any system according to the second approach.

In embodiments, the determining step includes:

generating, from each image, one or more part maps for one or more respective parts of the 3D real world object, each part map for a given part comprising part probabilities for respective samples (e.g. pixels) of the image representing probabilities that the respective samples correspond to the given part, and determining sets of 2D part candidate or candidates from respectively the part maps.

This approach substantially reduces processing complexity as the part candidates are determined at 2D level, while a reduced number of such candidates can be used at 3D level for further processing.

In specific embodiments seeking to increase robustness, generating a part map from a source image for a respective part includes:

obtaining one or more scaled versions of the source image, generating, from each of the source image and its scaled versions, an intermediate part map for the respective part, the intermediate part map comprising part probabilities for respective samples of the source image or its scaled version representing probabilities that the respective samples correspond to said part of the 3D real world object, and forming the part map with, for each sample considered, the highest part probability from the part probabilities of the same sample considered in the generated intermediate part maps.

In other specific embodiments, determining a set of 2D part candidate or candidates from a part map includes determining local maximum or maxima of the part probabilities in the part map and outputting the sample or samples corresponding to the determined local maximum or maxima as 2D part candidate or candidates.

In other embodiments, the step of generating 3D part candidates from the 2D part candidates includes:

repeatedly matching two 2D part candidates from two respective sets of 2D part candidates (i.e. from two different source images) determined for the same part (e.g. head), and generating, in 3D space, 3D part candidates from respective pairs of matched 2D part candidates. It means that a pair of matching or matched 2D part candidates is used to generate one 3D part candidate in the volume.

This approach proves to be of low complexity to produce 3D part candidates for a 3D skeleton representing the observed 3D real world object.

In yet other embodiments, the method further comprises a step of filtering the generated 3D part candidates into a subset of 3D part candidates.

Through this filtering the number of 3D part candidates to be handled for 3D skeleton generation may be substantially reduced, thereby reducing processing complexity of the operations performed at 3D level.

In specific embodiments, the filtering step may include selecting 3D part candidates generated from pairs of matched 2D part candidates that share the same 2D part candidates.

The selecting step may include selecting at least one triplet of 3D part candidates generated from three respective pairs built from exactly the same three 2D part candidates.

The filtering step may also include selecting or discarding 3D part candidates generated from pairs of matched 2D part candidates based on a part distance determined between the 2D part candidates of the respective pairs.

In yet other embodiments, the 3D skeleton generating step includes using (and solving) a graph to obtain one or more one-to-one associations between 3D part candidates representing two different parts, wherein nodes of the graph correspond to the 3D part candidates representing the two different parts considered and weighted links between nodes corresponding to two 3D part candidates for the two different parts are set.

As association is sought between candidates of different parts, no link is preferably made between nodes representing candidates of the same part. This reduces the complexity of the graph to be solved.

The graph-based approach makes it possible to efficiently find the best associations between 3D parts to build a final 3D skeleton, at reasonable processing costs.

The weight for a link may be calculated based on pairwise probability or probabilities between pairs of 2D part candidates, pairs from which two 3D part candidates forming the link are generated. Each pairwise probability can be obtained for two 2D part candidates belonging to the same source image.

The method may further comprise generating, from the source image, a part affinity field between the two different parts considered that includes affinity vectors for respective samples of the source image, the magnitude and direction of each affinity vector representing estimated orientation probability and orientation of an element connecting, according to the 3D model, the two different parts considered at the respective sample in the source image, wherein the pairwise probability is calculated based on the part affinity field generated from the source image.

The pairwise probability for the two 2D part candidates may be calculated based on affinity vectors located between the two 2D part candidates in the generated part affinity field. Calculating the pairwise probability may include computing the scalar products of a vector formed by the two 2D part candidates and the affinity vectors located between the two 2D part candidates.

The weight for a link may also or in a variant be based on a distance between the two 3D part candidates forming the link.

Also, the two different parts considered may be adjacent according to a 3D model of the 3D real world object.

The 3D skeleton generating step may further include:
repeating using a graph for successively each of a plurality of pairs of adjacent parts according to a 3D model of the 3D real world object, in order to obtain one or more one-to-one associations between 3D part candidates for each pair of adjacent parts, and connecting pairs of associated 3D part candidates that share the same 3D part candidate to obtain one or more 3D skeleton candidates.

The method may thus further comprise selecting one of the obtained 3D skeleton candidates as a 3D skeleton of the 3D real world object. Selecting one 3D skeleton candidate may be based on a number of parts forming the 3D skeleton candidate according to the 3D model.

A third approach is proposed.

In the third approach, a method for generating a 3D skeleton of one or more 3D real world objects observed by cameras comprises the following steps performed by a computer system:

determining a set of one or more 2D skeletons of the 3D real world object or objects in each of (two or more) simultaneous images of the 3D real world objects recorded by the cameras;

for one or more pairs (preferably each pair) of the simultaneous images (i.e. of the corresponding sets of 2D skeletons), matching each of one or more 2D skeletons of one of the two corresponding sets with at most one respective skeleton of the other set. Thus either a 2D skeleton is matched with another one from the other set, or it is matched with none; and generating one 3D skeleton from the pairs of matched 2D skeletons.

An idea of the third approach lies on detecting when 2D skeletons of two source images match one the other. Non-complex triangulation may then be used to obtain 3D skeletons. The amount of 3D data to be processed is thus drastically reduced.

On overall, the process of this approach shows reduced processing complexity.

Correspondingly, a system, which may be a single device, for generating a 3D skeleton of one or more 3D real world objects observed by cameras is also proposed. It comprises at least one microprocessor configured for carrying out the steps of:

determining a set of one or more 2D skeletons of the 3D real world object or objects in each of simultaneous images of the 3D real world objects recorded by the cameras;

for one or more pairs of the simultaneous images, matching each of one or more 2D skeletons of one of the two corresponding sets with at most one respective skeleton of the other set; and generating one 3D skeleton from the pairs of matched 2D skeletons.

Optional features are contemplated. Some of these features are explained here below with reference to a method, while they can be transposed into system features dedicated to any system according to the third approach.

In embodiments, matching the 2D skeletons of two images includes:

determining a skeleton distance between the 2D skeletons and matching the 2D skeletons together depending on the skeleton distance.

This approach may use a graph to obtain one or more one-to-one associations between a 2D skeleton determined from a first image and a 2D skeleton determined from the second image, wherein nodes of the graph correspond to the 2D skeletons of the two sets and weighted links between nodes are set based on the determined distances between the corresponding 2D skeletons.

In other embodiments, generating one 3D skeleton from the pairs of matched 2D skeletons includes:

generating a weak 3D skeleton from each pair of matched 2D skeletons; and determining one or more 3D skeletons from the generated weak 3D skeletons.

The various pairs of matching 2D skeletons are thus used to produce plenty of (intermediate or "weak") 3D skeletons. As being built from two 2D skeletons, the robustness of each intermediate 3D skeleton may appear weak. However, spatially close instances of the weak 3D skeletons in 3D space make it possible to robustly determine final 3D skeletons representing the 3D real world objects.

It results that reconstruction of a 3D skeleton is enhanced. Furthermore, the third approach improves detection of various 3D skeletons.

In some embodiments, the 2D-to-3D conversions of the pairs of matched 2D skeletons may involve triangulation, meaning generating a weak 3D skeleton from a pair of matched 2D skeletons includes:

projecting a part of a first 2D skeleton of the pair as a first line in a 3D space;

projecting the same part of the second 2D skeleton of the pair as a second line in the 3D space; and determining a 3D position locating the part for the weak 3D skeleton, based on the first and second lines.

In some embodiments, determining one or more 3D skeletons from the generated weak 3D skeletons includes converting 3D positions of the weak 3D skeletons locating the same part of the weak 3D skeletons into a unique 3D position for the part. Where there are numerous instances of the same part, a final and robust part instance may be obtained. This may be repeated for each part forming a 3D skeleton.

Various applications of any of these first to third approaches may be contemplated, including methods for displaying a 3D skeleton of one or more 3D real world objects observed by cameras (in a scene volume). The methods comprise the following steps performed by a computer system:

generating a 3D skeleton of a 3D real world object using any generating method according to the first to third approaches, selecting a viewpoint in 3D space, and displaying, on a display screen, the generated 3D skeleton or a 3D object/character obtained from said generated 3D skeleton from the viewpoint.

More generally, the 3D skeleton generation may be applied to 2D or 3D image generation, therefore providing improved contribution to the technical field of image processing producing an improved image.

In this context, the invention may also improve the field of rendering a scene from a new viewpoint which may be seen as a new "virtual camera".

Also, systems for displaying a 3D skeleton of one or more 3D real world objects observed by cameras are proposed. They comprise any system according to the first to third approaches to generate a 3D skeleton of one or more 3D real world objects connected to a display screen, wherein the microprocessor is further configured for carrying out the steps of:

selecting a viewpoint in 3D space, and displaying, on the display screen, the generated 3D skeleton from the viewpoint.

Another aspect of the invention relates to a non-transitory computer-readable medium storing a program which, when executed by a microprocessor or computer system in a device, causes the device to perform any method as defined above according to the first to third approaches.

The non-transitory computer-readable medium may have features and advantages that are analogous to those set out above and below in relation to the methods and node devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIGS. 11a to 11d schematically illustrate, using flowcharts, exemplary operations forming sub-steps of the process of FIG. 11, according to embodiment.

FIGS. 17a to 17c schematically illustrate the retrieval of pairwise probabilities for two 3D part candidates according to embodiments of the second approach;

DETAILED DESCRIPTION OF EMBODIMENTS

Figure 1:
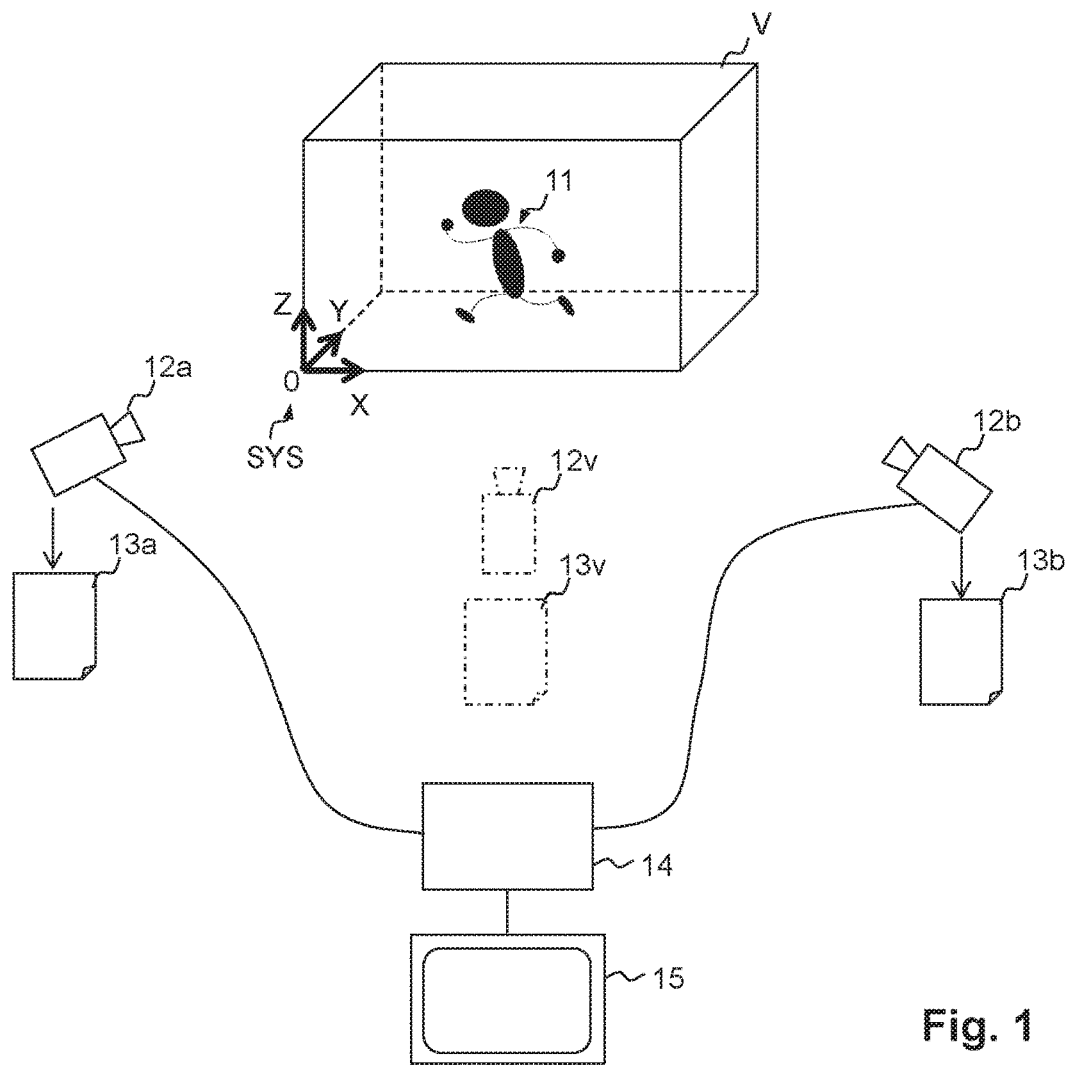
FIG. 1 is a general overview of a system 10 implementing embodiments of the invention.

FIG. 1 is a general overview of a system 10 implementing embodiments of the invention. The system 10 comprises a three-dimensional (3D) real world object 11 in a scene volume V surrounded by two or more source camera/sensor units 12$i$ (i represents here a camera index such as a orb illustrated in the Figure).

The 3D real world object 11 may be of various types, including beings, animals, mammals, human beings, articulated objects (e.g. robots), still objects, and so on. The scene captured may also include a plurality of 3D objects that may move over time.

Although two main camera units 12a, 12b are shown in the Figure, there may be more of them, for instance about 7-10 camera units, up to about 30-50 camera units in a stadium.

The source camera units 12$i$ generate synchronized videos made of 2D source images 13$i$ (i.e. views from their viewpoints of corresponding camera units 12$i$) of the scene at substantially the same time instant, i.e. simultaneous source images. Each source camera/sensor unit 12$i$ (12a, 12b) comprises a passive sensor (e.g. an RGB camera).

The 3D positions and orientations of the source cameras 12$i$ within a reference 3D coordinates system SYS are known. They are named the extrinsic parameters of the source cameras.

Also, the geometrical model of the source cameras 12$i$, including the focal length of each source camera and the orthogonal projecting position of the center of projection in the image 13$i$ are known in the camera coordinates system. They are named the intrinsic parameters of the source cameras. This camera model is described with intrinsic parameters as a pinhole model in this description but any different model could be used without changing the means of the invention. Preferably, the source cameras 12$i$ are calibrated so that they output their source images of the scene at the same cadence and simultaneously. The intrinsic and extrinsic parameters of the cameras are supposed to be known or calculated by using well-known calibration procedures.

In particular, these calibration procedures allow the 3D object to be reconstructed into a 3D skeleton at the real scale.

The source images 13$i$ feed a processing or computer system 14 according to embodiments of the invention.

The computer system 14 may be embedded in one of the source camera 12$i$ or be a separate processing unit. Any communication technique (including Wi-Fi, Ethernet, 3G, 4G, 5G mobile phone networks, and so on) can be used to transmit the source images 13$i$ from the source cameras 12$i$ to the computer system 14.

An output of the computer system 14 is a 3D skeleton for at least one 3D object of the scene in order to generate a 2D or 3D image of preferably the scene. A virtual image 13$v$ built with the 3D skeleton generated and showing the same scene with the 3D object or objects from a viewpoint of a virtual camera 12$v$ may be rendered on a connected display screen 15. Alternatively, data encoding the 3D representation (e.g. skeleton) generated may be sent to a distant system (not shown) for storage and display, using for instance any communication technique. Stored 3D skeletons may also be used in human motion analysis for video monitoring purposes for instance.

Figure 2:
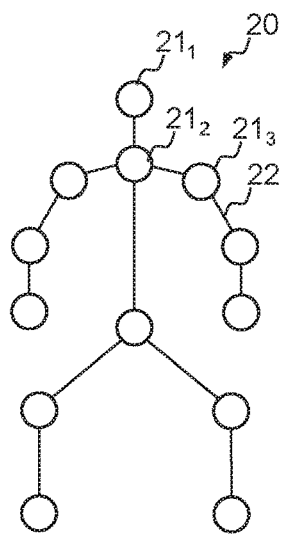
FIG. 2 illustrates an exemplary 3D model of a 3D real world object, based on which a 3D skeleton of the 3D object can be built.

FIG. 2 illustrates an exemplary 3D model 20 of a 3D real world object, on which a 3D skeleton of the 3D object may be built according to the teachings of the present invention. In the example of the Figure, the 3D object is an articulated 3D real world object of human being type. Variants may regard still objects.

The 3D model comprises N distinct parts $21_1$, $21_2$, $21_3$, ... and N−1 connecting elements or links 22. The parts (globally referenced 21) represent modeled portions of the 3D real world object, for instance joints (shoulders, knees, elbows, pelvis, ... ) or end portions (head, hands, feet) of a human being. Each part 21 is defined as a 3D point (or position) in the 3D coordinates system SYS. The 3D point or position may be approximated to a voxel in case SYS is discretized. The connecting elements 22 are portions connecting the parts 21, for instance limbs such as forearm, arm, thigh, trunk and so on. Each connecting element 22 can be represented as a straight line between the two connected parts, also named "adjacent parts", through 3D space.

Various approaches are proposed to generate the 3D skeleton or skeletons of the scene volume, i.e. to know where each part of the 3D real world object or objects is 3D located within the scene volume V.

A first approach consists in retrieving probabilities from the source images to detect parts of the 3D objects before merging them in 3D space. The merged probabilities can then be used to robustly detect the parts in the 3D space, i.e. in the scene volume V.

This approach advantageously reduces complexity of the 3D skeleton reconstruction, in particular of processes at 2D level (i.e. on the source images) including avoiding conflict resolutions to be performed between conflicting parts detected from different source images. It turns that real time reconstructions (and thus displays or human motion analysis for instance) are better achieved. Real time reconstructions for "live" TV or broadcast purposes may include few seconds delay, e.g. less than 10 seconds, preferably at most 4 or 5 seconds.

The inventors have also noticed that it efficiently works on complex scenes (like sport events with multiple players in a stadium), with an ability to detect a wide number of inter-operating 3D objects (multiple human players).

To that end, it is first obtained two or more simultaneous source images 13$i$ of the scene volume V recorded by the source cameras 12$i$. They may be obtained from memory of the computer system.

The position and orientation of the scene volume V captured are known in the 3D coordinates system SYS (for instance the 3D shape is known, typically a cuboid or cube, and the 3D locations of four of its vertices are known).

Next, from each source image, one or more part maps are generated for one or more respective parts of the 3D real world object. If various parts are present in the 3D model 20, various part maps can be generated from the same source image.

Each part map for a given part comprises part probabilities (e.g. an array of probabilities) for respective pixels of the source image representing probabilities, preferably a unary probability, that the respective pixels correspond to the given part.

Pixels of the source image are examples of "samples" forming an image. For ease of illustration, it is made reference below to pixels, while the first approach may apply to any sample. A sample may be for instance a pixel in the source image, a color component of a pixel in the source image, a group of pixels in the source image, a group of pixel color components in the source image, etc.

The generated part map may differ in size from the source image, usually at a lower resolution, in which case the part map can be up-sampled at the same resolution as the source image. In case of up-sampling, each part map can thus be a 2D array matching the source image (also a 2D array): a pixel in the part map for a given part (e.g. the head of the 3D human being) takes the probability that the co-located pixel in the source image belongs to such given part (i.e. head in the example). In case of lower resolution part map, a pixel in the part map for a given part may take the probability that a relatively (given the scale) co-located pixel in the source image belongs to such given part or that a group of relatively (given the scale) co-located pixels in the source image belong to such given part.

For ease of illustration, it is considered below that the part maps are of the same size as the source image, although the up-sampling process is optional.

In some embodiments, the part map may be filtered by a low-pass filter to extend the influence area of some detected parts when part maps generate strongly localized probabilities. For example Gaussian filtering may be used. This approach improves the process, in particular the actual detection of parts as described below.

From these part maps, one or more sets of part volume data are also generated for respectively the one or more parts. In the first approach, generating a set of part volume data for a respective part includes:

projecting elementary voxels of the scene volume onto projection pixels of the part maps. It means that the scene volume V is split into elementary voxels, preferably each elementary voxel representing a cube whose edge length depends on the 3D object (e.g. 1 cm for human beings). Also, the projection matches each elementary voxel with the pixel (referred to as "projection pixel") of the source image or part map which represents it (i.e. the pixel which views the elementary voxel from the source camera point of view). This matching is a pure geometrical issue based on known intrinsic and extrinsic parameters; and computing a joint part probability, preferably a unary probability, for each elementary voxel based on the part probabilities of its projection pixels in the part maps corresponding to the respective part. This probability is said to be "joint" because it merges, and thus joins, several probabilities coming from several part maps for the same part. Examples of probability merging are proposed below. The set of joint part probability forms part "volume data" as it can be stored in memory as a 3D matrix matching the scene volume matrix (split into elementary voxels): a voxel in the part volume data for a given part (e.g. the head of the 3D human being) takes the joint probability that the co-located voxel in the scene volume V belongs to such given part (i.e. head in the example). If various parts are present in the 3D model 20, various sets of part volume data can thus be generated.

The part volume data may also be filtered by a filter to keep the highest joint part probabilities in order to improve part detection. Such joint part probabilities spread over the scene volume for a given part can then be used to determine the actual occurrence or occurrences of said part in the scene volume (in terms of identification and location). It means that one or more parts of the 3D skeleton can be generated using the one or more set of part volume data generated, for example where the joint probabilities are locally the highest (local maxima).

A second approach consists in adequately splitting the overall process into processing operations performed at 2D level, i.e. on images, and processing operations performed at 3D level, i.e. on volume data.

This aims at reducing complexity of the 3D skeleton reconstruction as the amount of data to be processed at 3D level can be substantially reduced due to 2D processing. Indeed a reduced number of 2D points detected at image/2D level (hereafter 2D part candidates) thanks to the operations at same level is converted into similar reduction of 3D points (hereafter 3D part candidates) to be processed in the 3D space. Costly 3D processing operations are thus substantially reduced.

To that end, a plurality of simultaneous source images 13$i$ of the scene captured by the source cameras 12$i$ may be obtained, from memory of the computer system for instance.

In case a volume V of the captured scene is delimited, its position and orientation are known in the 3D coordinates system SYS (for instance the 3D shape is known, typically a cuboid or cube, and the 3D locations of four of its vertices are known).

Next, from each source image, one or more sets of 2D part candidate or candidates for one or more respective parts of the 3D real world object (e.g. head, left hand) can be determined. Each 2D part candidate corresponds to a sample (e.g. pixels) of the corresponding source image. Known techniques to detect 2D parts corresponding to a known model can be used as described below, which for instance provide part probabilities for each sample of the source image to correspond to the parts forming the object. The techniques may also provide a pairwise probability for each pair of detected 2D part candidates representing two adjacent parts (i.e. a connecting element 22) in the same image, this pairwise probability representing the probability that the two detected 2D part candidates be actually connected by the identified connecting element 22 in the real object.

The determined 2D part candidates may then be converted into 3D positions in 3D space, meaning 3D part candidates are generated from the 2D part candidates (on a per-part basis). Advantageously, a matching between 2D part candidates corresponding to the same part is first made before projecting each matching pair into a 3D part candidate in 3D space. This may merely involve geometrical considerations given for instance the positions and orientations of the cameras (more generally their extrinsic and intrinsic parameters) having captured the source images from which the 2D part candidates are obtained.

To increase robustness of the process, the 3D part candidates may optionally be filtered in order to preferably keep those generated from 2D part candidates shared by two or more 3D part candidates. Indeed, the inventor has noticed such sharing helps identifying the most robust/relevant 3D parts of the real objects.

Next, the second approach provides obtaining a 3D part candidate for a given part from several 3D part candidates generated for that part. Such conversion may involve a RANSAC (Random sample consensus algorithm) approach based on distance considerations. Advantageously, this conversion also provides reduction of 3D processing complexity, as the number of 3D part candidates is further reduced.

Next, one or more 3D skeletons can be generated from the kept 3D part candidates. This may be made iteratively by considering each pair of adjacent parts forming the model. A graph encoding all the 3D part candidates (as nodes) for a given pair is preferably used and solved using inter-candidates statistics for the links between nodes. Such graph may help obtaining most relevant (and thus robust) associations between 3D part candidates. A connected component algorithm may then help progressively building the 3D skeleton, by successively considering the obtained associations for the various pairs of adjacent parts forming the object model and connecting those sharing the same 3D part candidate.

Thanks to the proposed approach, isolation of 3D objects within a scene volume comprising plenty of them can be improved. It turns that real time reconstructions of 3D skeletons (and thus displays or human motion analysis for instance) are better achieved. Real time reconstructions for "live" TV or broadcast purposes may include few seconds delay, e.g. less than 10 seconds, preferably at most 4 or 5 seconds.

The inventors have noticed that the proposed approach efficiently works on complex scenes (like sport events with multiple players in a stadium), with an ability to detect a wide number of interoperating 3D objects (multiple human players). The generated 3D skeleton may be used to generate a 2D or 3D image. The second approach thus provides improved contribution to the technical field of image processing producing an improved image.

A third approach consists in determining correspondences or matching between pairs of 2D skeletons detected in the source images and using these correspondences to generate one or more 3D skeletons. Preferably, the pairs of matching 2D skeletons are projected into corresponding intermediate or "weak" 3D skeletons in 3D space. The multiplicity of spatially-close intermediate 3D skeletons is a robust indication that a final 3D skeleton exists in this sub-volume.

This approach advantageously reduces complexity of the 3D skeleton reconstruction as only pairs of 2D skeletons are processed, Thanks to the robustness provided through the multiplicity of intermediate 3D skeletons, it also improves isolation of 3D objects within a scene volume comprising plenty of them. It turns that real time reconstructions of 3D skeletons (and thus displays or human motion analysis for instance) are better achieved. Real time reconstructions for "live" TV or broadcast purposes may include few seconds delay, e.g. less than 10 seconds, preferably at most 4 or 5 seconds.

The inventors have noticed that the proposed approach efficiently works on complex scenes (like sport events with multiple players in a stadium), with an ability to detect a wide number of interoperating 3D objects (multiple human players).

To that end, two or more simultaneous source images 13$i$ of the 3D objects recorded by the source cameras 12$i$ may be obtained, from memory of the computer system for instance.

In case a volume V of the captured scene is delimited, its position and orientation are known in the 3D coordinates system SYS (for instance the 3D shape is known, typically a cuboid or cube, and the 3D locations of four of its vertices are known).

A set of one or more 2D skeletons of the 3D real world object or objects in each of (two or more) simultaneous source images recorded by the source cameras can be determined. Known techniques to detect 2D skeletons corresponding to a known model can be used as described below. Additional techniques, such as scaling and possibly cropping, may improve detection of 2D skeletons in the images, while allowing clustering them for independent processing.

Next, one or more pairs, and preferably each pair, of the simultaneous source images or corresponding sets of 2D skeletons, are successively considered to determine matching between 2D skeletons. Each of one or more 2D skeletons of one of the two corresponding sets (preferably each 2D skeleton of the set) is matched with at most one respective skeleton of the other set if at all possible. It means that either a 2D skeleton is matched with another one from the other set, or it is matched with none of them, depending on criteria applied.

Each pair of matching 2D skeletons from different views (source images) of the same scene volume can then be processed using triangulation in order to build an intermediate 3D skeleton, the robustness of which is quite low or weak. An intermediate or "weak" 3D skeleton can thus be generated, in 3D space, from each pair of matched 2D skeletons.

All the generated intermediate 3D skeletons can then be used to determine one or more final 3D skeletons, for instance based on spatial criteria to convert e.g. plenty of spatially-close intermediary 3D skeletons into one robust final 3D skeleton for display. More generally, one (or more) 3D skeleton is generated from the pairs of matched 2D skeletons.

The generated 3D skeleton may be used to generate a 2D or 3D image. The third approach thus provides improved contribution to the technical field of image processing producing an improved image.

As mentioned above, an exemplary application for the present invention may relate to the display of a virtual image 13v showing the same scene from a new viewpoint, namely a virtual camera 12v. To that end, the various approaches also provide a method for displaying a 3D skeleton of one or more 3D real world objects observed by source cameras in a scene volume. This method includes generating at least one 3D skeleton of a 3D real world object using any generating method described above.

Next, this application consists in selecting a virtual camera viewing the scene volume and displaying the generated 3D skeleton from the virtual camera on a display screen. In practice, several generated 3D skeletons are displayed simultaneously on the display, for instance when displaying a sport event. A simple 3D object as shown in FIG. 2 can be used to display the generated 3D skeleton. This is useful to display animations that require low rendering costs. More promising applications can also provide an envelope to the 3D skeleton with a texture, either predefined or determined from pixel values acquired by the source cameras (for better rendering). This is for example to accurately render shot or filmed sportsmen as they actually look like in the scene volume.

Selecting a virtual camera may merely consist in defining the extrinsic and intrinsic parameters of a camera, thereby defining the view point (i.e. distance and direction from the scene volume) and the zoom (i.e. focal) provided by the virtual image.

Generating the 3D skeletons and displaying/rendering them on the display screen 15 may be performed for successive source images 13i acquired by the source cameras 12i. Of course the displaying operation is made following the timing of acquiring the source images. It turns that 3D-skeleton-based animations of the captured scene can be efficiently produced and displayed.

Other applications based on the generated 3D skeleton or skeletons may be contemplated. For instance, video monitoring for surveillance purposes of areas, such as the street or a storehouse, may perform detection of 3D skeletons in captured surveillance images and then analyses the moving of these 3D skeletons to trigger an alarm or not.

Figure 3:
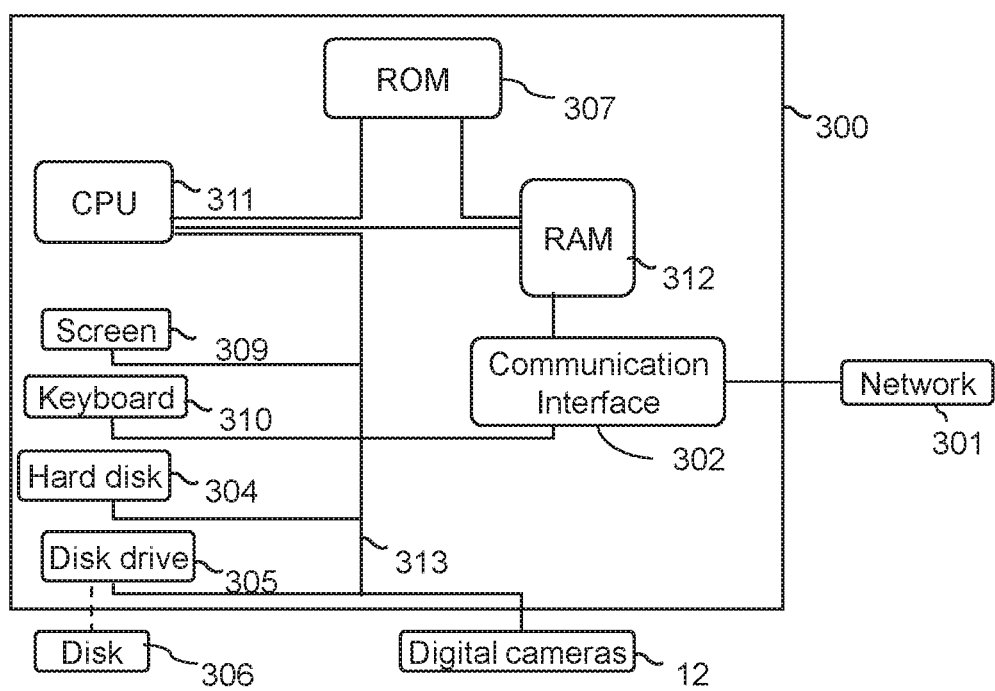
FIG. 3 is a schematic block diagram of a computing device for implementation of one or more embodiments of the invention.

FIG. 3 schematically illustrates a device 300 used for the present invention, for instance the above-mentioned computer system 14. It is preferably a device such as a microcomputer, a workstation or a light portable device. The device 300 comprises a communication bus 313 to which there are preferably connected:
  a central processing unit 311, such as a microprocessor, denoted CPU;
  a read only memory 307, denoted ROM, for storing computer programs for implementing the invention;
  a random access memory 312, denoted RAM, for storing the executable code of methods according to the invention as well as the registers adapted to record variables and parameters necessary for implementing methods according to the invention; and
  at least one communication interface 302 connected to a communication network 301 over which data may be transmitted.

Optionally, the device 300 may also include the following components:
  a data storage means 304 such as a hard disk, for storing computer programs for implementing methods according to one or more embodiments of the invention;
  a disk drive 305 for a disk 306, the disk drive being adapted to read data from the disk 306 or to write data onto said disk;
  a screen 309 for displaying data and/or serving as a graphical interface with the user, by means of a keyboard 310 or any other pointing means.

The device 300 may be connected to various peripherals, such as for example source cameras 12i, each being connected to an input/output card (not shown) so as to supply data to the device 300.

Preferably the communication bus provides communication and interoperability between the various elements included in the device 300 or connected to it. The representation of the bus is not limiting and in particular the central processing unit is operable to communicate instructions to any element of the device 300 directly or by means of another element of the device 300.

The disk 306 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 307, on the hard disk 304 or on a removable digital medium such as for example a disk 306 as described previously. According to an optional variant, the executable code of the programs can be received by means of the communication network 301, via the interface 302, in order to be stored in one of the storage means of the device 300, such as the hard disk 304, before being executed.

The central processing unit 311 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 304 or in the read only memory 307, are transferred into the random access memory 312, which then contains the executable code of the program or programs, as well as registers for storing the variables and parameters necessary for implementing the invention.

In a preferred embodiment, the device is a programmable apparatus which uses software to implement the invention. However, alternatively, the present invention may be implemented in hardware (for example, in the form of an Application Specific Integrated Circuit or ASIC).

Various embodiments of the first approach are now described with reference to FIGS. 4 to 10.

Figure 4:
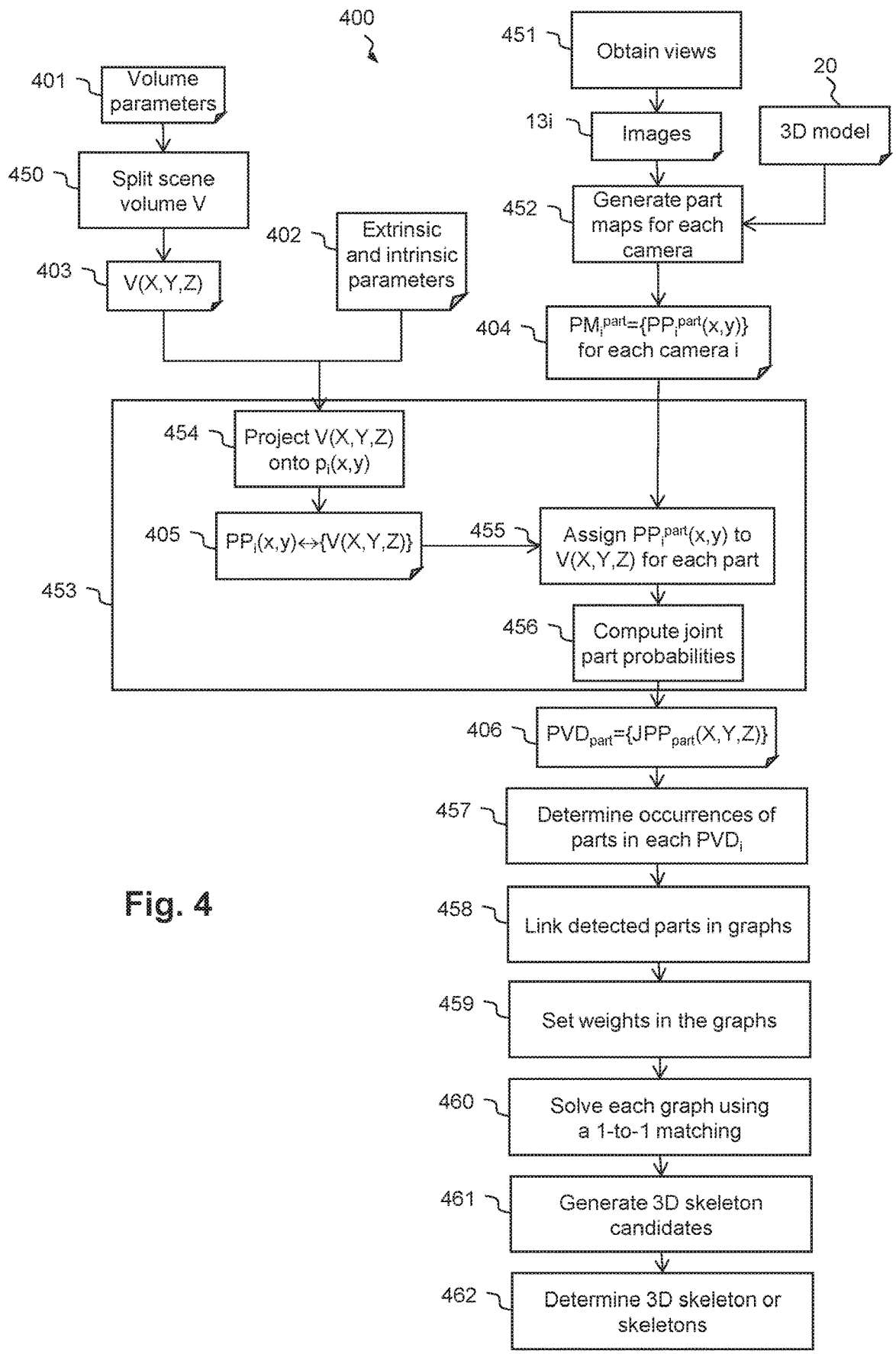
FIG. 4 illustrates, using a flowchart, first embodiments of a method for generating a 3D skeleton of a 3D real world object observed by source cameras in a scene volume according to the first approach.

FIG. 4 illustrates, using a flowchart, first embodiments of a method according to the first approach with the following context for execution.

The method takes place in the computer system 14 which has previously received M source images 13i acquired simultaneously by M calibrated source cameras 12i, for instance through a wireless or a wired network. These source images 13i are for instance stored in a reception buffer (memory) of the communication interface 302. The M source images may be a subset of source images available.

The method 400 may be repeated for each set of simultaneous source images 13i received from the source cameras 12$i$ for each successive time instants. For instance, 25 Hz to 100 Hz source cameras may be used, thereby requiring processing a set of source images 13$i$ each $\frac{1}{100}$ to $\frac{1}{25}$ second.

The scene volume V viewed by the source cameras 12$i$ may be predefined as shown by the volume parameters 401. These parameters locate the scene volume in the coordinates system SYS. The scene volume V may be split into elementary voxels V(X,Y,Z), preferably of equal sizes, typically elementary cubes. A size of the elementary voxels may be chosen depending on the 3D object to be captured. This is the resolution of the 3D space: each voxel corresponds to a point in the 3D space.

Figure 5:
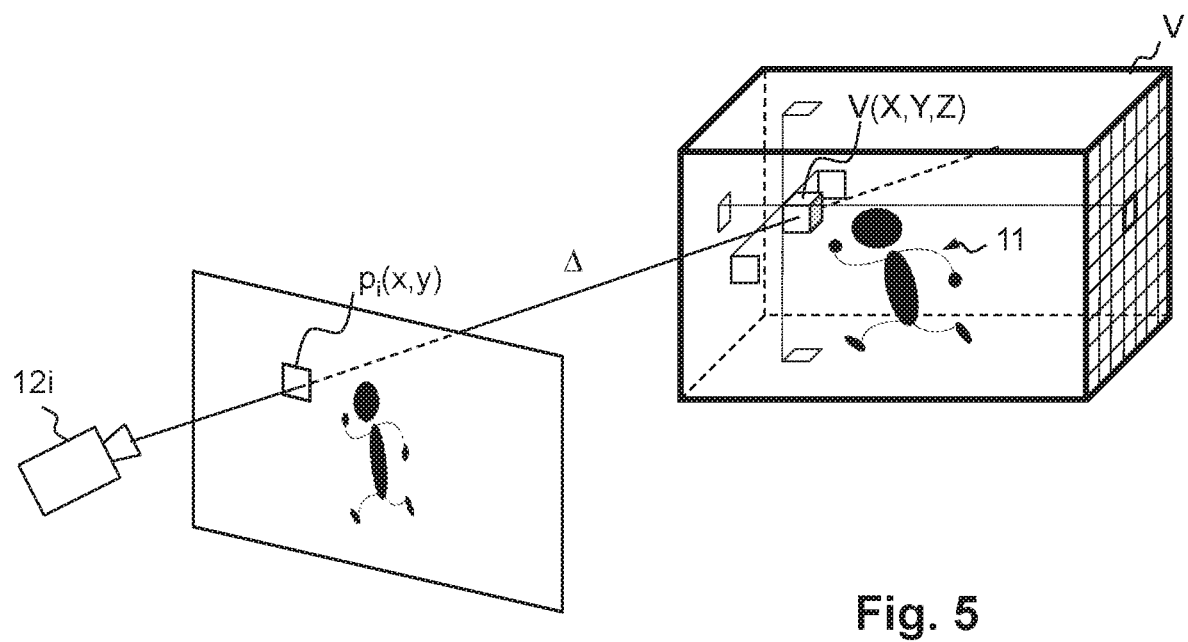
FIG. 5 schematically illustrates the splitting of a cuboid into elementary cubes V(X,Y,Z) and an exemplary projection of the latter on a part map.

For instance, the edge length of each elementary voxel may be set to 1 cm for a human being. FIG. 5 schematically illustrates the splitting of a cuboid into elementary cubes V(X,Y,Z), only one of which being shown for sake of clarity.

The invention also applies to a 3D coordinates system SYS without specific scene volume and corresponding splitting into voxels.

The source cameras 12$i$ have been calibrated, meaning their extrinsic and intrinsic parameters 402 are known.

The nature, and thus the 3D model 20, or each 3D real world object 11 in SYS is known. For ease of explanation, the description below concentrates on a single type of 3D object, for instance a human being as modelled in FIG. 2. Where the captured scene contains various types of 3D objects, various corresponding 3D models 20 can be used using the teachings below.

In execution, the method starts with the splitting 450 of the scene volume V into elementary voxels V(X,Y,Z) 403, preferably of equal sizes, typically elementary cubes. A size of the elementary voxels may be chosen depending on the 3D object to be captured. For instance, the edge length of each elementary voxel may be set to 1 cm for a human being. FIG. 5 schematically illustrates the splitting of a cuboid into elementary cubes V(X,Y,Z), only one of which being shown for the sake of clarity.

The splitting 450 may be made once and for all, meaning it is made once and the same split is used for successive sets of source images captured at successive time instants.

The method also starts with the obtaining 451 of two (or more) simultaneous source images of the 3D objects of the scene volume recorded by the source cameras. The source images 13$i$ are for instance retrieved from the reception buffer of the communication interface 302.

Although the sources images may have different sizes from one source camera to the other, it is assumed they have the same size for illustration purposes. In any case, a resizing of some source images may be processed to be in such situation. This resizing is not mandatory but helps in simplifying the description.

From each of these source images 13$i$, one or more part maps $PM_i^{part}$ 404 are generated at step 452 for one or more respective parts 21 of the 3D real world object 11. Typically N part maps are generated (N being the number of parts in the considered 3D model 20). For illustrative purposes, the part map generated for the head (as a part of the 3D object 11) from source image '3' is referenced $PM_3^{head}$.

Each part map $PM_i^{part}$ comprises part probabilities $PP_i^{part}$ (x,y) for respective pixels of the source image 'i'. $PP_i^{part}$(x, y) represents a probability that the respective pixel in the source image 13$_i$ corresponds to the respective part 'part' of the 3D real world object. If the part map and the image source have the same sizes, the respective pixel is pixel at location (x,y) in the source image. Otherwise, it is the relatively (given the scale or sampling factor) co-located pixel. For instance, it may be pixel at location (2x, 2y) when the height and width of the part map are half those of the image source.

The part map can be stored as an image having the same size as the source image, wherein each pixel takes the value of the part probability for the collocated pixel in the source image. Therefore there is a direct matching between a source image and the part maps generated from it: the collocated pixels in the part maps correspond to respective probabilities of the collocated pixel in the source image 13$i$ to belong to a respective part of the 3D object as shown by the camera 12$i$.

The part maps may have a different size/resolution to the source images (e.g. they are sub-sampled compared to the size of the source image). In such a case, the intrinsic parameters of the cameras can be modified taking into account the sub-sampling factor. Another solution consists in interpolating the part maps in order to match the genuine size of the source images. In such a case, a bilinear interpolation is preferred over a nearest-neighbor or bi-cubic interpolation.

In an improved solution, the parts maps may be low-pass filtered in order to increase the areas of influence of 2D pixels. For example Gaussian filtering may be used.

In the example of FIG. 2, thirteen parts are composing the 3D model, thereby thirteen part maps are generated from each source image processed.

Known techniques can be used to produce these part maps from the source images 13$i$.

One technique is described in publication "*Realtime Multi-Person 2D Pose Estimation using Part Affinity Fields*" by Zhe Cao et al. (2016). This technique calculates confidence maps for part detection which bear probabilities at pixel level as defined above.

Another technique is described in publication "*Deeper-Cut: A Deeper, Stronger, and Faster Multi-Person Pose Estimation Model*" by Eldar Insafutdinov et al. (2016) or publication "*Deep-Cut: Joint Subset Partition and Labelling for Multi Person Pose Estimation*" by Leonid Pishchulin et al. (2016).

More generally, a convolutional neural network (CNN) can be used which is configured based on a learning library of pictures in which a matching with each part of the models has been made. The CNN detects parts with associated part probabilities and may also provide pairwise (or part affinity) probabilities between detected parts which represent the probabilities that the detected parts are associated with the same 3D object. Pairwise probabilities may be obtained from different means. For example, in the publication "*DeeperCut: A Deeper, Stronger, and Faster Multi-Person Pose Estimation Model*" by Eldar Insafutdinov et al. (2016), a logistic regression algorithm is used.

An advantage of the CNNs is that the same running of the CNN can identify, within an input image, parts from different models, provided the CNN has been learnt with learning pictures embedding the various models to be searched.

Typically, the part probabilities generated are unary, i.e. set between 0 and 1.

These known techniques are dependent on the set of learning pictures used by the CNN to learn. To that aim, the learning pictures usually provide exemplary objects that have bounded sizes. These techniques are badly adapted to detect objects the size of which is not of the same order of magnitude than in the learning pictures. Indeed, 3D objects can be sometimes big, sometimes tiny. This is for instance the case during sport events where players move from very close to the camera to very far.

In embodiments seeking to increase robustness, it is proposed to use scaling of the same source image to increase chances to have high part probabilities.

To that end, one or more scaled versions of a given source image $13i$ are obtained.

For instance, a half-sized image (scale 0.5) is generated (through down-sampling) as well as a double-sized image (scale 2—through up-sampling). Known scaling techniques can be used.

Of course, other scaling values can be used. In this example, at least one up-scaled version and one downscaled version of the source image are obtained and used. In variants, only up-scaled versions or only downscaled versions are used.

Next, an intermediate part map is generated for the part currently considered, from each of the source image and its scaled versions. This operation is made using any of the above-mentioned known techniques. Thus, the intermediate part map comprises part probabilities for respective pixels of the source image or its scaled version (possibly each pixel if the intermediate part map has the same dimensions as the images), which part probabilities represent probabilities that the respective pixels in the source image or scaled version correspond to the part currently considered.

Pixels of the source image or of its scaled versions are examples of "samples" forming an image. For ease of illustration, it is made reference below to pixels, while the invention may apply to any sample. A sample may be for instance a pixel in the source image, a color component of a pixel in the source image, a group of pixels in the source image, a group of pixel color components in the source image, etc.

As the generated intermediate part maps are not at the same scale, they are then preferably rescaled at a unique and same scale. For instance, an intermediate part map obtained from an up-scaled source image is downscaled (using the inversed scaling factor), meaning for instance that a part probability out of 2 is discarded (for a half scaling). Also an intermediate part map obtained from a downscaled source image is up-scaled (using the inversed scaling factor), meaning for instance that a part probability for a new pixel is determined for instance from the part probabilities of neighboring pixels (e.g. through interpolation).

The obtained (rescaled at the same scale) intermediate part maps are then used to generate the part maps for said source image and the part currently considered. In particular, the part map for a given part is preferably formed with, for each pixel considered, the highest part probability from the part probabilities of the same pixel considered in the generated intermediate part maps (generated for the part considered from the source image and its scaled versions) corresponding to the part.

For instance, for a pixel $p_i(x,y)$ in the source image having corresponding head probabilities (i.e. probabilities that respective pixels correspond to a head of the model) calculated from the source image and its scaled versions, the highest probability between the head probability for $p_i$ in the head map obtained from the source image,
the head probability for $p_i$ in the head map obtained from a first downscaled version of the source image,
the head probability for $p_i$ in the head map obtained from a first up-scaled version of the source image,
so on, is selected to be the head probability associated with pixel (x,y) in the final and optimized head map output at step 452.

These operations are preferably repeated for each part forming the model 20 in order to obtain a corresponding number of optimized part maps.

Knowing the part maps $PM_i^{part}$ and the scene volume V split into elementary voxels V(X,Y,Z), the computer system 14 can generate at step 453 one or more sets of part volume data for respectively the one or more parts. In fact one set is generated for each part 21.

Step 453 aims at obtaining, for each part, a 3D space corresponding to the scene volume wherein each elementary voxels bears (for instance by its value) the probability that the collocated voxels in V belongs to said part. This probability is built from the part probabilities obtained from the various source images $13i$.

For the example of FIG. 2, thirteen 3D spaces are built (i.e. thirteen sets of part volume data).

To do so, step 453 comprises two substeps.

First, the elementary voxels V(X,Y,Z) of the scene volume are projected at step 454 onto projection pixels $p_i(x,y)$ of the part maps (which may all matches corresponding source images). FIG. 5 schematically illustrates such projection. This is a geometrical issue which depends only on the extrinsic and intrinsic parameters of each source camera $12i$, given the elementary voxels considered.

As the scale/resolution of the part maps may differ from the one of the source image, the projection may consist in projecting the voxels according to the intrinsic and extrinsic parameters of the source images/cameras and in scaling the obtained 2D coordinates according to the scaling factor.

The projection may however be direct (i.e. without scaling) if the part maps have already been interpolated/up-sampled at the same scale as the source image beforehand.

Each pixel $p_i(x,y)$ captured by the source camera i corresponds to one elementary voxel along the line Δ. All the elementary voxels of the scene volume V along this line are projected onto the same pixel. On the other way, an elementary voxel may project onto one or more pixels of the source images or part maps.

One may note that a given source camera may not view the whole scene volume V, but only a part of it, depending on how V is defined. Thus, some elementary voxels may not be projected on a projection pixel of some source images (and thus part maps). The source images on which an elementary voxel can be projected are named below "projecting images for the voxel".

Step 454 thus matches the pixels $p_i(x,y)$ of the source images $13_i$ (and thus of each part maps generated from them) with the elementary voxels V(X,Y,Z). The matching is shown as reference 405 in the Figure. A majority of pixels $p_i(x,y)$ is matched with respective sets of elementary voxels V(X,Y,Z), the number of which may vary depending on whether they are viewed by the cameras. Some pixels may be matched with few elementary voxels, even zero (if not viewed by any camera considered).

Next, using this matching, each part probability $PP_i^{part}(x,y)$ at a pixel in a part map $PM_i^{part}$ is assigned at step 455 to the elementary voxel or voxels (if any) that are projected on this pixel $p_i(x,y)$. In other words, each elementary voxel is associated with the part probabilities taken by its projection pixels in the part maps. This may be made part by part, thereby generating N 3D spaces corresponding to the N parts, wherein each elementary voxel is associated with usually M map probabilities (M being the number of cameras considered).

Next, a joint part probability $JPP_{part}(X,Y,Z)$ can be computed at step 456 for each elementary voxel V(X,Y,Z) based on these assigned part probabilities. Thus, N volumes or part volume data $PVD_{part}$ 406 can be generated for the N parts, each volume representing the distribution of probabilities that the elementary voxels belong to the respective part considered.

In one embodiment, computing the joint part probability $JPP_{part}(X,Y,Z)$ for an elementary voxel (X,Y,Z) may include dividing the sum of the part probabilities of its projection pixels in the part maps corresponding to the respective part, by the number of such part maps. It means the sum of the assigned part probabilities $PP_i^{part}(x,y)$ is computed, which sum is next divided by the number of projecting images for the voxel. This ensures the joint part probability to remain between 0 and 1.

The following of the method consists in generating one or more parts of the 3D skeleton using the one or more sets of part volume data $PVD_{part}$ so generated. These generated one or more parts thus build the 3D skeleton.

The generation comprises various steps as described now.

First, a set of part candidate or candidates is determined at step 457 from each part volume data $PVD_{part}$. Each part candidate corresponds to an elementary voxel. The determination is made based on the joint part probabilities associated with the elementary voxels. For instance, part candidate or candidates from part volume data are determined by determining local maximum or maxima of the joint part probabilities (within data $PVD_{part}$) and outputting (i.e. selecting) elementary voxel or voxels (the part candidate or candidates) corresponding to the determined local maximum or maxima.

All 3D local maximum or maxima in each part volume data $PVD_{part}$ may be selected. They identify candidates in the scene volume for the part considered.

In one embodiment, only the highest local maximum is selected or the a highest local maxima are selected (α integer>1) for instance if the maximal number a of 3D objects in the scene volume is known in advance. This makes the process less complex as only few part candidates are handled for the next steps.

In another and refining embodiment, a probability threshold can be used to keep only the 3D local maximum or maxima that are associated with joint part probabilities above said threshold. This cleans up the set of part candidates from any uncertain part candidates that would result from isolated part detection at step 452 (i.e. from few or very few source images). Consequently, the process is simplified. A probability threshold can be defined independently for each part or for a subset of parts. This is because the method used at step 452 may be more efficient to detect some parts than other parts.

In yet another embodiment, 3D local maximum or maxima that are too close (given a guard threshold) to the envelope (faces) of the scene volume V are discarded. This is to avoid processing 3D objects 11 that may not have been entirely captured (and thus possibly truncated).

At least two sets (usually N sets) of part candidate or candidates are thus obtained from respectively the part volume data corresponding to two (usually N) parts, each part candidate corresponding to an elementary voxel with an associated joint part unary probability, Next, a one-to-one association between a first part candidate (e.g. a candidate for a head) of a first candidate set and a second part candidate (e.g. a candidate for a neck) of the second candidate set is made. This is done using a graph wherein nodes correspond to the part candidates of the two sets with their associated joint part probabilities and weighted links between nodes are set.

For ease of illustration, it is considered here that the graph is built based on only two parts that are adjacent according to the 3D model 20. This is a simplification of more complex approaches which are based on graphs involving a higher number of parts. In variant, more complete graphs may thus also be used to find one-to-one associations, as explained below.

The one-to-one association requires a first step 458 of linking the part candidates one to the other. This step may take into account the adjacency between parts according to the 3D model 20, i.e. the existence of connecting element 22 in the model. For instance, a head candidate can be connected or linked to a neck candidate in the 3D model 20.

Thus, each pair of adjacent parts in the 3D model 20 may be successively considered.

In one embodiment, all part candidates for the first adjacent part are connected to each and every part candidates for the second adjacent part. This can be made through the building of a graph as introduced above. One graph is built per each pair of adjacent parts wherein the nodes correspond to the part candidates (i.e. voxels) for the two adjacent parts and a link between the nodes is created where part connection is made. Each node is thus assigned the joint part probability corresponding to the corresponding part candidate (voxel).

To reduce complexity, a link between two nodes is preferably set in the graph depending on morphological constraints defined by the 3D model between the two adjacent parts. For instance, decision to connect two part candidates (and thus corresponding nodes in the graph) may be based on a distance between the part candidates, given predefined (morphological) constraints.

The constraints may vary from one part to the other. For instance, a common head-neck distance is higher than 10 cm but less than 40 cm, a common pelvis-knee distance is higher than 20 cm but less than 80 cm, and so on.

Consequently, part candidates for two adjacent parts are thus preferably connected if their relative distance (in the 3D coordinates system SYS) meets the morphological constraints, e.g. is higher than a predefined floor threshold and/or less than a predefined ceiling threshold. The floor threshold helps distinguishing between intermingled 3D objects while the ceiling threshold helps processing separately distant 3D objects.

In a slight variant where all part candidates for the first adjacent part are first connected to each and every part candidates for the second adjacent part, the morphological constraints may be used to remove links linking two part candidates not satisfying the constraints.

Once the graphs for all pairs of adjacent parts have been obtained (steps 458 to 460 may however be performed one pair after the other), each link between two connected nodes is weighted at step 459. It means a weight is assigned to the link in the graph.

In one embodiment, a weight for such a link between two nodes corresponding to part candidates of the two sets depends on a distance between the two part candidates. In a rough approach, the inverse of the distance (as measured between the two part candidates in the 3D coordinates system SYS) is used as a weight.

Next, each graph is solved at step 460 to find the one-to-one associations between part candidates that maximize a cost or energy.

The one-to-one associations mean that, at the end, each node (for a first adjacent part) in the graph can only be linked to at most one other node (for the second part). After being solved, the graph may comprise nodes without links. This is the case for instance when the set of part candidates for the first adjacent part includes more candidates than the set for the other adjacent part in the pair.

For instance, a bipartite solving of the graph reduces to a maximum weight bipartite graph matching problem as explained for instance in "Introduction to graph theory, volume 2" by D. B. West et al. (2001). The optimal associations between the parts give portions of 3D 2D skeletons.

The energy E to maximize may be the sum of elementary energies assigned to the pairs of connected nodes respectively. Each elementary energy 'e' may be based on the joint part probabilities associated with the two nodes and on the weight of the link between the nodes:

$$E = \Sigma e$$

where for instance $e = \beta \cdot [JPP_{part-1}$ (first node)$+JPP_{part-2}$ (second node)$] + \gamma \cdot weight_{link}$ and $\beta$ and $\gamma$ are predefined parameters.

In an alternative and more efficient way, the energy can be defined as:

$$e = \beta \cdot \max\{JPP_{part-1}(\text{first node}), JPP_{part-2}(\text{second node})\} + \gamma \cdot weight_{link}$$

For instance, let consider two connected nodes in the graph corresponding to a head candidate and to a neck candidate respectively. The head candidate has a joint part probability $JPP_{head}(X_1,Y_1,Z_1)$ while the neck candidate has $JPP_{neck}(X_2,Y_2,Z_2)$. The two candidates $(X_1,Y_1,Z_1)$ and $(X_2,Y_2,Z_2)$ are 0.15 meter apart in system SYS, in which case the weight for the link between the two nodes is set to 1/0.15. Their associated elementary energy is the following in the first example of energy above:

$$e = \beta \cdot [JPP_{head}(X_1,Y_1,Z_1) + JPP_{neck}(X_2,Y_2,Z_2)] + \gamma/0.15$$

The result of step 460 is a set of one-to-one-associated part candidates (there may be a single association in the set) for each graph (i.e. for each pair of adjacent parts according to the 3D model 20). Indeed, the above steps of determining 457 part candidates and of obtaining 458-460 one-to-one associations steps are repeated for the plurality of pairs of adjacent parts.

The above description of step 460 is based on a one-to-one graph simplification between adjacent part candidates. Some alternatives to this graph simplification are possible.

For example, it is possible to construct a complete graph/tree between each head candidates and each right hand candidates passing through the neck candidates, right shoulder candidates and right elbow candidates. This tree can be segmented in a second step into independent sub-trees, each sub-tree defining a unique path between adjacent skeletons parts. The construction of the sub-tree can be viewed as a graph segmentation.

A global solution of this segmentation is the one that maximizes the total energy of the independent sub-trees.

This process of segmentation/subtree generation can be repeated for three other complete trees between respectively head candidates and right foot candidates (passing through intermediary parts), head candidates and left hand candidates, and head candidates and left foot candidates. More generally, if the 3D model has P ending parts, P-1 complete trees may be built and then solved.

The final steps consist in selecting one-to-one-associated part candidates so obtained as parts of the final 3D skeleton.

Preferably one-to-one-associated final 3D part candidates of two or more pairs of adjacent parts are connected to obtain 3D skeleton candidate or candidates. This is step 461 of building 3D skeleton candidates.

A connected component algorithm can be used. The final 3D part candidates common to two (or more) obtained associations make it possible to progressively build a 3D skeleton candidate.

This idea is merely to use each graph output to parse (thus build) the candidates 3D skeleton.

The output of a first graph is selected from which the one-to-one associations (of 3D adjacent part candidates) are successively considered. Given an associated pair of 3D adjacent part candidates, the outputs of the other graphs (preferably those involving one of the parts previously considered) are used to determine whether or not these adjacent part candidates are also one-to-one associated with other 3D part candidates. In the affirmative, the various 3D part candidates are put together in the same data structure in memory, which progressively forms a 3D skeleton candidate. And so on.

To illustrate this process still using the model of FIG. 2, let consider a first association between a head candidate (voxel or "point" P1 in the scene volume) and a neck candidate (voxel or "point" P2 in the scene volume). This association results from the solving of the head-neck graph. The solved left-shoulder-neck graph is used to determine whether an association between the same neck candidate (P2) and a left-shoulder candidate exist. In the affirmative (voxel or "point" P3 in the scene volume for the left-shoulder candidate), points P1, P2, P3 are put together in a candidate structure. And so on with the left-elbow-left-shoulder graph, left-hand-left-elbow graph, right-shoulder-neck graph, pelvis-neck graph, and so on . . . . At the end, at most thirteen points P1-P13 in the 3D space may have been found which form an entire 3D skeleton candidate.

A second association between a head candidate and a neck candidate may produce a second 3D skeleton candidate, be it entire (if all the graphs provide a new point) or not.

It turns that one or more (entire or partial) 3D skeleton candidates are formed. A 3D skeleton candidate may be made of a single isolated one-to-one association between two part candidates or of few associations.

In the graph segmentation approach described above where P-1 complete trees are built and then solved, the final stage may consist in merging together the four (more generally P-1) sub-trees (if any) sharing the same candidate for starting end part (here for instance the head). This also provides a 3D skeleton candidate for each occurrence of an end part (e.g. head, hand, foot) of the 3D model.

From these 3D skeleton candidates obtained, one 3D skeleton candidate may be selected as a 3D skeleton of the 3D object 11. This is step 462. Of course, if a plurality of 3D objects having the same 3D model 20 is present in the scene volume, a plurality of 3D skeleton candidates is selected as 3D skeletons for these objects. The number of 3D skeleton candidates to be selected can be known in advance. However, some applications may not know such number.

Apart from such known number, various criteria may be used alternatively or in combination to select the 3D skeleton candidates. The criteria increase the relevancy of the selection (i.e. the selected candidates correspond to existing objects in the scene volume).

A first exemplary criterion is a number of parts forming the 3D skeleton candidate according to the 3D model. One easily understands that a more complete skeleton candidate is a better candidate than a more partial skeleton candidate. Thus, preferably, the number should be above a predefined threshold (e.g. 9 out of 13 in the case of FIG. 2) to select (or keep) the 3D skeleton candidate. This is to avoid having too partial 3D skeletons, and it automatically discards the isolated one-to-one associations (or the 3D skeleton candidates made of few associations). This first criterion is similar to a number of connecting elements in the 3D skeleton candidate. In a variant, the 3D skeleton candidate or candidates with the higher number of parts are selected.

A second criterion is the joint part probabilities associated with the nodes of the 3D skeleton candidate in the graph or graphs. Again, one easily understands that the highest the joint part probabilities, the more accurate the 3D skeleton candidate. Thus, a sum of these probabilities should preferably be above a predefined threshold to select (or keep) the 3D skeleton candidate. This discards the 3D skeleton candidates that are based on uncertain part detections from the source images.

A third exemplary criterion is the weights set for the links between the nodes of the 3D skeleton candidate in the graph or graphs. For instance, a sum of these weights should be above a predefined threshold to select (or keep) the 3D skeleton candidate. This criterion may be additional to the first one, since such weight sum is strongly impacted by the number of parts (the fewer the number of parts and thus of links, the few the number of weights to be summed).

A fourth criterion is the visibility of the 3D skeleton candidate by the source cameras $12i$. Such visibility can be expressed as the number of projecting images for the voxels composing the candidate, i.e. the number of source images onto which the 3D skeleton candidate can be projected. For instance, such number (or visibility) should be above a predefined number, e.g. half the number of source cameras, to select (or keep) the 3D skeleton candidate.

Some applications may require that the 3D skeleton or skeletons obtained at step 462 (thus generated using the process of the Figure) be displayed, for instance using the display screen 15. A 2D or 3D image of the 3D object or objects can thus be generated using the obtained 3D skeleton or skeletons.

Figure 6:
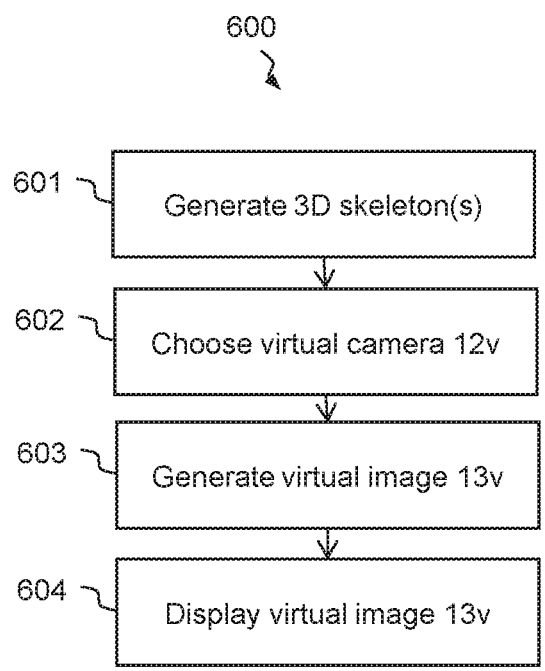
FIG. 6 illustrates, using a flowchart, a process for displaying a 3D skeleton of a 3D real world object observed by source cameras in a scene volume according to embodiments.

FIG. 6 illustrates, using a flowchart, such a process 600 for displaying a 3D skeleton of one or more 3D real world objects observed by source cameras. This is an exemplary application using the generated 3D skeleton.

Step 601 corresponds to generating a 3D skeleton of the 3D real world object using the teachings of the approach used, e.g. using the process of FIG. 4.

Step 602 consists in selecting a virtual camera $12v$. Such camera does not actually exist. It is defined by a set of extrinsic and intrinsic parameters chosen by the user. These parameters define from which viewpoint, at which distance and with which focal (i.e. zoom) the user wishes to view the scene.

Using these parameters of the virtual camera, the virtual image $13v$ can be computed at step 603. This step merely consists in projecting the 3D skeleton or skeletons located in the 3D space onto a virtual empty image defined by the parameters of the virtual camera.

Next, the built virtual image $13v$ is displayed on the display screen 15 at step 604.

Steps 603 and 604 ensure the display on a display screen of the generated 3D skeleton from the viewpoint of the virtual camera.

Figure 7:
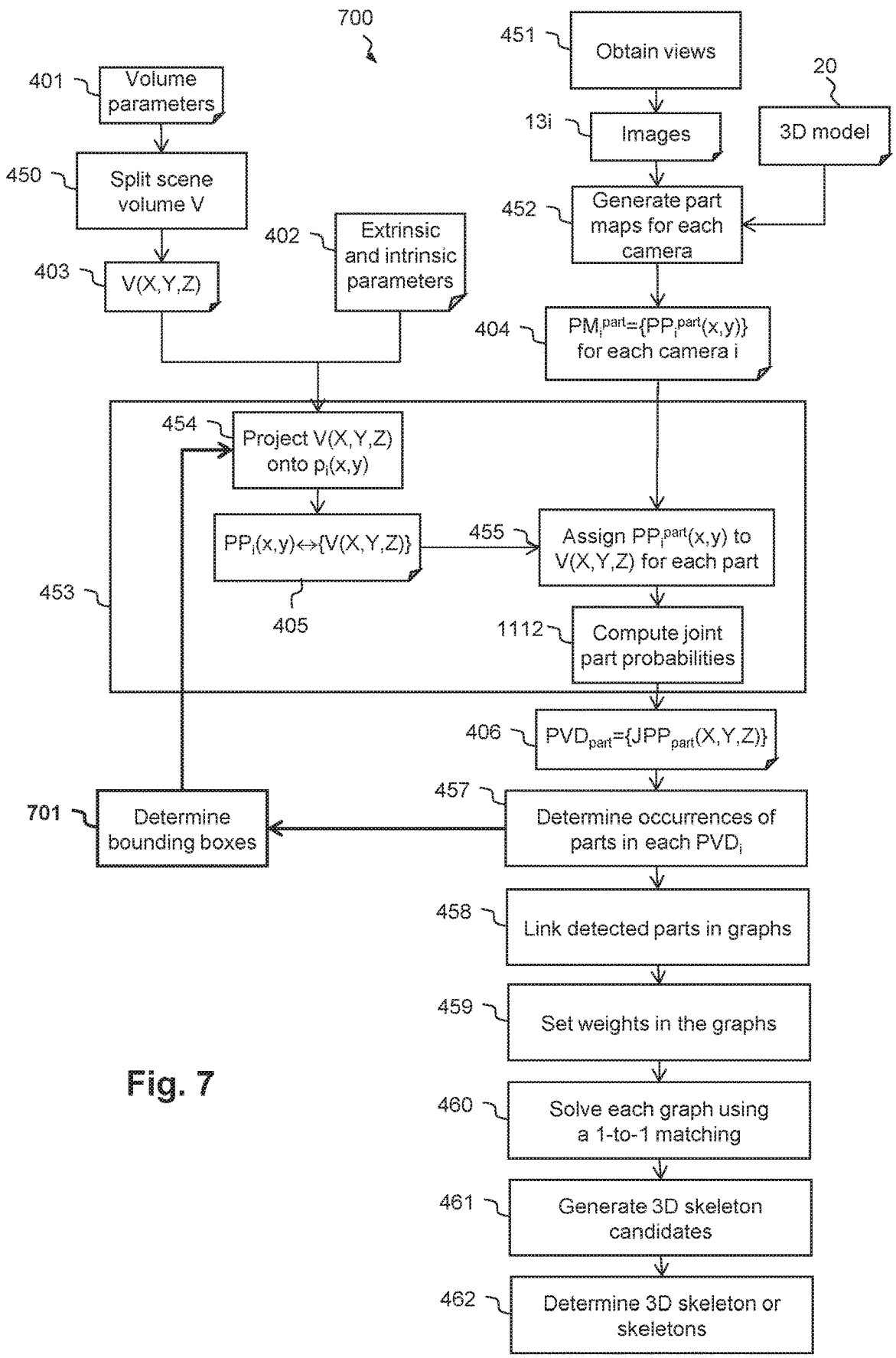
FIG. 7 illustrates, using a flowchart, second embodiments of a 3D skeleton generating method according to the first approach.

FIG. 7 illustrates, using a flowchart, second embodiments, which improve the first embodiments described above, of a method according to the first approach. Similar references are used between FIGS. 4 and 7 for the same steps or data.

In step 454 of FIG. 4, the elementary voxels $V(X,Y,Z)$ of the scene volume are projected onto projection pixels $p_i(x,y)$ of the part maps (which may match in size their respective source image or not). The number of projections may be very high since it depends on the number of elementary voxels forming the scene volume (which may be huge to cover e.g. a sport field in stadium) and on the number of part maps, i.e. on the number of source images $13i$ (tens of cameras may be used), on the number of 3D models 20 to be found and on the number of parts 21 forming each 3D models 20.

The process 700 of FIG. 7 aims at substantially reducing this number of projections, thereby reducing computational costs of the method.

The improvement relies on the following idea: using a first set of part volume data, i.e. $PVD_{head}$ 406 for instance, to restrict an amount of elementary voxels to be projected (during step 454) on part maps (generated for a second part, e.g. neck) to generate 453 a second set of part volume data, $PVD_{neck}$ for instance. In fact, the processing of the first set of part volume data $PVD_{head}$ makes it possible to identify parts candidates and thus to roughly define sub-volumes around these part candidates as locations where the 3D objects are located. It is inferred from the output of the processing that the remainder of the scene volume (thus excluding the sub-volumes) is deprived of 3D objects.

In practice, the process of FIG. 4 can be done for a first part (let say the head) up to step 457 (i.e. from step 450 to 457) where part candidates of the 3D real world object are determined from the first set of part volume data $PVD_{head}$. In a slight variant which further reduces complexity, this first set of part volume data $PVD_{head}$ may be generated using large elementary voxels (for step 454), for instance by grouping several elementary voxels, typically a cube of $x^3$ elementary voxels (x integer). In that case, the same set of part volume data $PVD_{head}$ can be recomputed later on based on the restricted amount of elementary voxels as described below.

Next, bounding 3D boxes are defined at step 701, around the determined part candidates in the scene volume. For instance, the bounding box may be defined based on a predefined maximum size of the 3D objet. The bounding box may be centered on a determined part candidate. The bounding box may be a cuboid or a cube whose edges are at least twice the predefined maximum size. This ensures any 3D object to which the determined part candidate (i.e. voxel) belongs to be encompassed by the bounding box.

In one specific embodiment, bounding boxes that overlap each other are merged into a new bounding box. In that case, the smallest cuboid comprising the overlapping bounding boxes may be chosen. The merging process is iterative, meaning that a new bounding box resulting from a merger can be subject to another merger with another bounding box. A number of iterations may be predefined to avoid too long processing. Alternatively, it may not be limited, in which case iterative mergers may ends to a bounding box having the size of the scene volume, in case enough 3D objects are spread over the whole volume.

Once the bounding boxes are known, the part volume data $PVD_{part}$ for the other parts (but also for the same first part in case large elementary voxels were used at step 454) are generated using only the elementary voxels of the bounding boxes for projecting step 454. In other words, the amount of elementary voxels to be projected on the part maps to generate a second set of part volume data is restricted to the defined bounding boxes.

As a projection is only made from the elementary voxels of the bounding boxes, a joint part probability is computed at step 456 (for each part considered) only for this subset of elementary voxels and the obtained sets of part volume data $PVD_{part}$ only have information in the bounding boxes.

The remainder of the process (steps 458 to 462) remains unchanged.

However, an advantageous embodiment is proposed when no bounding box overlap or intersect another one, which may be obtained after having merged bounding boxes. As the bounding boxes are spatially distinct one from the other, their processing can be made independently.

This means that, once the bounding boxes are known, steps 454 to 462 can be made on a single bounding box at the same time. One or more 3D skeletons are obtained from each bounding box. This approach saves memory consumption as the amount of data to process and store at a given time is substantially reduced (because each bounding box is processed separately).

Figure 8:
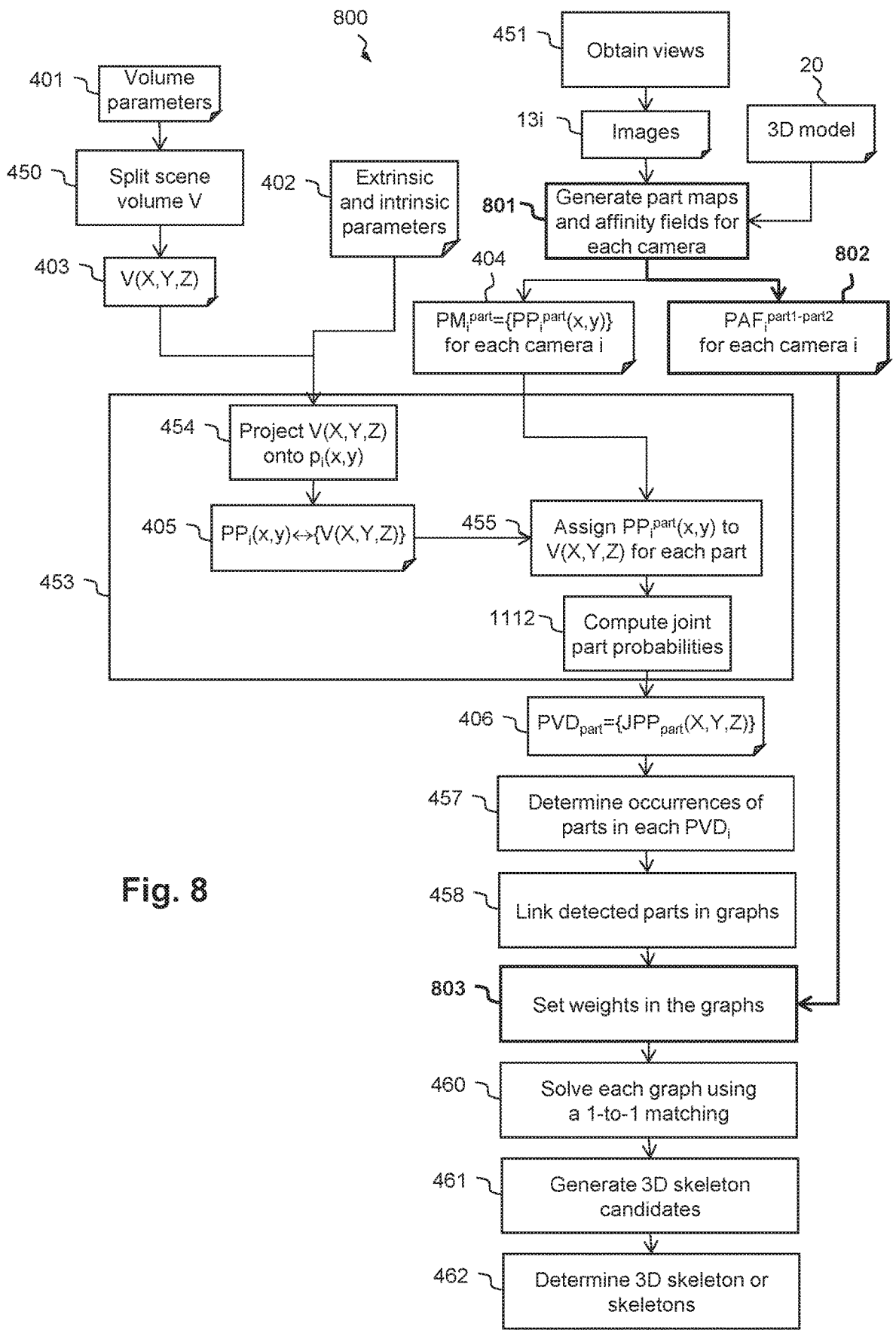
FIG. 8 illustrates, using a flowchart, third embodiments of a 3D skeleton generating method according to the first approach.

FIG. 8 illustrates, using a flowchart, third embodiments, which improve the first or second embodiments described above, of a method according to the first approach. Similar references are used between FIGS. 4 (or 7) and 8 for the same steps or data.

As described above (FIG. 4), the weights set for the links connecting two nodes (i.e. part candidates for two adjacent parts) may be the inverse of the distance between the two part candidates in the 3D space or coordinates system SYS. The sole use of the distance to weigh the links proves to be efficient to identify 3D skeletons for distant 3D objects but quite insufficient to identify 3D skeletons for intermingled 3D objects. To improve detection of the 3D objects, the third embodiments of the first approach propose to use part affinity fields PAFs to adjust the weights of the links in the graphs before the latter are solved at step 460.

Part affinity fields are known for instance from above-cited publication "*Realtime Multi-Person 2D Pose Estimation using Part Affinity Fields*". One part affinity field is generated for each pair of adjacent parts (according to the 3D model 20) and from each source image 13*i*. It is generated by the same CNN as the one used at step 452.

Similar to the part maps, a part affinity field may have the same dimensions as the source image or reduced dimensions in which case it may be upscaled to recover the same dimensions.

In detail, a part affinity field for the two adjacent parts (e.g. right foot and right knee) includes affinity vectors for respective pixels of the source image, the magnitude and direction of each affinity vector representing estimated orientation probability and orientation of an element connecting, according to the 3D model, two occurrences of said adjacent parts at the respective pixel in the source image. According to the training base used to generate the CNN, the maximal magnitude may be limited to 1.

The resolution of the part affinity fields is usually at a lower resolution than the source images. It is possible to up-sample the part affinity field to the same resolution as the source image. In such a case, an up-sampled part affinity field for the two adjacent parts (e.g. right foot and right knee) includes an affinity vector per each pixel of the source image, the magnitude and direction of each affinity vector representing estimated orientation probability and orientation of an element connecting, according to the 3D model, two occurrences of said adjacent parts at said pixel in the source image.

This up-sampling is however optional.

Figure 9:
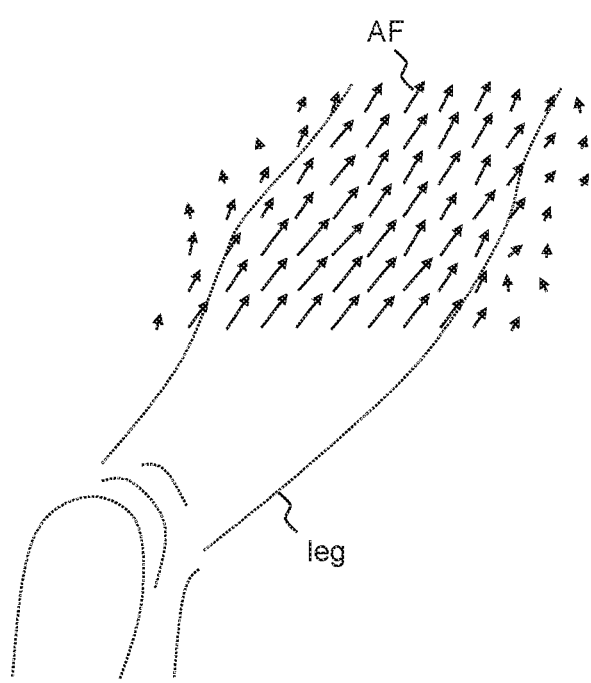
FIG. 9 schematically illustrates a portion of a part affinity field PAF between right foot and right knee in a source image.

FIG. 9 schematically illustrates a portion of a part affinity field PAF between right foot and right knee in a source image (the leg of the source image is schematically traced in dot line to show the correspondence with the affinity vectors AV). The affinity vectors of the lower part of the leg are not shown for clarity reason.

The directions of the affinity vectors show the estimated orientation of a connecting element between the two parts considered (i.e. here the estimated orientation of the leg).

The lengths of the affinity vectors show the confidence in the orientation estimation at each pixel. The longer the AVs (with a length limited to one pixel), the more certain their orientations are.

The knowledge of orientations with high probabilities (AVs with long modulus close to 1) gives relevant information on how to connect two 2D part candidates. To do so, the pairwise probability between the two 2D part candidates is calculated based on the generated part affinity field, for instance based on affinity vectors located between the two 2D part candidates in the generated part affinity field.

This can be used to favor some 1-to-1 matching when solving the graph. This is the idea of the process of FIG. 8.

As shown in FIG. 8, step 452 is replaced by step 801 where both part maps 404 (for each part of the 3D model 20) and part affinity fields 802 (for each pair of adjacent parts in the 3D model 20) are generated from each source image 13*i*.

With the example of FIG. 2, thirteen part maps and twelve part affinity fields are generated from each source image.

Steps 453 to 458 are similar to FIG. 4 or 7.

Next, at step 803, the weights set for the weighted links are based on the generated part affinity fields 802. For instance, the weight of a link connecting a first-part (e.g. right foot) candidate and a second-part (e.g. right knee) candidate in the graph is set based on the PAFs related to both adjacent first and second parts and obtained from the source images at step 801.

As it is sought to favor the pairs of first-part candidate and second-part candidate that are arranged along the same orientation as the most probable affinity vectors, the weight to be used for the link between the two candidates can be based on a scalar product between the vector formed by the two candidates and the affinity vectors. As the affinity vectors are within a 2D image, the vector formed by the two candidates can be projected onto each PAF to perform the scalar product.

In this context, it is proposed to:

project the first and second part candidates onto a generated part affinity field, and compute the weight (for the link between the two candidates) based on affinity vectors located between the two projected part candidates in the generated part affinity field.

If the scale/resolution of the part affinity field differs from the one of the source image (e.g. if no up-sampling has been conducted), the projection consists in projecting the 3D candidates according to the intrinsic and extrinsic parameters of the source images/cameras and in scaling the obtained 2D coordinates according to the scaling factor.

The projection can be direct if the part affinity fields have been interpolated/up-sampled at the same scale as the source image.

The affinity vectors to be considered may be along the segment formed by the two candidates, in particular the closest ones. For instance, the known Bresenham's line algorithm can be used to determine which pixels (and thus associated affinity vector) to parse along this segment.

The projection and computation are preferably repeated for all the generated part affinity fields concerning the same two adjacent parts. Of course, the same process is repeated for the other pairs of adjacent parts.

In practice, the scalar products of the vector formed by the two projected part candidates and each of the affinity vectors located between the two projected part candidates (thus identified by the Bresenham's line algorithm) can be computed (to obtain elementary link weights), and then summed. The sum can then be normalized by dividing it with the modulus of the vector formed by the two projected part candidates (i.e. the projected distance between the two candidates).

It turns that a scalar product result for the two candidates is obtained from each part affinity field (i.e. at most twelve results are obtained for 3D model 20). The results may then be summed to obtain a final weight which is assigned to the link between these two candidates in the graph concerned.

Figure 10:
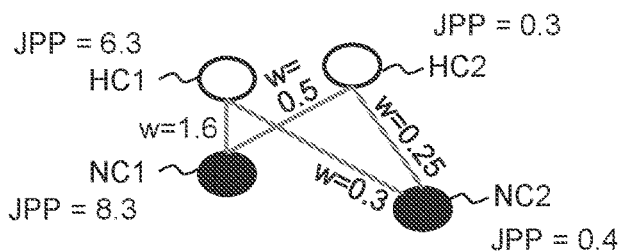
FIG. 10 schematically illustrates scalar products to compute weights for graph links according to embodiments of the first approach.
Figure 10:
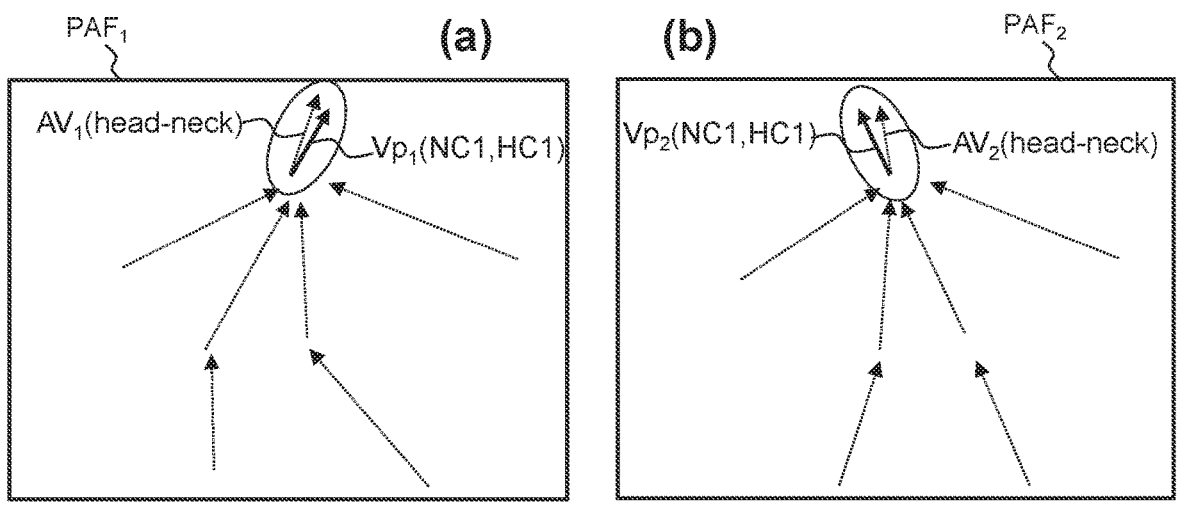
Figure 10:
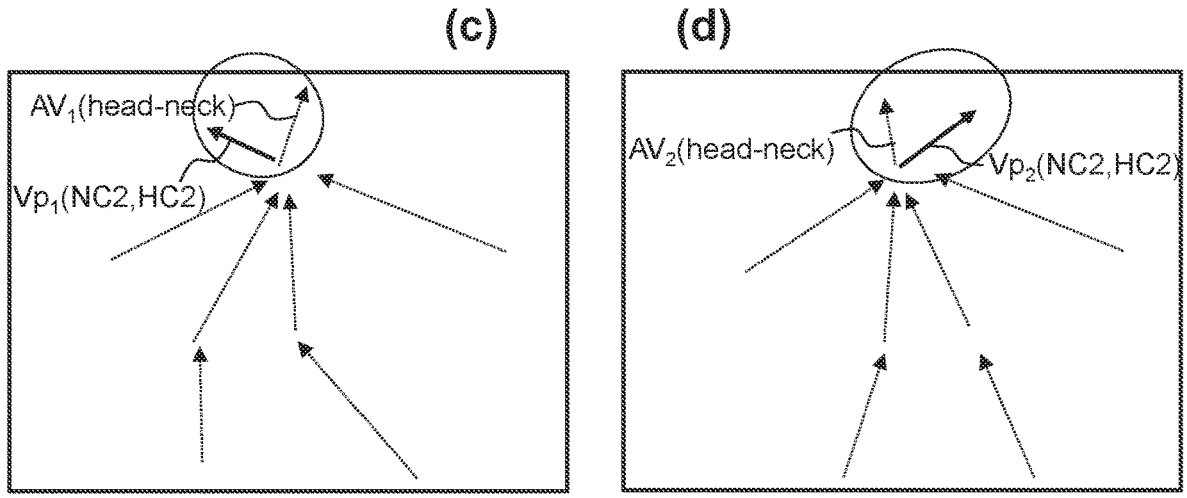

FIG. 10 schematically illustrates these scalar products in the process of solving a graph related, in the example shown, to the head and the neck as two adjacent parts. For ease of illustration, a single affinity vector is shown in dotted arrow for the head-neck connecting element in the affinity field maps instead of a plurality of shown in FIG. 9. Single affinity vectors (still in dotted arrows) for other connecting elements are also shown to illustrate an entire human being.

On top of the Figure, a simplified graph is shown with two head candidates HC1 and HC2 (white dots) and two neck candidates NC1 and NC2 (black dots). Each part candidate is associated with a joint part probability (JPP) and links between the part candidates (given morphological constraints) are shown. The weight of these links is computed based on the part affinity fields shown in the below part of the Figure. While only two PAFs, $PAF_1$ and $PAF_2$, are shown (for ease of illustration), a higher number can be used.

As far as the first link (NC1, HC1) is concerned, the two candidates are first projected onto $PAF_1$ resulting in a projected vector $Vp_1$(NC1,HC1) shown in plain arrow in (a). The normalized sum of the scalar products of $Vp_1$(NC1, HC1) with each affinity vector of $PAF_1$ located between the two projected candidates (here a single affinity vector $AV_1$ (head-neck) is shown) gives a value for instance of 0.9. The elementary weight for link HC1-NC1 and $PAF_1$ is thus 0.9.

For the same link (NC1, HC1), the two candidates are projected onto $PAF_2$ resulting in a projected vector $Vp_2$ (NC1,HC1) shown in plain arrow in (b). The normalized sum of the scalar products of $Vp_2$(NC1,HC1) with each affinity vector of $PAF_2$ located between the two projected candidates (here a single affinity vector $AV_2$(head-neck) is shown) gives a value for instance of 0.7. The elementary weight for link HC1-NC1 and $PAF_2$ is thus 0.7.

If more PAFs are available, the same calculation is done for each of them.

Next, the elementary link weights for link HC1-NC1 are all summed. Here, only two elementary weights are summed, giving a weight for link HC1-NC1 equal to 0.9+0.7=1.6.

The same can be done for a second link (NC2, HC2). The candidates are projected onto $PAF_1$ as shown in (c). The normalized sum of the scalar products between $Vp_1$(NC2, HC2) and each affinity vector (here $AV_1$ (head-neck)) gives an elementary weight for link HC2-NC2 and $PAF_1$ equal to 0.1.

The candidates are also projected onto $PAF_2$ as shown in (d). The normalized sum of the scalar products between $Vp_2$(NC2,HC2) and each affinity vector (here $AV_2$(head-neck)) gives an elementary weight for link HC2-NC2 and $PAF_2$ equal to 0.15.

Their sum gives a weight for link HC2-NC2 equal to 0.1+0.15=0.25.

The same is performed (not shown) for link HC1-NC2 and link HC2-NC1. Let assume a weight calculated for link HC1-NC2 is 0.3 and a weight calculated for link HC2-NC1 is 0.5.

All the calculated weights are shown in the graph on top of the Figure.

Back to FIG. 8 after step 459, the remainder of the process (solving of the graphs and building the 3D skeletons) remains unchanged.

The graph solver for step 460 uses the weights calculated above. The energy to maximize is:

$$E=\Sigma e, \text{ where } e=\beta\cdot[JPP_{part-1}(\text{first node})+JPP_{part-2}(\text{second node})]+\gamma\cdot weight_{link}$$

For the exemplary graph of FIG. 10, $\beta=0.4$ and $\gamma=0.5$ are chosen, which give the following elementary energies for the pairs of part candidates:

$$e_{HC1-NC1}=6.6$$

$$e_{HC1-NC2}=2.8$$

$$e_{HC2-NC1}=3.7$$

$$e_{HC2-NC2}=0.4$$

Maximal energy is obtained by keeping links HC1-NC1 and HC2-NC2. Only 1-to-1 associations remain (here two).

However, the energy of HC2-NC2 may be considered too low to represent an actual portion of a 3D object. Thus, if a threshold is applied, HC2-NC2 can also be discarded, and only HC1-NC1 is kept as an output 1-to-1 association between part candidates.

Various embodiments of the second approach are now described with reference to FIGS. 11 to 19.

Figure 11:
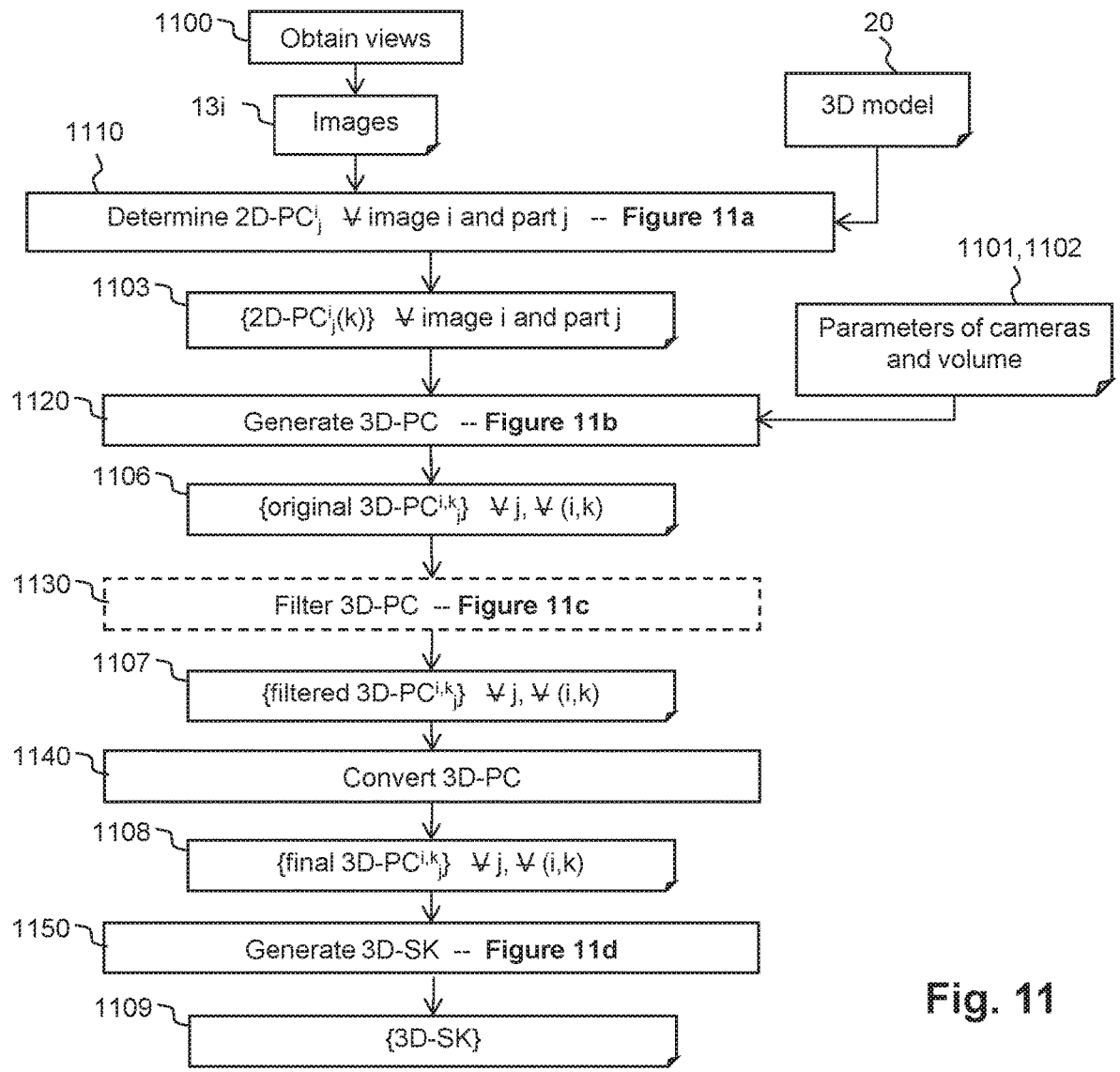
FIG. 11 illustrates, using a flowchart, embodiments of a method for generating a 3D skeleton of a 3D real world object observed by source cameras according to embodiments of the second approach.

FIG. 11 illustrates, using a flowchart, embodiments of a method according to the second approach. This method has a similar context for execution than the method of FIG. 4 described above.

In execution, the method starts with the obtaining 1100 of a plurality of simultaneous source images of the 3D objects or of the scene volume recorded by the source cameras. The source images 13*i* are for instance retrieved from the reception buffer of the communication interface 302.

Although the sources images may have different sizes from one source camera to the other, it is assumed they have the same size for illustration purposes. In any case, a resizing of some source images may be processed to be in such situation. This resizing is not mandatory but helps in simplifying the description.

From each of these source images 13*i*, one or more sets of 2D part candidate or candidates 2D-$PC^i_j(k)$ 1103 are determined at step 1110 for one or more respective parts 21$_j$ of the 3D real world object (e.g. head, left hand, . . . of a human-like object). Each 2D part candidate 2D-$PC^i_j(k)$ corresponds to a sample (e.g. pixels) of the corresponding source image. Such determination is based on the 3D model or models 20 to detect each part of them (or at least the maximum number of such parts) within each source image. Several occurrences of the same model can be detected within the same source image, meaning several 3D real world objects are present in the scene captured by the cameras.

In the example of FIG. 2, the detected 2D skeletons are made of up to thirteen parts with up to twelve connecting elements.

Known techniques can be used to produce these 2D skeletons from the source images 13*i*, as introduced above with respect to FIG. 4: the one described in publication "*Realtime Multi-Person 2D Pose Estimation using Part Affinity Fields*" by Zhe Cao et al. (2016), the one described in publication "*DeeperCut: A Deeper, Stronger, and Faster Multi-Person Pose Estimation Model*" by Eldar Insafutdinov et al. (2016) or publication "*Deep-Cut: Joint Subset Partition and Labelling for Multi Person Pose Estimation*" by Leonid Pishchulin et al. (2016), or more generally, a convolutional neural network (CNN).

In particular, the CNN detects parts with associated part probabilities and may also provide pairwise (or part affinity) probabilities between detected parts which represent the probabilities that the detected parts are associated with the same 3D object. Pairwise probabilities may be obtained from different means. For example, in the publication "*DeeperCut: A Deeper, Stronger, and Faster Multi-Person Pose Estimation Model*" by Eldar Insafutdinov et al. (2016), a logistic regression algorithm is used.

An advantage of the CNNs is that the same running of the CNN can identify, within an input image, parts from different models, provided that the CNN has learnt using learning pictures embedding the various models to be searched.

Typically, the part probabilities generated are unary, i.e. set between 0 and 1.

The technique described in publication "*Realtime Multi-Person 2D Pose Estimation using Part Affinity Fields*" calculates confidence maps for part detection and part affinity fields for part association.

A confidence map or "part map" for a given part bears probabilities for respective pixels of the source image that these pixels correspond to said part of the 3D model 20. Each part affinity fields defined for a connecting element (or limb) between two adjacent parts provides affinity vectors for respective pixels of the source image, the magnitude and direction of each affinity vector representing estimated orientation probability and orientation of the limb connecting, according to the 3D model, two occurrences of said adjacent parts at the respective pixel in the source image.

The part maps and part affinity fields may have a different size/resolution from the source images (e.g. they are sub-sampled compared to the size of the source image). In such a case, the intrinsic parameters of the cameras can be modified taking into account the sub-sampling factor. In a variant, the part maps or part affinity fields may be interpolated in order to match the genuine size of the source images. In such a case, a bilinear interpolation is preferred over a nearest-neighbor or bi-cubic interpolation.

The part maps can be processed to obtain part candidates for each part type. In this process, each part candidate can be provided with a part probability. In other words, this technique generates, from each source image, one or more part maps for one or more respective parts of the 3D real world object, each part map for a given part comprising part probabilities for respective samples (e.g. pixels) of the source image representing probabilities that the respective samples correspond to the given part, and then the technique determines sets of 2D part candidate or candidates from respectively the part maps.

The other technique described in publication "*DeeperCut: A Deeper, Stronger, and Faster Multi-Person Pose Estimation Model*" or publication "*Deep-Cut: Joint Subset Partition and Labelling for Multi Person Pose Estimation*" is different. However, part candidates with associated part probabilities and (local and global) pairwise probabilities between all parts are still determined.

It turns out that step 1110 generates a plurality of sets of 2D part candidates 2D-$PC^i_j(k)$ (where "i" identifies the source images, "j" the 3D object part concerned and "k" indexes the various 2D part candidates identified for given i and j). Each 2D part candidate is thus defined by a 2D position (the pixel concerned), a part type (defining which part of the 3D object it corresponds to) and a part probability.

FIG. 11a illustrates, using a flowchart, exemplary operations forming step 1110 when applied to a given source image 13$i$. The flowchart can thus be repeated for each of the source images 13$i$.

The known techniques described above are dependent on the set of learning pictures used by the CNN to learn. To that aim, the learning pictures usually provide exemplary objects that have bounded sizes. These techniques are badly adapted to detect objects the size of which is not of the same order of magnitude than in the learning pictures. Indeed, 3D objects can be sometimes big, sometimes tiny. This is for instance the case during sport events where players move from very close to the camera to very far.

In embodiments seeking to increase robustness, it is proposed to use scaling of the source image to increase chances to have high part probabilities in a similar fashion as described above with reference to FIG. 4.

One or more scaled versions of a given source image 13$i$ are obtained at step 1111.

Next, an intermediate part map is generated at step 1112 for each part considered, from each of the source image and its scaled versions.

The obtained (rescaled at the same scale) intermediate part maps are then used to generate at step 1113 the part maps for said source image and the part currently considered. In particular, the part map for a given part $21_j$ is preferably formed with, for each pixel considered, the highest part probability from the part probabilities of the same pixel considered in the generated intermediate part maps (generated for the part considered from the source image and its scaled versions) corresponding to part $21_j$.

These operations are preferably repeated for each part forming the model 20 in order to obtain a corresponding number of optimized part maps.

Next, from these optimized part maps, the 2D part candidates can be determined at step 1114. One set of 2D part candidate or candidates 2D-$PC^i_j(k)$ is obtained from each part map (i.e. for each object part).

Each 2D part candidate corresponds to a pixel in the source image. The determination is made based on the part probabilities associated with each pixel in the part maps. For instance, 2D part candidate or candidates from an optimized part map are determined by determining local maximum or maxima of the part probabilities in the part map and outputting (i.e. selecting) the pixel or pixels corresponding to the determined local maximum or maxima as 2D part candidate or candidates.

All 2D local maximum or maxima in each part map may be selected. They identify 2D candidates in the source image for each part considered.

In one embodiment, only the a highest local maxima are selected (a integer 1). This makes the process less complex as only few 2D part candidates are handled for the next steps.

In another and refining embodiment, a probability threshold can be used to keep only the local maximum or maxima that are associated with part probabilities above said threshold. This cleans up the set of 2D part candidates from any uncertain part candidates that would result from isolated part detection at step 1110 (i.e. from few or very few source images). Consequently, the process is simplified. A probability threshold can be defined independently for each part or for a subset of parts. This is because the method used at step 1110 may be more efficient to detect some 2D parts than other parts.

A variant to the flowchart of FIG. 11a may simply involve generating the part maps from the source images and determining the local maxima as 2D part candidates from the part maps, without using scaled versions.

Back to FIG. 11, once the sets of 2D part candidates 2D-PC$^i_j$ (k) 1103 are known (one set per each source image 13$i$ and per each object part 21$_j$), step 1120 consists in generating, in 3D space, 3D part candidates from the 2D part candidates, this is made using the parameters 1101,1102 of the cameras 12$i$ and of the scene volume V, if any.

FIG. 11$b$ illustrates, using a flowchart, exemplary operations forming step 1120 according to embodiments. The flowchart uses as input two sets of 2D part candidates 1103 corresponding to the same object part 21$_j$, i.e. the 2D part candidates obtained from two different source images for the same part 21$_j$. It outputs 3D part candidates.

It aims at matching, as many times as possible (i.e. by repeating the matching operation), two 2D part candidates from respectively the two sets of 2D part candidates: a 2D part candidate of one set is matched with a 2D part candidate of the other set. 3D part candidates are then generated from respective pairs of matched 2D part candidates: each matching pair produces a 3D part candidate.

The operations of the flowchart are thus repeated for a plurality of parts 21$_j$ with the same pair of source images, preferably for each part 21$_j$. Next, the same operations are preferably repeated for a plurality of pairs of source images, preferable for all possible pairs or for all pairs of a circular pairing of the source images (each image being paired with only a previous one and a next one).

As shown in FIG. 11$b$, the matching, referenced 1121, may include using and solving a graph to obtain one or more one-to-one associations between a 2D part candidate of a first one of the sets (i.e. from a first source image) and a 2D part candidate of the second set (i.e. from a second source image), wherein nodes of the graph correspond to the 2D part candidates of the two sets and weighted links between nodes are set based on a part distance determined between the corresponding 2D part candidates.

The part distances between a first 2D part candidate of a first one of the two sets and respectively 2D part candidates of the second set are calculated at step 1122. Each 2D part candidate of the first set is processed to obtain part distances between each pair of 2D part candidates from the two sets.

Figure 12:
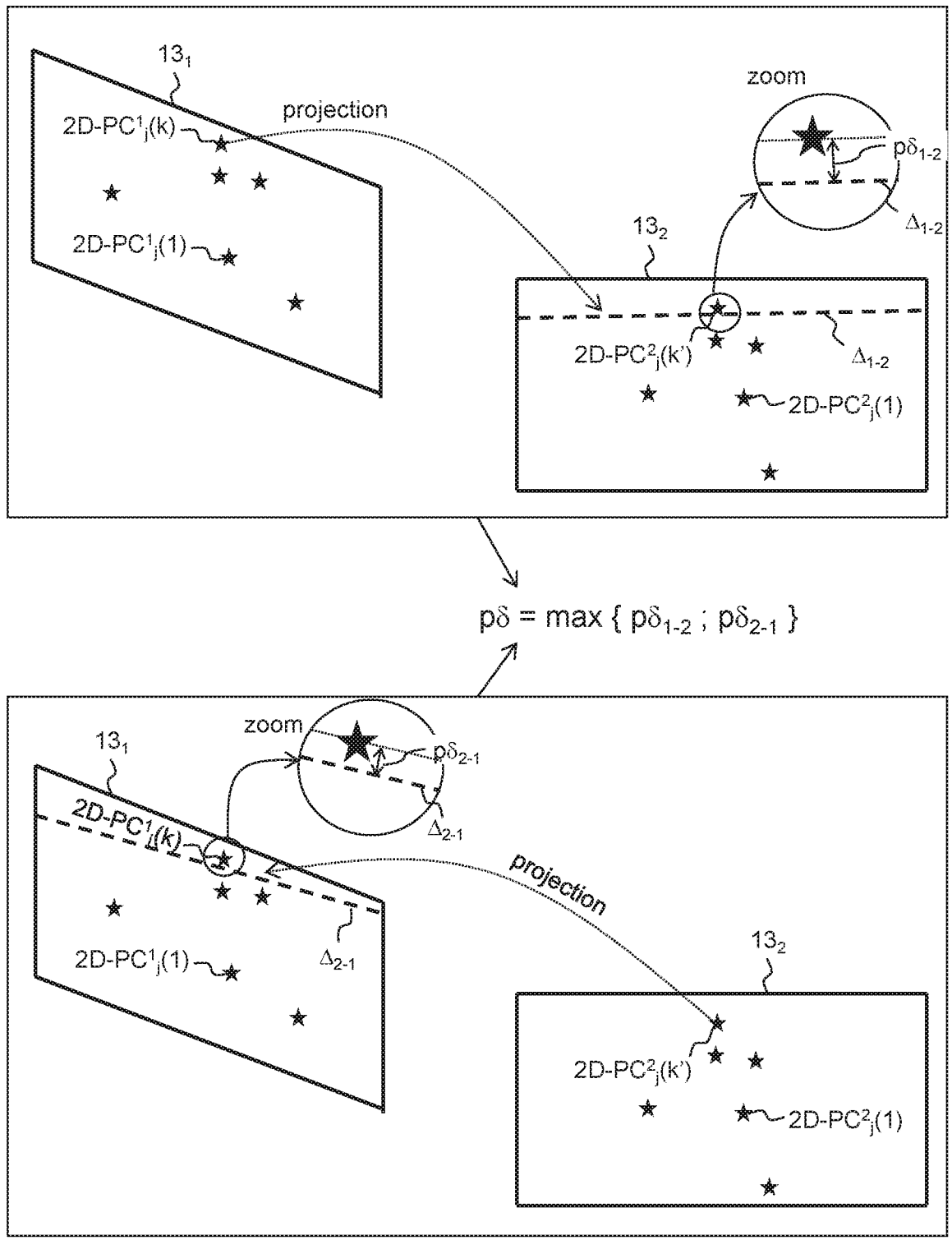
FIG. 12 schematically illustrates a way to compute a part distance between two 2D part candidates according to embodiment of the second approach.
Figure 13:
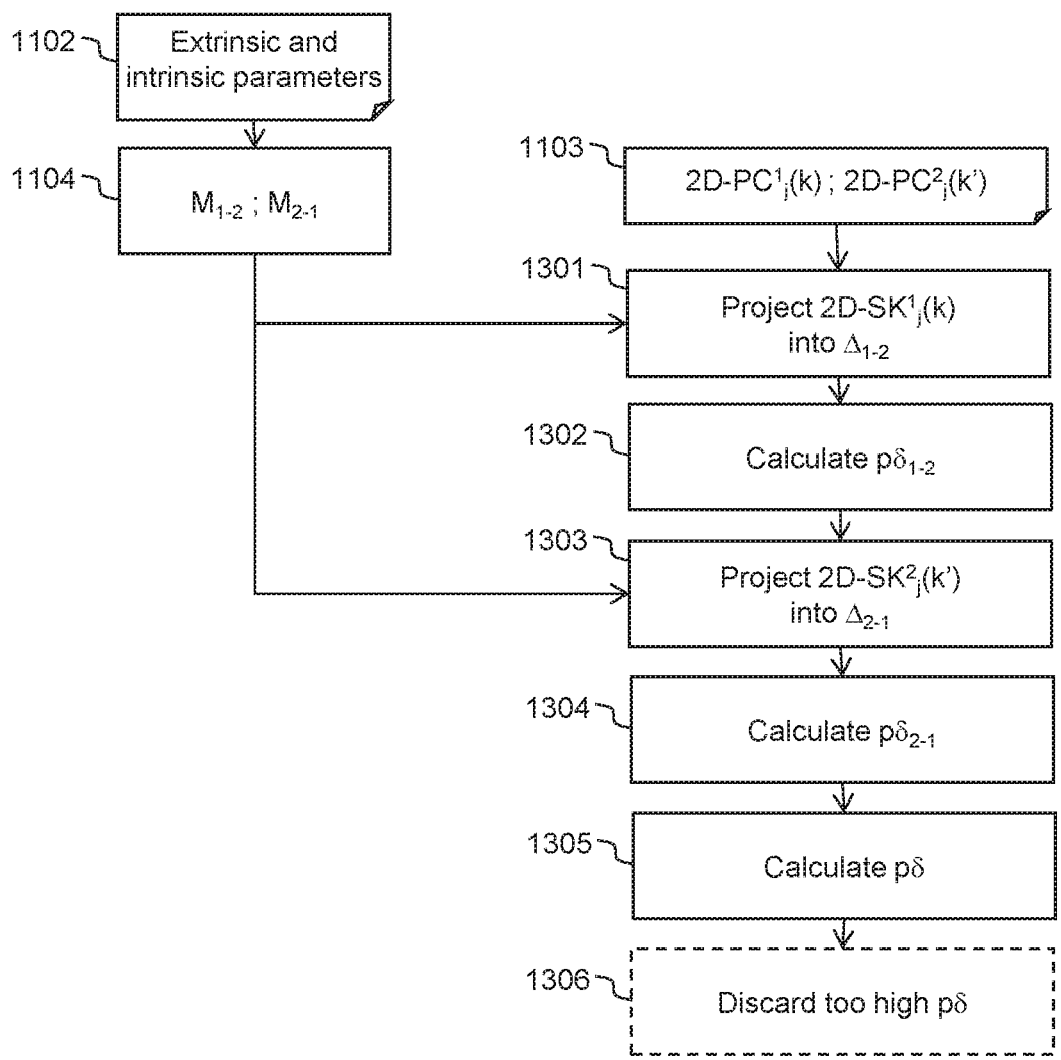
FIG. 13 illustrates, using a flowchart, steps for computing a part distance between two 2D part candidates.

FIG. 12 schematically illustrates a way to compute a part distance p$\delta$ between two 2D part candidates 2D-PC$^1_j$(k) and 2D-PC$^2_j$(k') determined in two source images 13$_1$ and 13$_2$ for the same part 21$_j$. 2D part candidates determined from the two images (for part 21$_j$ only) are shown with black stars. FIG. 13 illustrates, using a flowchart, the corresponding operations.

The extrinsic and intrinsic parameters 1102 of corresponding cameras 12$_1$ and 12$_2$ are known and used to calculate the two fundamental matrices 1104: M$_{1-2}$ from camera 12$_1$ to camera 12$_2$ and M$_{2-1}$ from camera 12$_2$ to camera 12$_1$. In epipolar geometry, it is known that the fundamental matrix projects a point of a first view into a line (an epipolar line) in the other view. To be concrete, the epipolar line is line $\Delta$ seen from another camera. Two directions may thus be processed, meaning for instance that the part distance p$\delta$ may be built from a first directional part distance p$\delta_{1-2}$ and a second directional part distance p$\delta_{2-1}$.

The top half of FIG. 12 illustrates the computation of the first directional part distance p$\delta_{1-2}$ while the bottom half illustrates the computation of the second directional part distance p$\delta_{2-1}$.

As shown, a first one 2D-PC$^1_j$(k) of the 2D part candidates is projected 1301 as a first epipolar line $\Delta_{1-2}$ on the source image 13$_2$ corresponding to the second 2D part candidate. Next, a first directional part distance p$\delta_{1-2}$ is computed 1302 between the second 2D part candidate 2D-PC$^2_j$(k') and the first epipolar line $\Delta_{1-2}$. The distance may merely be the orthogonal distance between the part and the line (e.g. in number of pixels).

Symmetrically, the second 2D part candidate 2D-PC$^2_j$(k') can be projected 1303 as a second epipolar line $\Delta_{2-1}$ on the source image 13$_1$ corresponding to the first 2D part candidate, and a second directional part distance p$\delta_{2-1}$ can be computed 1304 between the first 2D part candidate 2D-PC$^1_j$(k) and the second epipolar line $\Delta_{2-1}$.

The part distance p$\delta$ between the two 2D part candidates may thus be selected 1305 as the maximum distance between the first and second directional part distances p$\delta_{1-2}$ and p$\delta_{2-1}$: p$\delta$=max{p$\delta_{1-2}$; p$\delta_{2-1}$}. In a variant, the mean value between the two directional part distances can be selected.

Of course, to simplify the process, only one directional part distance can be computed and kept as part distance p$\delta$.

Optional step 1306 discards the part distances that are evaluated as being too high to mirror 2D part candidates that may correspond to the same part of the same 3D object. In this context, step 1306 may provide comparing the part distance p$\delta$ with a predefined threshold (e.g. 20 pixels), and if the part distance is above the predefined threshold, the part distance p$\delta$ is set to an infinite value for the pair of considered 2D part candidates. This is to avoid any matching between the two 2D part candidates to be ultimately found using the approaches described below (e.g. step 1123).

By using this algorithm, a part distance p$\delta$ is computed for each pair of 2D part candidates determined from two different sets of 2D part candidates corresponding to the same part 21$_j$. For instance all part distances p$\delta$(2D-PC$^1_j$(k),2D-PC$^2_j$(k')) between a 2D part candidate 2D-PC$^1_j$(k) determined from the first set and a 2D part candidate 2D-PC$^2_j$(k') determined from the second set for model part 21$_j$ are known at the end of step 1122 (some distances may be infinite).

Next step is step 1123 consisting in determining matchings between pairs of 2D part candidates. This determining is based on these part distances.

In embodiments, this is made using a graph. This is to obtain one or more one-to-one associations between a 2D part candidate of the first set and a 2D part candidate of the second set.

The graph is built with nodes corresponding to the 2D part candidates of the two sets and with weighted links between nodes that are set based on the determined part distances between the corresponding 2D part candidates. In this graph, a node (i.e. a 2D part candidate of a first set) is linked to a plurality of other nodes, namely the nodes corresponding to the 2D part candidates of the other set. No link is set between nodes corresponding to 2D part candidates of the same set.

The weights for the links are set with the corresponding calculated part distances.

A bipartite solving of this graph is made which reduces to a maximum weight bipartite graph matching problem as explained for instance in "*Introduction to graph theory, volume 2*" by D. B. West et al. (2001). The solving step outputs optimal one-to-one associations between 2D part candidates, meaning that a 2D part candidate 2D-SK$^1_j$(k) of the first set is at the end linked to (i.e. matched with) at most one 2D part candidate 2D-SK$^2_j$(k) of the other set (still for the currently-considered model part 21).

The bipartite solving may be based on the link weights only, meaning the one-to-one matchings correspond to the minimums of the sum of the link weights in the graph. Optionally, the nodes may be weighted using their respective part probabilities as indicated above (in which case an appropriate formula between the node weights and the link weights is used).

The pairs of matched 2D part candidates (2D-PC$^i_j$, 2D-PC$^k_j$) 1105 are obtained for the currently-considered model part 21$_j$ and the current pair of source images 13$_i$, 13$_k$. Other matched 2D part candidates are obtained, using the same algorithm, for the other model parts and for the other pairs of source images to be considered.

Alternatively, to the use of a graph at step 1123, the closest 2D part candidate or candidates 2D-PC$^2_j$ of the second set to the first part candidate 2D-PC$^1_j$(k) can be selected based on the determined part distances. This outputs one or more matching 2D part candidates for the first 2D part candidate. For instance, this may be the N (integer equal or above 1) closest ones or those whose part distances are less than a predefined (Euclidean) distance.

Next, the 3D part candidates 3D-PC$^{i,k}_j$ are generated from the matching pairs. This is step 1124 which uses inter-view 2D triangulation to convert two matched 2D part candidates into a 3D part candidate in 3D space. 2D triangulation is made each matching pair after each matching pair.

Figure 14:
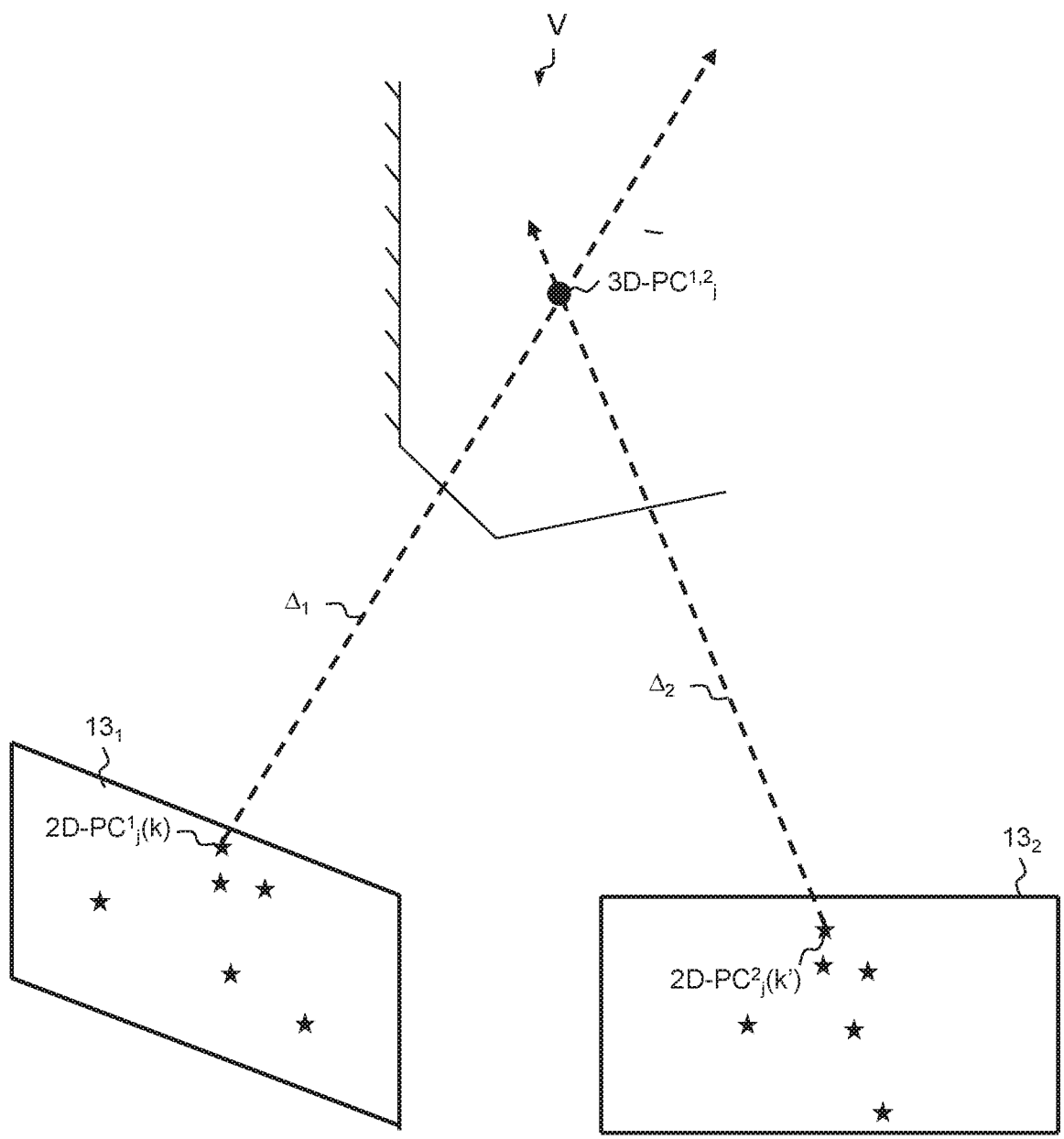
FIG. 14 schematically illustrates a triangulation process to build a 3D part candidate from a matching pair of two matched 2D part candidates according to embodiment of the second approach.

An exemplary implementation of this step for a given matching pair {2D-PC$^1_j$(k),2D-PC$^2_j$(k')} is illustrated in FIG. 14. It is made of three main sub-steps, namely:

projecting a first one 2D-PC$^1_j$(k) of the matched 2D part candidates as a first line $\Delta_1$ in 3D space (e.g. volume V representing the scene volume when it is defined). The projection corresponds to the line shown in FIG. 5 for instance. This projection is a geometrical issue based on the intrinsic and extrinsic parameters of the corresponding camera (here camera 12$_1$);

projecting the second matched 2D part candidate 2D-PC$^2_j$(k) as a second line $\Delta_2$ in the 3D space; and determining a 3D position (e.g. a voxel V(X,Y,Z)) locating the 3D part candidate 3D-PC$^{1,2}_j$, based on the first and second lines.

The two lines $\Delta_1$ and $\Delta_2$ rarely intersect one the other in the same 3D position or the same voxel. If they intersect, the intersecting point or voxel is elected as representing the part considered. Otherwise, the closest 3D point or voxel to the two lines is preferably selected. The closeness can be evaluated based on a least square distance approach.

Back to FIG. 11, the result of step 1120 performed for each pair (i,k) of source images 13$i$,13$k$ and a given model part 21$_j$ is a 3D set of 3D part candidates 1106 built. Several 3D sets as obtained for the several parts 21 composing the object model 20.

Each 3D part candidate is thus defined by a 3D position (e.g. voxel position in SYS) and a part type (the part 21 to which it corresponds). The 3D part candidate may further be associated with the two part probabilities of the two matched 2D part candidates from which it is generated and/or with the part distance calculated for the two matched 2D part candidates.

To reduce the number of 3D part candidates to be processed further, a filtering 1130 may optionally be performed which consists in filtering 3D part candidates of a given 3D set (i.e. for a given model part 21$_j$) into a subset of 3D part candidates. An idea of this step 1130 is to keep the most promising 3D part candidates.

FIG. 11c illustrates, using a flowchart, exemplary operations forming step 1130.

Various embodiments may be contemplated.

Some embodiments include selecting 3D part candidates generated from pairs of matched 2D part candidates that share the same 2D part candidates. This is done one 3D set after the other, i.e. model part 21 after model part. In these embodiments, confidence is given to the 2D part candidates that are involved in several matching pairs, thereby providing confidence to the 3D part candidates generated from them.

Figure 15A:
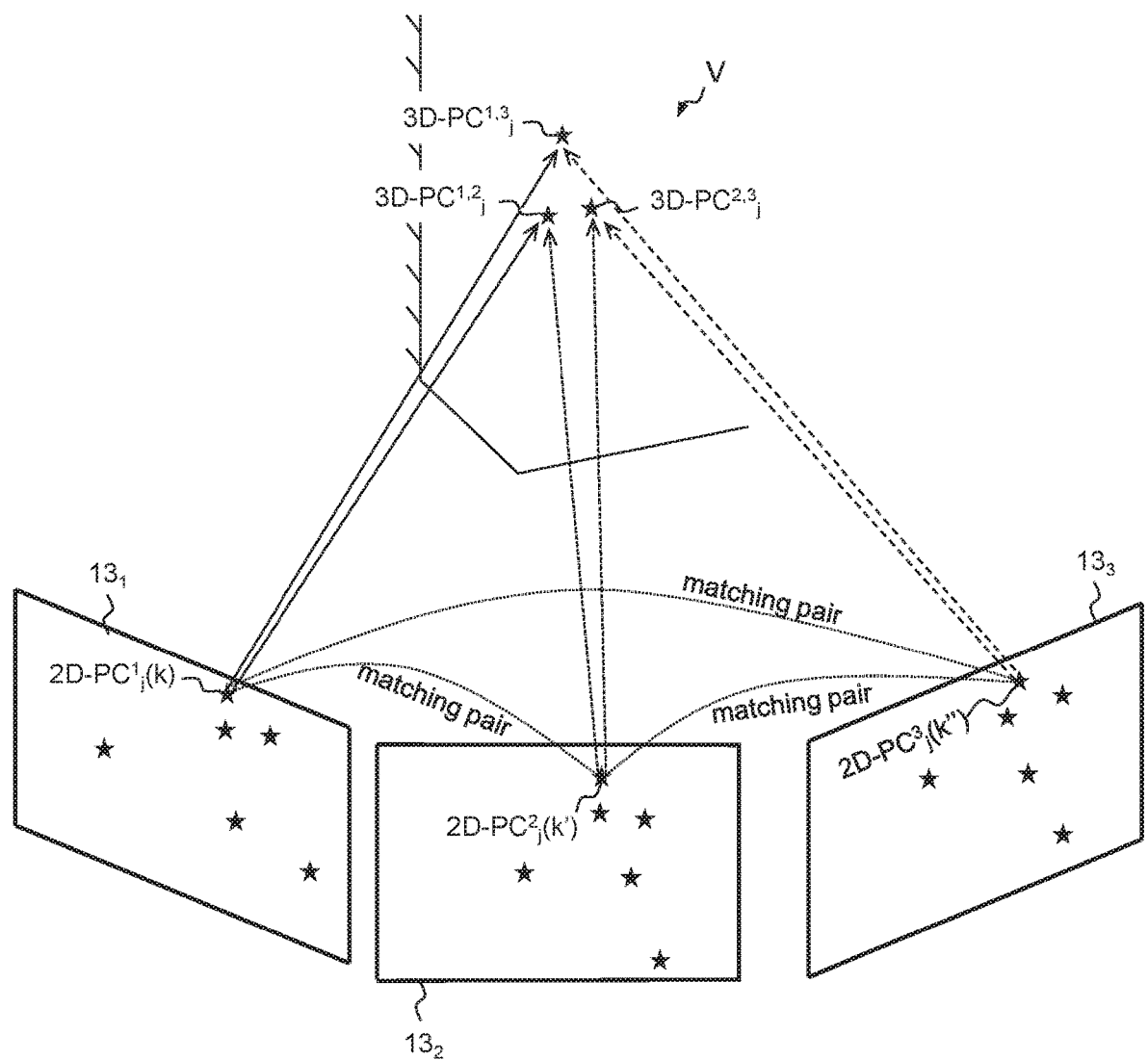
FIGS. 15a and 15b schematically illustrate a filtering process of 3D part candidates according to embodiments of the second approach.

Optimized situation is when three matching pairs are built from exactly the same three 2D part candidates, in which case the triplet of 3D part candidates generated from these three pairs can be considered as three confident 3D part candidates. FIG. 15a illustrates such situation: (2D-PC$^1_j$(k), 2D-PC$^2_j$(k')), (2D-PC$^1_j$(k), 2D-PC$^3_j$(k'')) and (2D-PC$^3_j$(k''), 2D-PC$^2_j$(k')) are determined as matching pairs in step 1123 (the matching is shown in the Figure with a thin dotted line between the 2D part candidates) resulting in classifying the three 3D part candidates 3D-PC$^{1,2}_j$, 3D-PC$^{1,3}_j$ and 3D-PC$^{2,3}_j$ as confident 3D part candidates because they share the same three 2D part candidates.

At step 1131, such confident 3D part candidates are thus kept through the filtering.

Optionally, the alleged confident 3D part candidates whose associated part distances are too high can be regarded as not confident and thus being discarded. The others (with low associated part distance) are kept. This means selecting or discarding 3D part candidates generated from pairs of matched 2D part candidates can be based on the part distance pδ determined between the 2D part candidates of the respective pairs. This selects better confident 3D part candidates.

Alternatively, step 1131 may merely consist in using the associated part distance to select or discard the 3D part candidates, regardless of whether they share 2D part candidates.

Once the confident 3D part candidates have been filtered, lower confident 3D part candidates can also be selected at step 1132.

Figure 15B:
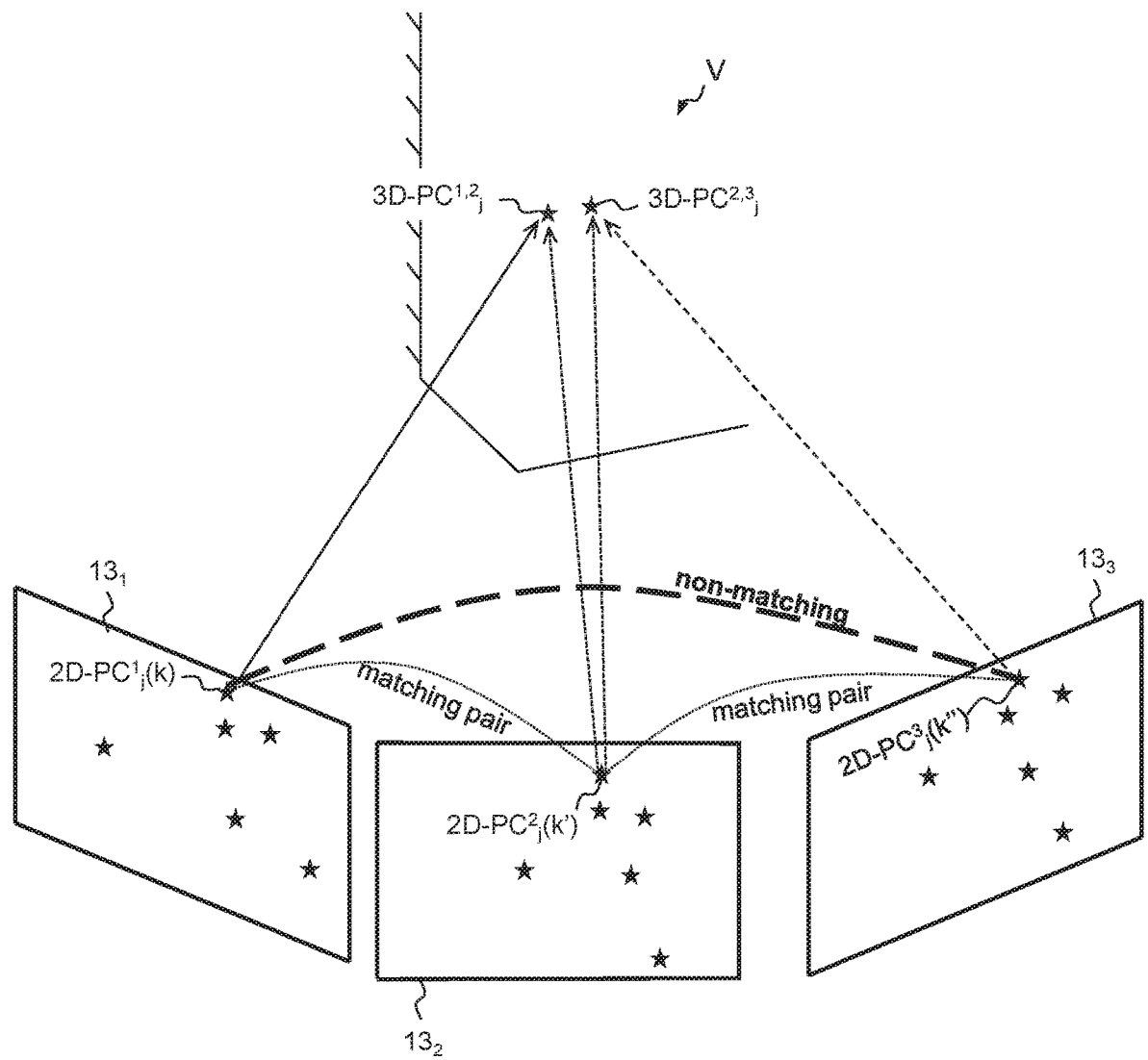

All the 3D part candidates not selected at step 1131 can be considered successively for this step. Alternatively, only those not yet selected (through the triplet approach) and that share a 2D part candidate with another 3D part candidate are considered. FIG. 15b illustrates such 3D candidates: (2D-PC$^1_j$(k), 2D-PC$^2_j$(k')) and (2D-PC$^2_j$(k'), 2D-PC$^3_j$(k'')) are determined as matching pairs in step 1123 but 2D-PC$^1_j$(k) and 2D-PC$^3_j$(k'') are not matched (as shown in the Figure with the thick dashed line). Thus 3D-PC$^{1,2}_j$ and 3D-PC$^{2,3}_j$ share a 2D part candidate 2D-PC$^2_j$(k') but no more.

Step 1132 may then consist in selecting those 3D part candidates successively considered that are (in the meaning of a 3D Euclidean distance for instance) closer to a yet-selected 3D part candidate (during step 1131 for the same model part 21$_j$) than a predefined distance, e.g. less than 2 meters for human objects 11.

Again, optionally, the 3D part candidates successively considered whose associated part distances are too high can be discarded. The others (with low associated part distance) are thus kept as filtered 3D part candidates.

The output of step 1130 is a 3D subset 1107 of filtered 3D part candidates for each model part 21$_j$ considered.

Next to the filtering step 1130 or to the 3D part candidate generation 1120 if no filtering is made, generated 3D part candidates 3D-PC$^{i,k}_j$ representing the same part 21$_j$ are converted at step 1140 into a single 3D part candidate. This makes it possible to consolidate clusters of for instance very close 3D part candidates into a robust 3D part candidate to build a final 3D skeleton.

The same conversion process can be repeated for each part.

Figure 16:
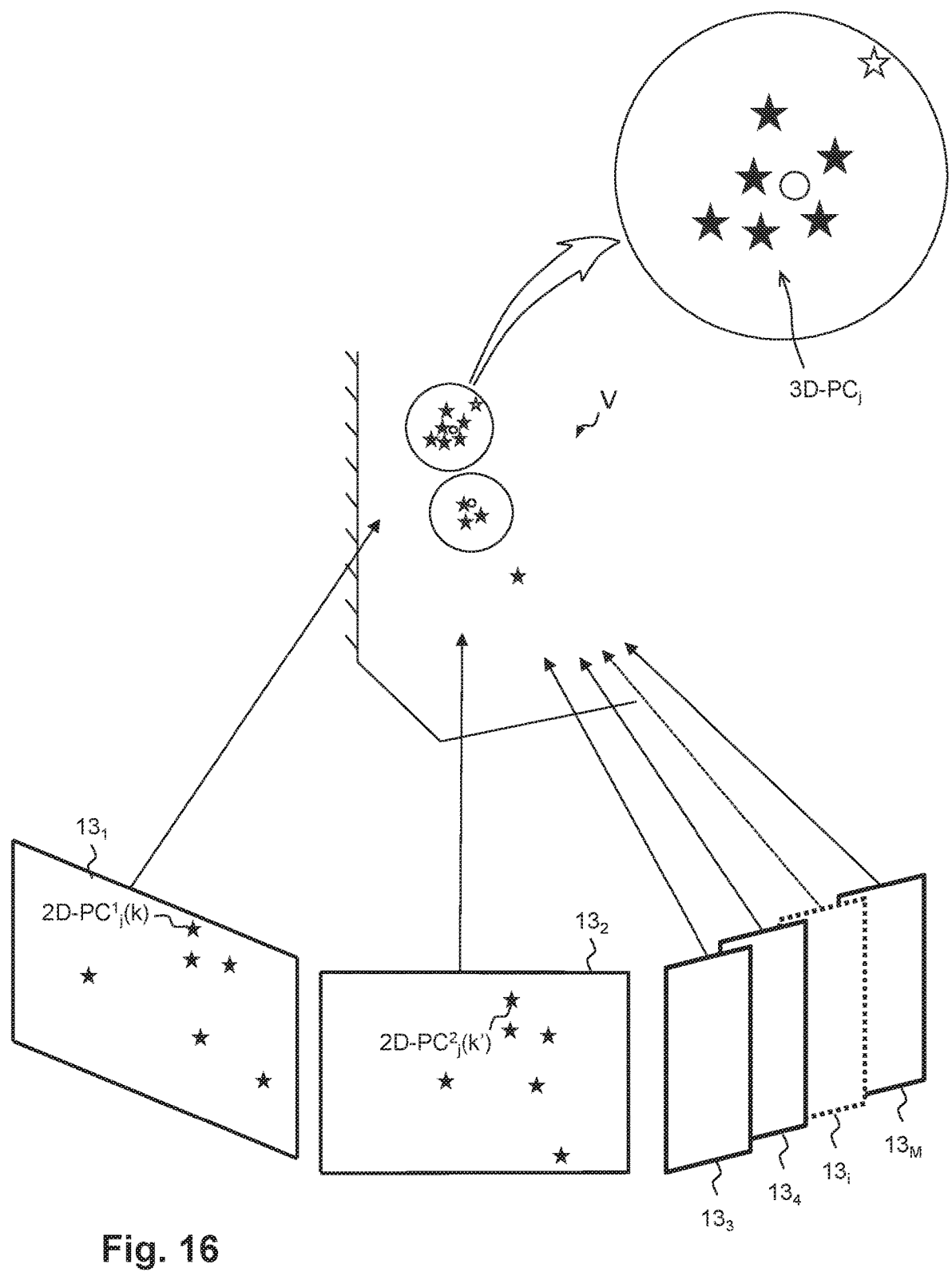
FIG. 16 schematically illustrates a conversion process of 3D part candidates according to embodiments of the second approach.

The conversion can be based on spatial closeness, i.e. on 3D distances between the 3D part candidates generated for the part considered (generated from the various source images $13_i$). For instance, a RANSAC (RANdom SAmple Consensus) algorithm with a local/global fitting model can be applied. This is illustrated in FIG. 16.

Let consider the 3D set of 3D points (i.e. 3D part candidates) generated for the part currently considered. A RANSAC average 3D position is calculated from these 3D points.

The RANSAC approach calculates a robust average 3D position as the average of selected inliers, i.e. selected 3D points. These selected 3D points are accepted as inliers for the computation if their distances to other robust 3D points are below a threshold. The number of inliers N_Inliers (i.e. the number of 3D points that are close to the average 3D position calculated by the RANSAC algorithm) is known. This is a functionality of the RANSAC algorithm.

This approach thus:

a) selects two or more of the 3D part candidates generated for the same part that are close enough between them, and b) generates a centroid 3D part candidate from the selected ones, as single 3D part candidate, optionally replacing the selected ones.

For instance, clusters of the generated 3D part candidates are first made. As an example, the 3D part candidates are connected to each other close 3D part candidate with respect to a predefined distance threshold. Next, each set of connected 3D part candidates is processed separately using the RANSAC algorithm to provide a robust average 3D position for the set and identify the inliers therefrom. The robust average 3D position should maximize the number of inliers from the set.

This robust average 3D position is kept if the number of inliers is sufficient (for instance 2 or more).

The RANSAC may be iteratively applied by substituting the inliers with the calculated average 3D position and determining a new robust average 3D position. Alternatively, the determined inliers may be discarded for subsequent iteration without substitution.

In other words, the conversion includes repeating a) and b), for instance until a) cannot select two or more 3D part candidates or until a number of remaining 3D part candidates (inliers being discarded) is below a predefined value.

The converting iterations may convert separate sets of connected 3D part candidates. This is for instance the case when several 3D objects are captured by the cameras. Indeed, in that case, usually the same number of 3D point clouds is obtained, wherein each 3D point cloud is made of 3D part candidates generated from the source images.

It results that one or more sets of inliers (i.e. original or filtered 3D part candidates) have been converted into one or more respective robust average 3D part candidates. Some 3D part candidates may not have been converted. This is schematically illustrated through FIG. 16.

The 3D part candidates 3D-$PC_j$ (stars in the Figure) are generated from matching pairs of 2D part maps 2D-$PC_j$ for the model part $21_j$ considered. The RANSAC algorithm determines for instance a cluster of three 3D part candidates (bottom circle) which are all inliers for a single average 3D part candidate (the circle): for this cluster, N_Inliers=3. It also determines for instance a cluster of seven 3D part candidates (top circle), six of which (black stars) are inliers for a single average 3D part candidate (the circle): N_Inliers=6. The last 3D part candidate (white star) of this cluster remains as an outlier, in which case N_Inliers=1.

Another outlier (3D part candidate outside the two circles) also remains.

In this described RANSOM-based embodiment, the 3D part candidates 3D-$PC_j$ have the same weight. In a variant, each of the 3D part candidates can be weighted, using for instance the part probabilities obtained for the two matched 2D part candidates 2D-$PC_j$ from which the 3D part candidate is generated. The RANSAC algorithm can thus take into account these weights, for instance to compute the average 3D position as a weighted barycenter of the inliers' 3D positions). In embodiments, the average unary probability of the two part probabilities can be used.

At the end of step 1140, the set of average 3D part candidates and the set of remaining outliers form the set of final 3D part candidates 1108 for the 3D skeleton generation 1150.

The generating step 1150 may use and solve a graph to obtain one or more one-to-one associations between final 3D part candidates representing two different parts. The graph may be built with nodes corresponding to the 3D part candidates representing the two different parts considered and with weighted links between nodes corresponding to two 3D part candidates for the two different parts that are set based on a distance between the two 3D part candidates. In this graph, a node (i.e. a 3D part candidate) corresponding to a first part (e.g. head) is linked to one or more nodes corresponding to the other part (e.g. neck). No link is set between nodes corresponding to 3D part candidates corresponding to the same part.

The two different parts considered are preferably adjacent according to the 3D model of the 3D real world object.

The graph-based solving may be used for each pair of adjacent parts, in order to progressively obtain one-to-one associations for all the pairs.

With reference to FIG. 11d, to build 1151 the graph for a first part and an adjacent second part, the nodes are first set for each final 3D part candidate 1108 obtained for the first and second parts considered.

Each node may then be weighted based on the number N_Inliers of 3D part candidates used to generate the final 3D part candidate corresponding to the node. For instance, with regard to FIG. 16, the node corresponding to the top average 3D part candidate can be weighted with the value 6; the node corresponding to the bottom average 3D part candidate can be weighted with the value 3; while the nodes corresponding to the outliers can be weighted with the value 1.

Other weights, for instance based on the part probabilities of the matched 2D part candidates from which these 3D part candidates are generated, can be taken into account. An average part probability can be used for instance.

The building of the graph also requires setting links between the nodes. No link is preferably set between nodes representing 3D part candidates of the same part. A link can be always defined between nodes representing 3D part candidates of two different parts. In embodiments, such a link between two nodes corresponding to a 3D first-part candidate and a 3D second-part candidate can be set depending on a (e.g. Euclidean) distance between the two 3D part candidates and morphological constraints defined by the 3D model between the two different parts considered. This aims at reducing complexity in the graph through morphological considerations. Indeed, a head for a human cannot be 2 meter far from the neck.

The constraints may indeed vary from one part to the other. For instance, a common head-neck distance is less than 40 cm, a common pelvis-knee distance is less than 80 cm, and so on.

Once the links are set, their weights are calculated.

In embodiments, the weight for a link is calculated based on pairwise probability or probabilities between pairs of 2D part candidates (each representing the probability of association between the corresponding paired 2D part candidates), pairs from which the two 3D part candidates forming the link are generated.

The pairwise probabilities have been shortly introduced above. A pairwise probability is obtained for two 2D part candidates belonging to the same source image. It can be obtained based on the techniques described in "*Realtime Multi-Person 2D Pose Estimation using Part Affinity Fields*", "*DeeperCut: A Deeper, Stronger, and Faster Multi-Person Pose Estimation Model*" and "*Deep-Cut: Joint Subset Partition and Labelling for Multi Person Pose Estimation*".

For instance, "*Realtime Multi-Person 2D Pose Estimation using Part Affinity Fields*" describes how part affinity fields are obtained. One part affinity field is generated for each pair of adjacent parts (according to the 3D model 20) and from each source image $13_i$. It is generated by the same CNN as the one used at step 410.

The part affinity fields can be processed to obtain (local) pairwise (or part affinity) probabilities between part candidates identified from the same source image for two adjacent parts. Such pairwise probability may be the modulus of affinity vectors between the two part candidates.

Pairwise probabilities may also be obtained between parts that are not adjacent. Such pairwise probability is said to be "global" and mirrors the probability that the two parts belong to the same object.

Similar to the part maps, a part affinity field may have the same dimensions as the source image or reduced dimensions in which case it may be upscaled to recover the same dimensions. Details of a part affinity field have already been provided above with respect to the first approach, an example of which is shown in FIG. 9.

In such part affinity fields, the knowledge of orientations with high probabilities (AVs with long modulus close to 1) gives relevant information on how to connect two 2D part candidates. To do so, the pairwise probability between the two 2D part candidates is calculated based on the generated part affinity field, for instance based on affinity vectors located between the two 2D part candidates in the generated part affinity field.

The affinity vectors to be considered may be along the segment formed by the two 2D part candidates, in particular the closest ones. For instance, the known Bresenham's line algorithm can be used to determine which pixels (and thus associated affinity vector) to parse along this segment.

In practice, the scalar products of the vector formed by the two 2D part candidates and each of the affinity vectors located between the two 2D part candidates (thus identified by the Bresenham's line algorithm) can be computed, and then summed to obtain the pairwise probability between the two 2D part candidates. The sum can then be normalized by dividing it with the modulus of the vector formed by the two 2D part candidates.

If the pairwise probability is too low, it may be set to 0 or considered as not existing.

Techniques described in "*DeeperCut: A Deeper, Stronger, and Faster Multi-Person Pose Estimation Model*" and "*Deep-Cut: Joint Subset Partition and Labelling for Multi Person Pose Estimation*" directly provide pairwise probabilities between two 2D part candidates.

Back to the setting of a link weight in the graph, it is recalled that N_Inliers 3D first-part candidates are used to generate a first final 3D first-part candidate of the link and N'_Inliers 3D second-part candidates are used to generate the second final 3D second-part candidate of the link. As each 3D part candidate comes from a pair of 2D part candidates, a plurality of 2D first-part candidates and a plurality of 2D second-part candidates may be used to produce the two final 3D part candidates.

The pairwise probabilities between corresponding pairs of 2D part candidates corresponding to these final 3D part candidates can thus be retrieved (this is done if the two final 3D part candidates are linked together given the morphological constraints).

FIG. 17 illustrate such retrieval of pairwise probabilities for a pair of original 3D part candidates. This must be reiterated for each pair of one of the N_Inliers 3D first-part candidates and one of the N'_Inliers 3D second-part candidates.

In the first case shown in FIG. 17*a*, the two original 3D part candidates have been built (step 1120) from two pairs of matched 2D part candidates coming from the same two source images $13_1$ and $13_2$. A pairwise probability may have been obtained between the two 2D part candidates belonging to the same source image. In the affirmative, this pairwise probability is retrieved. As a result, the two original 3D part candidates may be associated with 0,1 or 2 pairwise probabilities inherited from their 2D part candidates.

Figure 17B:
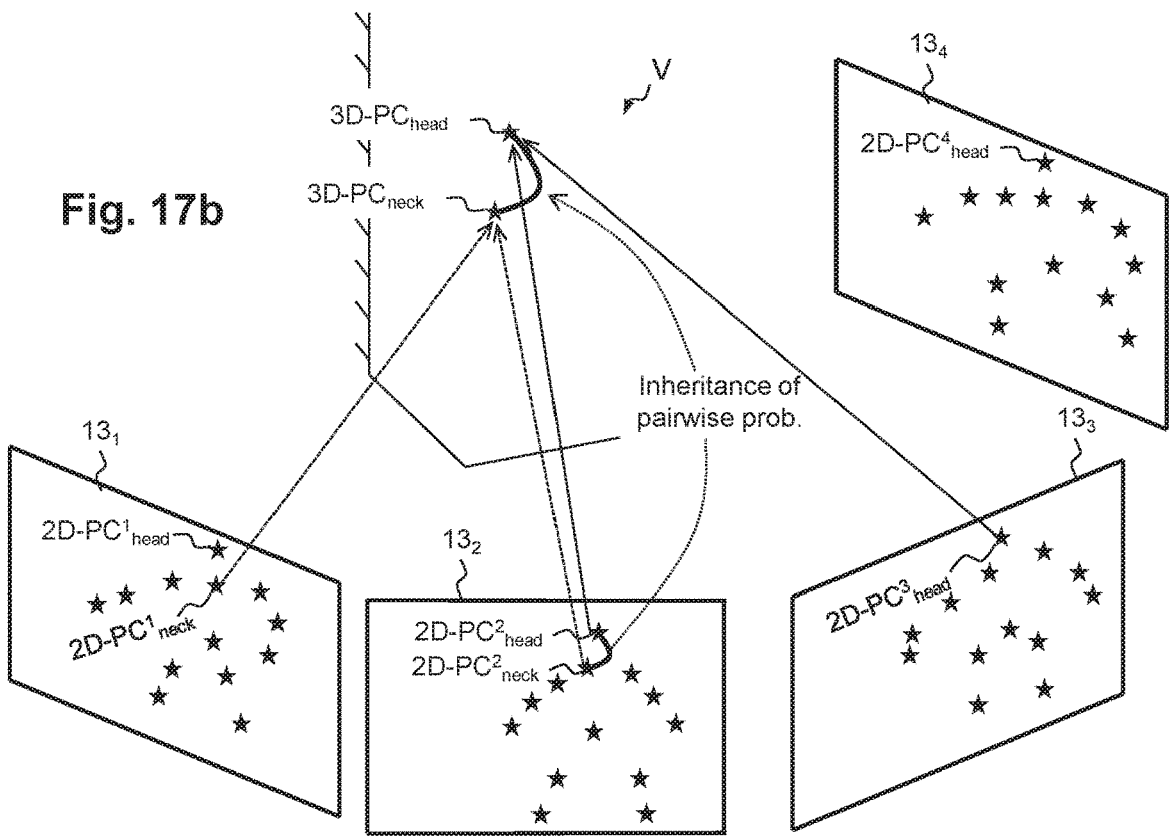

In the second case shown in FIG. 17*b*, the two original 3D part candidates have been built (step 1120) from two pairs of matched 2D part candidates coming from three source images $13_1, 13_2$ and $13_3$: only two 2D part candidates belong to the same source image $13_2$. The pairwise probability between these two 2D part candidates is retrieved, if any. As a result, the two original 3D part candidates may be associated with 0 or 1 pairwise probability inherited from their 2D part candidates.

Figure 17C:
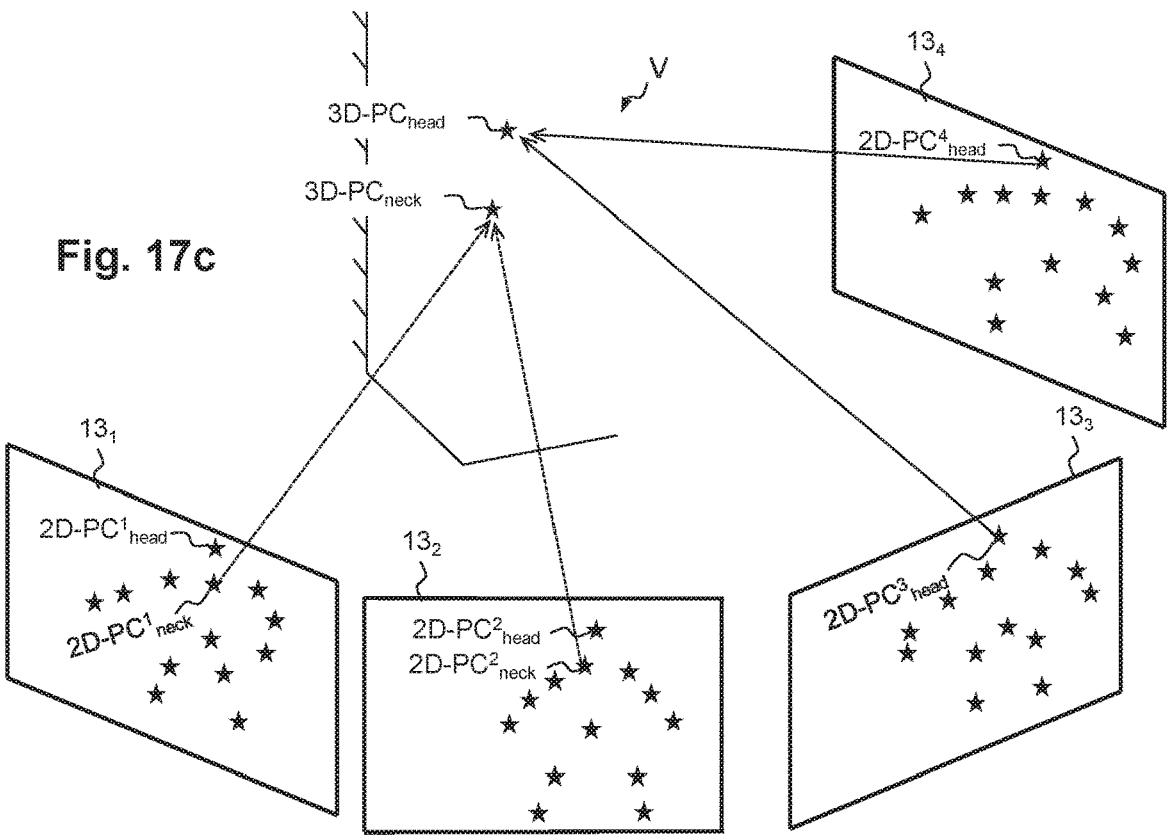

In the last case shown in FIG. 17*c*, the two original 3D part candidates have been built (step 1120) from two pairs of matched 2D part candidates coming from four source images $13_1$ to $13_4$: the 2D part candidates come from different source images. As a result, the two original 3D part candidates cannot be associated with any pairwise probability inherited from their 2D part candidates.

The link between the first final 3D first-part candidate and the second final 3D second-part candidate is thus associated with the pairwise probabilities inherited from each pair of one of their N_Inliers 3D first-part candidates and one of their N'_Inliers 3D second-part candidates. There may be a high number of pairwise probabilities.

Figure 18A:
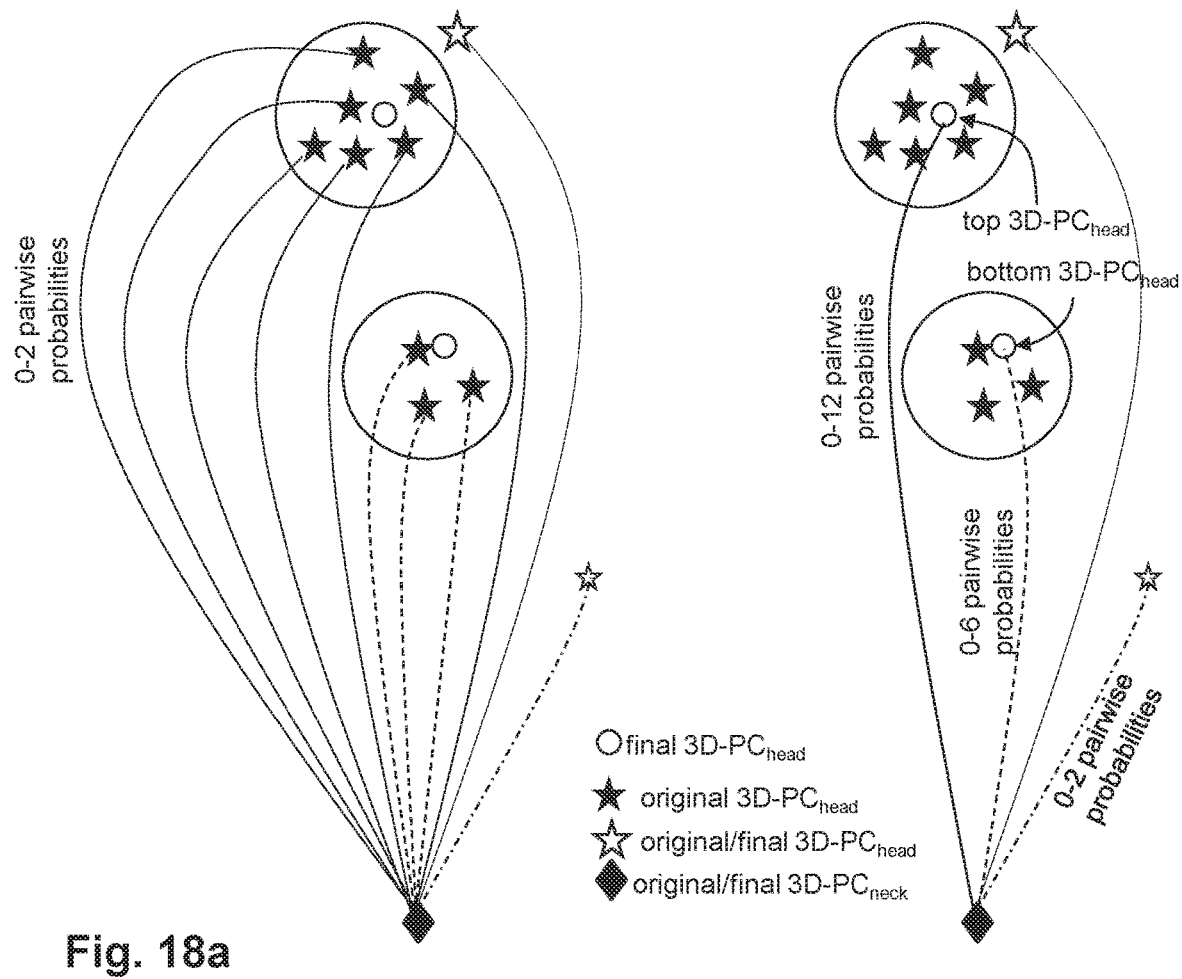
FIGS. 18a and 18b schematically illustrate the retrieval of pairwise probabilities in case of 3D part candidate conversion, according to embodiments of the second approach.

FIG. 18*a* schematically illustrates such retrieval. For ease of illustration, a single final 3D neck (second-part) candidate is shown which is obtained as an outlier (i.e. from a single original 3D neck candidate).

Regarding the top final (average) 3D head (first-part) candidate, there are 6 pairs of original 3D head candidates to be considered (the six solid lines on the left side). From each pair, 0 to 2 pairwise probabilities can be inherited (as shown in FIG. 17), thereby resulting in 0 to 12 pairwise probabilities for the link (solid line on the right side) between the top final (average) 3D head candidate and the 3D neck candidate.

As far as the bottom final (average) 3D head candidate is concerned, up to 6 pairwise probabilities can be inherited. Regarding the outliner final 3D head candidate, only up to 2 pairwise probabilities can be inherited.

The weight for the link between the first final 3D first-part candidate and the second final 3D second-part candidate can thus be set based on the inherited pairwise probabilities, for instance as the maximum value or the mean value or any other formula.

Figure 18B:
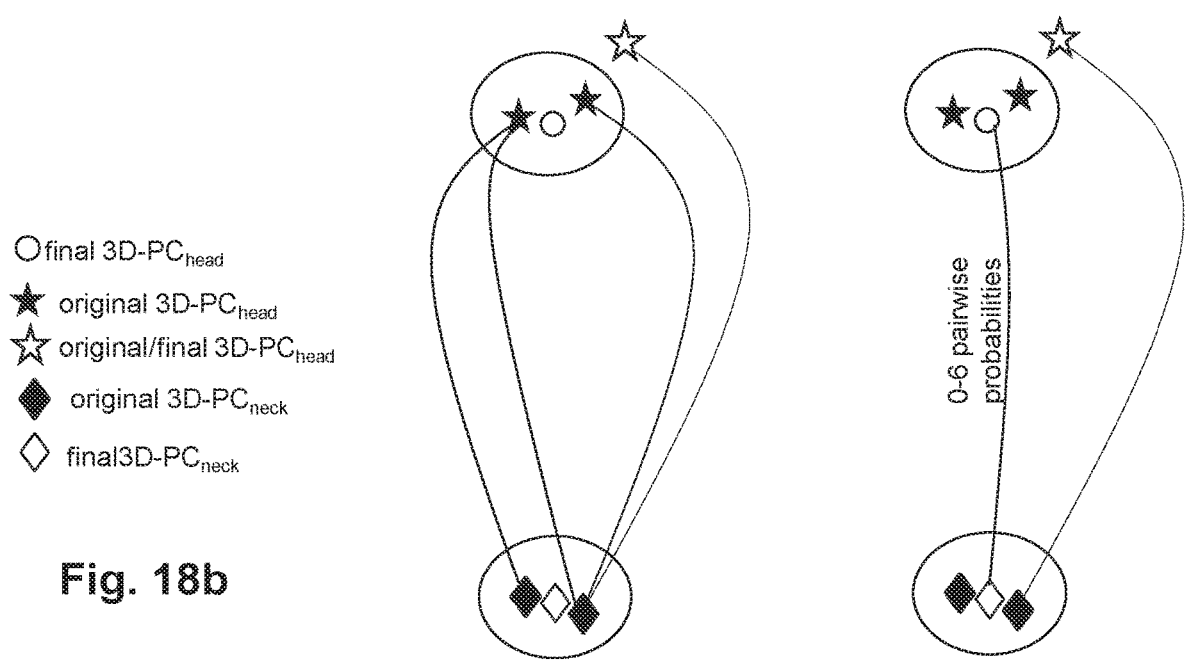

FIG. 18b schematically illustrates such retrieval in a different way where both final 3D head and neck candidates are built from two or more original 3D head and neck candidates. This example also shows that a pair of original 3D-PC$_{head}$-3D-PC$_{neck}$ is not connected due for instance to morphological constraints. In other words, pairwise probabilities are discarded (or not inherited) based on morphological constraints regarding the corresponding original 3D part candidates.

In the case of FIG. 18b, the link between the two final average 3D part candidates (solid line in the right side) is associated with up to 6 pairwise probabilities inherited from the three remaining pairs (solid lines in the left side).

At the end, pairwise probabilities may be obtained for the links provided in the graph.

Where no pairwise probability is inherited, it may be decided to discard such link. In a variant a predefined weight may be provided.

Alternatively to or in combination with the use of the pairwise probabilities, the weight for a link may be based on a (e.g. Euclidean) distance between the two final 3D part candidates forming the link.

As mentioned above, such graph is built for each pair of adjacent parts within the model 20.

While the graphs are, in this example, built after the filtering and converting steps 1130 and 1140, the building may be made before step 1130 or between steps 1130 and 1140. In that case, the nodes in the graph correspond to the original or filtered 3D part candidates and the link may be associated with corresponding inherited pairwise probabilities. Next, when the filtering and converting steps are performed, the graph may be updated (deletion of the filtered out 3D part candidates and substitution of the inliers with a new node corresponding to the average 3D part candidate).

A bipartite solving 1152 of each graph as introduced above outputs optimal one-to-one associations between pairs of final 3D part candidates. It means that a final 3D part candidate 3D-PC$_j$ for part 21$_j$ is at the end linked to (i.e. matched with) at most one final 3D part candidate 3D-PC$_k$ for the other part 21$_k$.

The bipartite solving may be based on the link weights and/or on node weights, meaning the one-to-one matchings correspond to the minima (or maxima) of a formula (e.g. sum) involving the link weights and/or the node weights.

Figure 19:
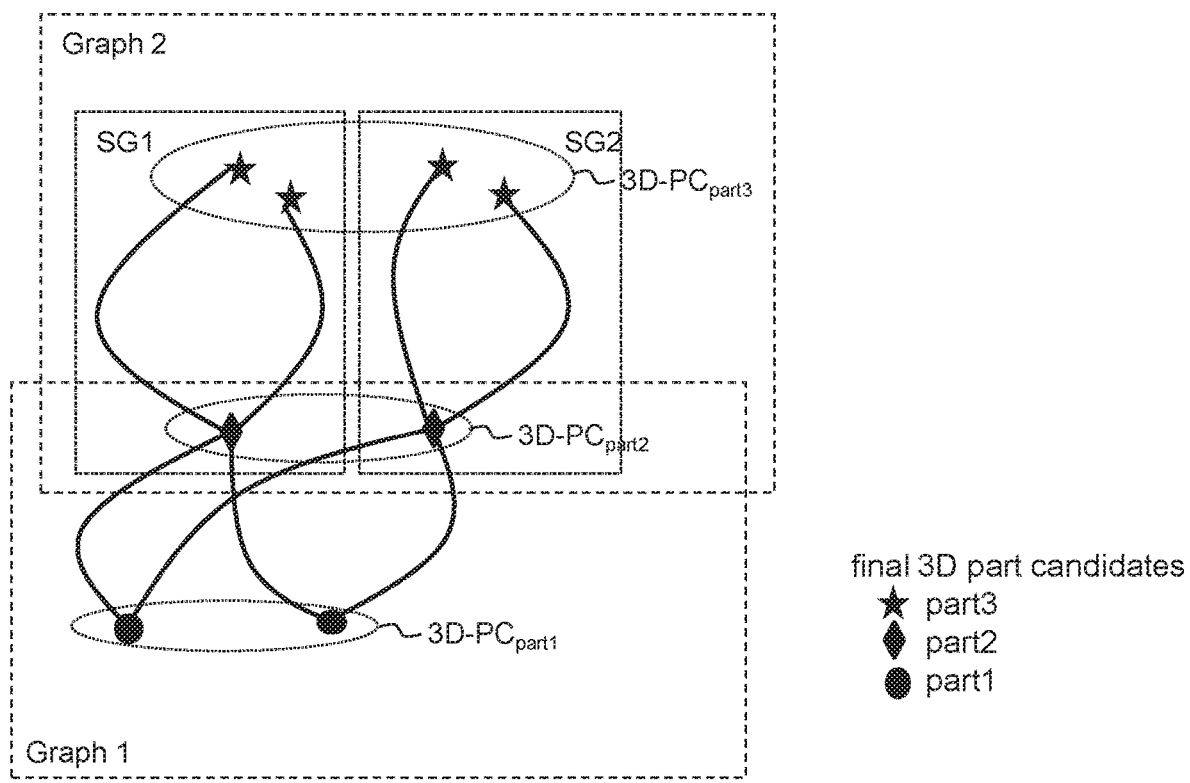
FIG. 19 schematically illustrates steps for generating a 3D skeleton candidate using a graph according to embodiments of the second approach.
Figure 19:
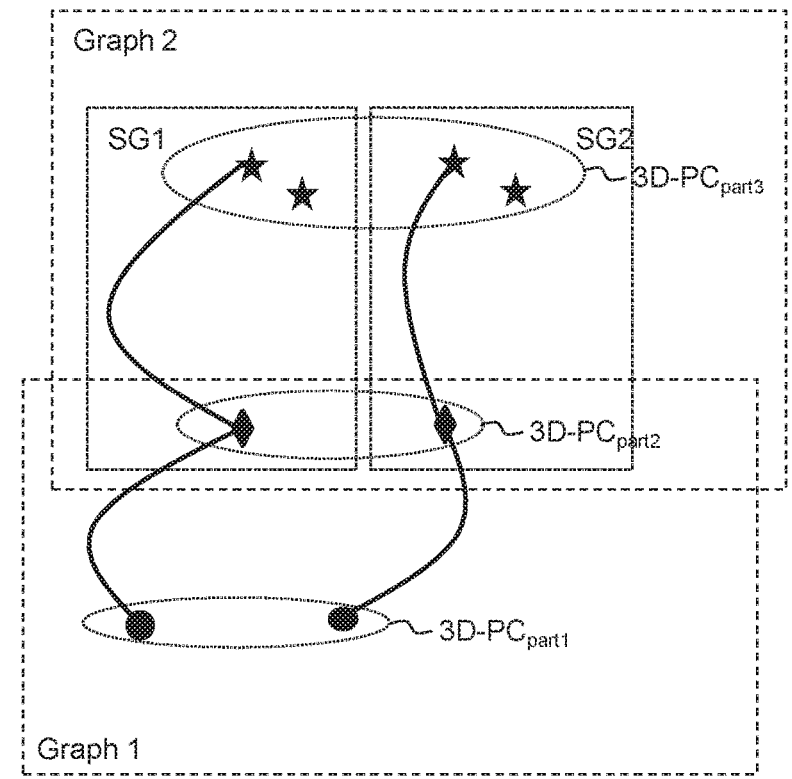

FIG. 19 schematically illustrates the generation of a 3D skeleton candidate using the graph solving. The Figure shows (on top part) two graphs sharing the same part. For instance, graph 1 includes the final 3D part1 and part2 candidates while graph 2 includes the final 3D part2 and part3 candidates (assuming part1 and part2 as well as part2 and part3 are adjacent according to model 20).

Each graph is solved independently, meaning the 3D skeleton generating step 1150 includes repeating using and solving a graph for successively each of a plurality (e.g. each and every) of pairs of adjacent parts according to a 3D model of the 3D real world object, in order to obtain one or more one-to-one associations between 3D part candidates for each pair of adjacent parts. As explained below, pairs of associated 3D part candidates that share the same 3D part candidate can then be connected, using for instance a connected component algorithm, to obtain one or more (full or partial) 3D skeleton candidates.

Preferably, a connected component algorithm can first be run on the graph currently considered to extract un-connected sub-graphs and solve them independently. This is to reduce processing complexity. For instance, graph 2 of the Figure may be split into independent sub-graphs SG1 and SG2.

For each of graph 1, SG1 and SG2, the graph bipartite solving 1152 is run to find the solution (in terms of links) that maximizes an energy in a one-to-one relationship.

The energy E to maximize may be the sum of elementary energies e assigned to the pairs of connected nodes respectively: E=Σe. Each elementary energy e may be based on the node weights (e.g. N_Inliers value), the link-associated pairwise probabilities and/or the Euclidean distance between the two corresponding final 3D part candidates. For instance:

$$e=\alpha \cdot f(N\_Inliers)+\beta \cdot g(pairwise\ probabilities)+\gamma \cdot (1+ Euclidean\ distance)^{-1}.$$

The N_Inliers values weighting the two nodes are used as input of function f. For instance f(x,y)=max(x,y).

The pairwise probabilities values associated with the link are used as input of function g. For instance g(x$_1$, x$_2$, . . . ,x$_n$)=sum(x$_i$>threshold). The threshold may be predefined.

α, β, γ can be heuristic weights, for instance set to 0.5.

The result of the solving 1152 is a set of one-to-one-associated part candidates (there may be a single association in the set) for each graph (i.e. for each pair of adjacent parts according to the 3D model 20), as shown for instance in the bottom part of FIG. 19.

The final steps consist in selecting one-to-one-associated part candidates so obtained as parts of the final 3D skeleton. These steps have already been described above with reference to steps 461 and 462.

Preferably one-to-one-associated final 3D part candidates of two or more pairs of adjacent parts are connected to obtain 3D skeleton candidate or candidates. This is step 1153 of building 3D skeleton candidates.

From these 3D skeleton candidates obtained, one 3D skeleton candidate may be selected as a 3D skeleton 3D-SK of the 3D object 11. This is step 1154. Of course, if a plurality of 3D objects having the same 3D model 20 is present in the scene volume, a plurality of 3D skeleton candidates is selected as 3D skeletons 1109 for these objects. The number of 3D skeleton candidates to be selected can be known in advance. However, some applications may not know such number. The various criteria described with reference to step 462 may be used alternatively or in combination to select the 3D skeleton candidates.

Some applications may require that the 3D skeleton or skeletons obtained at step 1150 (thus generated using the process of the Figure) be displayed, for instance using the display screen 15. A 2D or 3D image of the 3D object or objects can thus be generated using the obtained 3D skeleton or skeletons. This may be done using the process described above with reference to FIG. 6.

Various embodiments of the third approach are now described with reference to FIGS. 20 to 25.

Figure 20:
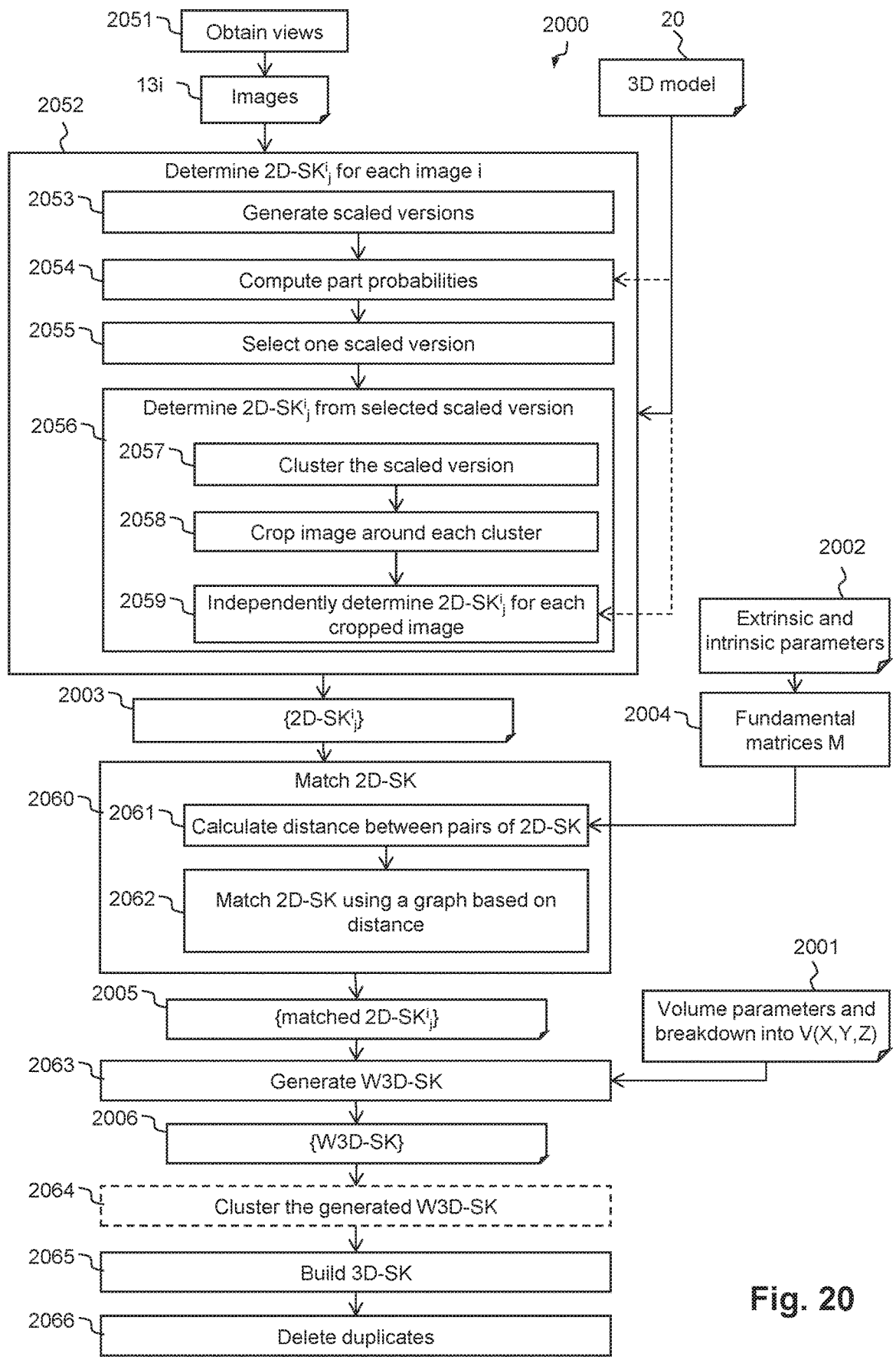
FIG. 20 illustrates, using a flowchart, embodiments of a method for generating a 3D skeleton of a 3D real world object observed by source cameras according to the third approach.

FIG. 20 illustrates, using a flowchart, embodiments of a method according to the third approach. This method has a similar context for execution than the methods of FIGS. 4 and 11 described above.

In execution, the method starts with the obtaining 2051 of two or more simultaneous source images of the 3D objects or of the scene volume recorded by the source cameras. The source images 13$i$ are for instance retrieved from the reception buffer of the communication interface 302.

Although the sources images may have different sizes from one source camera to the other, it is assumed they have the same size for illustration purposes. In any case, a resizing of some source images may be processed to be in such situation. This resizing is not mandatory but helps in simplifying the description.

From each of these source images 13$i$, one or more 2D skeletons 2D-SK$^i_j$ 2003 are determined at step 2052. Such determination is based on the 3D model or models 20 to detect each part of them (or at least a maximum number of such parts) within each source image. Several occurrences of the same model can be detected within the same source image, meaning several 3D real world objects are present in the scene captured by the cameras.

In the example of FIG. 2, the detected 2D skeletons are made of up to thirteen parts with up to twelve connecting elements.

Known techniques can be used to produce these 2D skeletons from the source images 13$i$, as introduced above with respect to FIGS. 4 and 11: the one described in publication "*Realtime Multi-Person 2D Pose Estimation using Part Affinity Fields*" by Zhe Cao et al. (2016), the one described in publication "*DeeperCut: A Deeper, Stronger, and Faster Multi-Person Pose Estimation Model*" by Eldar Insafutdinov et al. (2016) or publication "*Deep-Cut: Joint Subset Partition and Labelling for Multi Person Pose Estimation*" by Leonid Pishchulin et al. (2016). All these techniques calculate confidence maps for part detection (i.e. part candidates with associated part probabilities) and part affinity fields for part association (i.e. pairwise terms with pairwise probabilities).

The part maps and part affinity fields are then processed to respectively obtain part candidates for each part type and limb candidates for each limb type. The limb candidates that share the same part candidates are then assembled into full-body poses, i.e. into 2D skeletons compliant with the 3D model 20.

In this process, each part candidate can be provided with a part probability while each limb candidate can be provided with a pairwise (or part affinity) probability, for instance based on the modulus of affinity vectors between the two part candidates. It results that, in embodiments of the third approach, each constructed 2D skeleton may be associated with a robustness score based on its part's part probabilities and its limb's pairwise probabilities.

In embodiments of the third approach, a robustness score can be obtained for each 2D skeleton generated based on the corresponding probabilities.

More generally, a convolutional neural network (CNN) can be used which is configured based on a learning library of pictures in which a matching with each part of the models has been made. The CNN detects parts with associated part probabilities and provides pairwise (or part affinity) probabilities between detected parts. Pairwise probabilities may be obtained from different means. For example, in the publication "*DeeperCut: A Deeper, Stronger, and Faster Multi-Person Pose Estimation Model*" by Eldar Insafutdinov et al. (2016), a logistic regression algorithm is used.

A graph solver is then used to build the 2D skeleton from the probabilities. The graph is made of nodes formed by the parts and links between the nodes. The nodes are weighted with corresponding part probabilities while the links are weighted with corresponding pairwise (or part affinity) probabilities. Different graph solvers can be used. For example, a bipartite solving of the graph reduces to a maximum weight bipartite graph matching problem as explained for instance in "Introduction to graph theory, volume 2" by D. B. West et al. (2001). Graph clustering algorithms can also be used as described in "*DeeperCut: A Deeper, Stronger, and Faster Multi-Person Pose Estimation Model*" by Eldar Insafutdinov et al. (2016). The optimal associations between the parts give the 2D skeletons.

An advantage of the CNNs is that the same running of the CNN can identify, within an input image, parts from different models, provided the CNN has learnt using learning pictures embedding the various models to be searched.

Typically, the part probabilities generated are unary, i.e. set between 0 and 1.

It turns out that step 2052 generates a plurality of sets of 2D skeletons 2D-SK$^i_j$ (where "i" identifies a source image and "j" indexes the 2D skeletons detected in source image i).

Step 2052 as described above operates directly on each source image 13$i$ as a whole. Embodiments may optimize such step.

These known techniques for step 2052 are dependent on the set of learning pictures used by the CNN to learn. To that aim, the learning pictures usually provide exemplary objects that have bounded sizes. These techniques are badly adapted to detect objects the size of which is not of the same order of magnitude than in the learning pictures. Indeed, 3D objects can be sometimes big, sometimes tiny. This is for instance the case during sport events where players move from very close to the camera to very far.

In first embodiments seeking to increase robustness, it is proposed to use scaling of the source image to find a better scaled version (if any) of the source image from which the 2D skeletons can be better detected.

To that end, one or more scaled versions of a given source image 13$i$ are obtained at step 2053 as explained above with reference to FIG. 4 or 11.

For instance, a half-sized image (scale 0.5) is generated (through down-sampling) as well as a double-sized image (scale 2—through up-sampling). Known scaling techniques can be used.

Of course, other scaling values can be used. In this example, at least one up-scaled version and one downscaled version of the source image are obtained and used. In variants, only up-scaled versions or only downscaled versions are used.

Next, part probabilities are determined at step 2054 for respective pixels of the source image or its scaled version (possibly each pixel if the part map has the same dimensions as the images) representing probabilities that the respective pixels in the source image or scaled version correspond to a (any one) part of the 3D real world object.

Pixels of the source image or of its scaled versions are examples of "samples" forming an image. For ease of illustration, it is made reference below to pixels, while the third approach may apply to any sample. A sample may be for instance a pixel in the source image, a color component of a pixel in the source image, a group of pixels in the source image, a group of pixel color components in the source image, etc.

The determination of part probabilities may be done using a CNN as described above. For instance, the part maps generated by such CNN convey such part probabilities. The merger (or superimposition) of several (e.g. the thirteen ones in the case of FIG. 2) part maps gives an "image" of part probabilities for each of the source image or scaled version.

Next, the part probabilities so generated can be used to determine from which one of the selected source image and its scaled versions, the set of one or more 2D skeletons should be determined. Thus, only one of the source image and its scaled versions is selected at step 2055 based on their part probabilities.

For instance, the scaled version (including the source image 13*i*) that maximizes the response of the CNN is selected. As an example, the response of the CNN may be defined as the number of samples/pixels associated with a part probability above a predefined threshold (whatever the part concerned). For instance, the predefined threshold may be set to 0.9 in case of unary probabilities. Of course, refinements of this approach may be contemplated. For instance, different thresholds may be used for different parts of the model considered.

The selected source image 13*i* or scaled version is then used for the actual 2D skeleton determination 2056 in order to obtain the 2D skeletons 2D-SK$_j^i$.

This is repeated for each source image, meaning that some source images can be selected for 2D skeleton determination 2056 while up-scaled versions of other source images can be selected for the same operation 2056 and down-scaled versions of yet other source images can also be selected for their own step 2056.

Optimization of step 2052 may also seek to reduce the amount of samples (pixels) to be processed simultaneously in the source images (or their selected scaled versions if any). To do so, relevant subparts of the selected image (source image or scaled version) are identified and selected. The determination 2056 of the 2D skeletons can thus be performed independently on each relevant subpart. This substantially reduces calculation complexity and memory consumption.

Implementing such approach, second embodiments thus provide:

clustering 2057 samples of the selected image into clusters;

determining 2058, for one or more, preferably each, clusters, a cropping area encompassing (i.e. including) the cluster in the image; and determining 2059 one or more 2D skeletons from each cropping area independently.

These steps are repeated for each selected image (source images 13*i* or their scaled versions).

To perform the clustering 2057, the selected image (source image or a scaled version) is used to build a graph made of nodes formed by detected parts and links between the nodes. The nodes are weighted with corresponding part probabilities while the links between the nodes are set (e.g. depending on their weights: for instance, no link is set when the weight is too low) and weighted with corresponding pairwise (or part affinity) probabilities.

Preferably, a graph/tree is built including all part candidates (i.e. for all the parts).

A conventional graph clustering, preferably without transitivity constraint, makes it possible to create clusters of part candidates (with their links between them). This clustering makes it possible to separate quite distant objects in the image.

Transitivity constraints guarantee the consistency of the graph clustering. For example, if a neck is connected to a right shoulder and if the right shoulder is to a right elbow, connectivity constraints guarantee that the neck will be connected to the right elbow. These constraints are introduced in the graph clustering algorithm (e.g. by using an Integer Linear Programming algorithm) to obtain the more coherent and best solution. Resolving the graph clustering without transitivity constraints is less optimal but faster.

Once the clusters are known, each cluster is successively considered. For a given cluster, the selected image (or optionally the corresponding source image, in which case rescaling of the part candidates is performed beforehand) can be cropped 2058 around the cluster. This defines cropping areas in the selected image.

The cropping may select the smallest (square or rectangle) portion of the image that includes all the part candidates of the cluster. Optionally, a guard margin may be kept around the part candidates.

Next, the 2D skeletons can be determined 2059 independently from each cropping area.

To fully take advantage of the cropping, a new selection of the best scaling factor of the cropping area is performed. This requires the portions corresponding (given the scaling) to the cropping area in the source image 13*i* and in its scaled versions are compared using the approach described above (steps 2054-2055) to select the cropping area in the source image or a scaled version of it image that maximizes the response of the CNN.

More generally, one or more scaled versions of the cropping area in the image are obtained, part probabilities are determined for respective samples of the cropping area in the image and its scaled versions representing probabilities that the respective samples in the cropping area or scaled version correspond to a part of the 3D real world object, and one (preferably only one) from the cropping area in the image and the scaled versions of the cropping area is selected based on their part probabilities from which selected cropping area or scaled version the set of one or more 2D skeletons is determined. The criteria described above for the selection can be reused.

A cropping area from the source image or one of its scaled versions is finally selected (this is made for each cluster determined at step 2057 and for each source image). 2D skeletons can be determined 2059 from this selected cropping area. This may merely rely on graph solving as introduced above.

The selected cropping area (from the source image or one of its scaled versions) is then used to build a graph made of nodes formed by parts detected in it and links between the nodes. The nodes are weighted with corresponding part probabilities while the links may be set depending on the pairwise (or part affinity) probabilities (for instance no link is set in case the corresponding probability is too low) and weighted with corresponding pairwise (or part affinity) probabilities.

A graph clustering without transitivity constraint can then be performed on this graph, which makes it possible to create new clusters of part candidates (with their links between them). This helps to further separate slightly distant objects.

A second graph clustering but with transitivity constraint can next be performed on each sub-graph corresponding to one of the clusters so created, which makes it possible to create new sub-clusters of part candidates (with their links between them).

At this stage a connected component algorithm may be used to connect the part candidates within each sub-cluster according to the 3D model 20. This step builds numerous connections between the part candidates.

At this stage, it may be possible to have several positions for a same part. For example, several head positions, several neck positions, and so on. Therefore, several different 2D skeletons of the same object may exist.

So, the best 2D skeleton among the potential ones may be extracted from each sub-cluster.

To determine the best 2D skeleton, a shortest tree path detection algorithm may be performed on one (or more) graph/tree built based on the sub-cluster.

The ending parts of the 3D models are considered, and paths from one ending part to each other are defined. Generally, a 3D model has P ending parts. In that case, P-1 paths can be defined from a given ending part. In the example of FIG. 2, five ending parts are defined: head, left hand, right hand, left foot and right foot. Four paths can be defined, head-to-right-hand path, head-to-left-hand path, head-to-right-foot path and head-to-left-foot path. Each path includes intermediate parts (e.g. neck, right shoulder, right elbow for the head-to-right-hand path).

A complete tree is built for each path between each ending part candidates of the sub-cluster. For instance, a complete graph/tree between each head candidates and each right hand candidates passing through the neck candidates, right shoulder candidates and right elbow candidates of the sub-cluster is built. Some weights are associated with each edge of the tree (link between two part candidates corresponding to different adjacent parts). For example, the weights can be the pairwise probabilities between the two nodes or a combination of node part probabilities and pairwise probabilities. The tree can be then segmented into independent sub-trees, each sub-tree defining a unique path between adjacent parts. The construction of the sub-tree can be viewed as a graph segmentation.

A global solution of this segmentation is the one (i.e. the path of part candidates) that maximizes the total weights of the independent sub-trees. This is the solving of the tree.

For instance, when several part1 (e.g. head) candidates and/or part2 (e.g. neck) candidates exist, the various end-to-end paths may use different links between a part1 candidate and a part2 candidate. It means that among the various end-to-end paths determined in the sub-graph, some part1-to-part2 links are more or less used. Preferably, the solving outputs the part candidates of links that are most often used, for instance the head and neck candidates forming the link the most selected by the end-to-end shortest path solver. To illustrate this, if a pair of head and neck candidates is selected by three end-to-end paths and another pair of different head and neck candidates is selected by a single end-to-end path, the final pair of head and neck candidate is the one associated with the three paths. In case of equality, the pair with the highest edge weight can be selected.

It results that a 2D skeleton 2D-SK$^i_j$ (complete with thirteen parts in the example, or partial) is obtained.

This process of segmentation/subtree generation is repeated for all paths of the sub-cluster, and then for all sub-clusters.

It results that one or more 2D skeletons 2D-SK$^i_j$ 2003 are generated for each cluster of part candidates, and then for each original source image.

Preferably, the obtained 2D skeletons are rescaled to the original scaling of their source images.

This ends the determination 2052 of the 2D skeletons 2D-SK$^i_j$ from each source image i.

A matching between the generated 2D skeletons is thus sought. This is step 2060 of matching, for one or more pairs and preferably each pair of the simultaneous source images, each of one or more 2D skeletons of one of the two corresponding sets (preferably each skeleton of the set) with at most one respective skeleton of the other set, if any.

An implementation of such matching 2060 includes first determining 2061 a skeleton distance between two 2D skeletons (taken from two sets), and matching 2062 the 2D skeletons together depending on the skeleton distance. This is repeated for all pairs of 2D skeletons (one from the first set and the other from the second set).

As described below, such skeleton distance being determined in the source images, the latter are preferable rescaled, if necessary, to be all at the same resolution and have homogeneous image coordinates.

In embodiments, a part distance is determined between two corresponding parts of the 2D skeletons considered. Preferably, this determining is repeated for other parts (preferably all parts) composing the 2D skeletons, and the determined part distances are summed. The final sum may be the skeleton distance.

Figure 21:
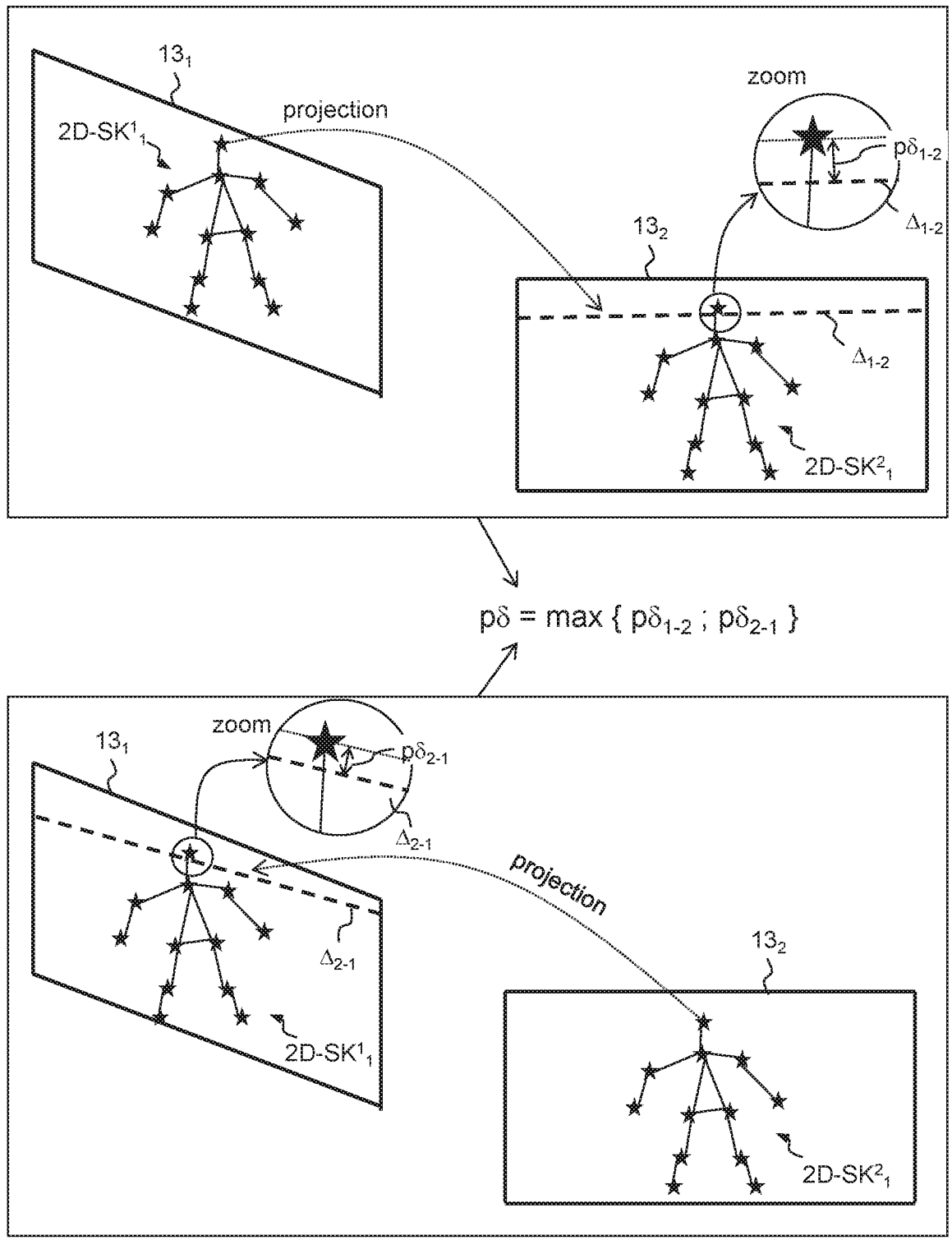
FIG. 21 schematically illustrates a way to compute a part distance between the same parts of two 2D skeletons according to embodiment of the third approach.
Figure 22:
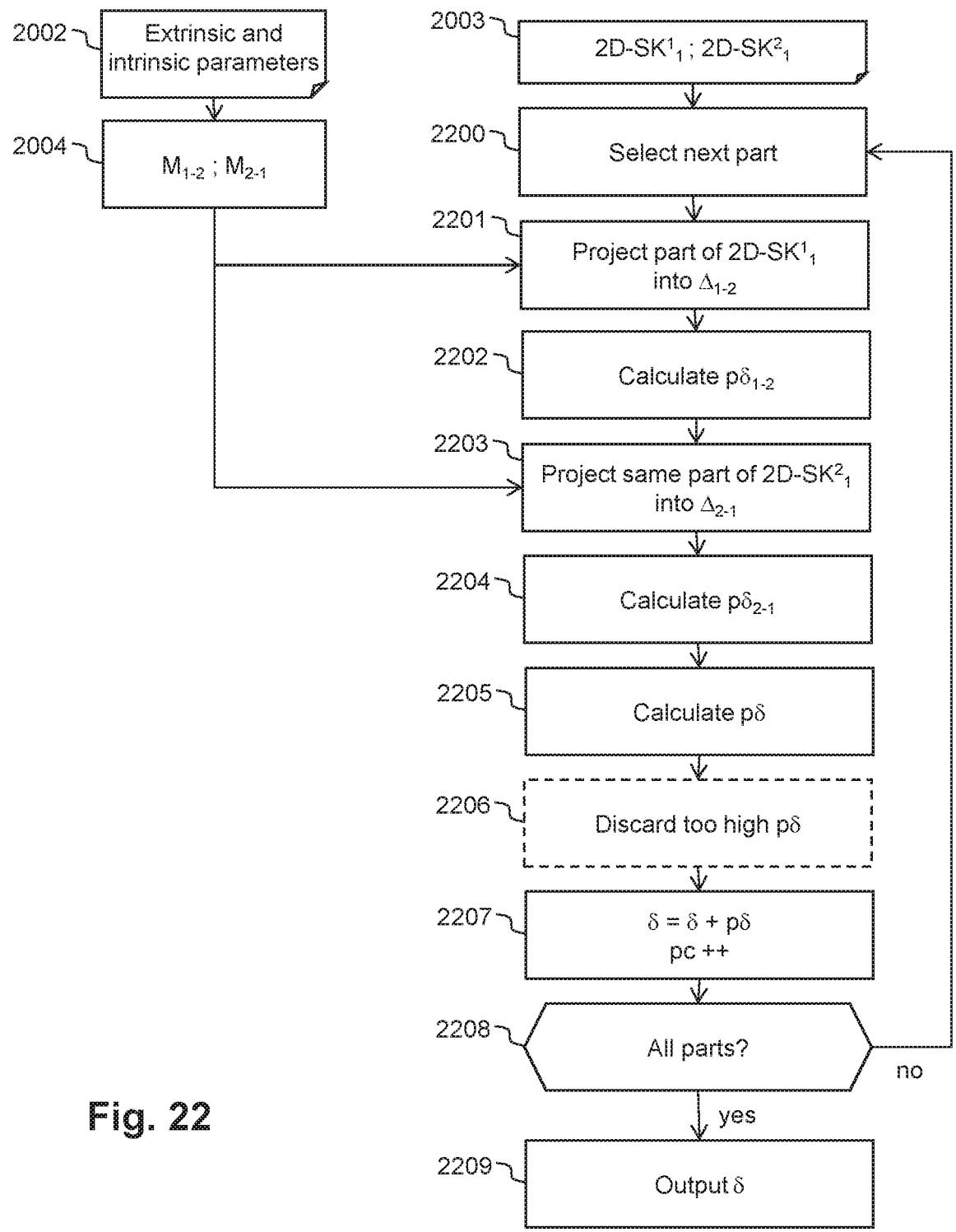
FIG. 22 illustrates, using a flowchart, steps for computing a skeleton distance between two 2D skeletons.

FIG. 21 schematically illustrates a way to compute a part distance p$\delta$ between the same parts of two 2D skeletons 2D-SK$^1_1$ and 2D-SK$^2_1$ provided by two source images 13$_1$ and 13$_2$. The parts forming the 2D skeletons are shown with black stars. FIG. 22 illustrates, using a flowchart, the corresponding operations. This computing method has similarities with the one of FIG. 12 (within the context of the second approach) exemplified by FIG. 13.

As for FIG. 12, the top half of FIG. 20 illustrates the computation of the first directional part distance p$\delta_{1-2}$ while the bottom half illustrates the computation of the second directional part distance p$\delta_{2-1}$.

As shown, a part (the head in the example) is selected at step 2200. This part of a first 2D skeleton 2D-SK$^1_1$ determined from a first source image 13$_1$ is projected 2201 as a first epipolar line $\Delta_{1-2}$ on the second source image 13$_2$. Next, a first directional part distance p$\delta_{1-2}$ is computed 2202 between the same part (the head in the example) of a second 2D skeleton 2D-SK$^2_1$ determined from the second source image 13$_2$ and the first epipolar line $\Delta_{1-2}$. The distance may merely be the orthogonal distance between the part and the line (e.g. in number of pixels).

Symmetrically, the part (the head in the example) of the second 2D skeleton 2D-SK$^2_1$ can be projected 2203 as a second epipolar line $\Delta_{2-1}$ on the first source image 13$_1$, and a second directional part distance p$\delta_{2-1}$ can be computed 2204 between the same part (the head in the example) of the first 2D skeleton 2D-SK$^1_1$ and the second epipolar line $\Delta_{2-1}$.

The part distance p$\delta$ between the head parts of the two 2D skeletons may thus be selected 2205 as the maximum distance between the first and second directional part distances p$\delta_{1-2}$ and p$\delta_{2-1}$: p$\delta$=max{p$\delta_{1-2}$; p$\delta_{2-1}$}. In a variant, the mean value between the two directional part distances can be selected.

Of course, to simplify the process, only one directional part distance can be computed and kept as part distance p$\delta$.

Optional step 2206 may discard the distances that are evaluated as being too high to mirror 2D skeletons belonging to the same object. In this context, step 2206 may provide comparing the part distance p$\delta$ with a predefined threshold (e.g. 20 pixels), and if the part distance is above the predefined threshold, the part distance p$\delta$ is discarded from the determining of the distance between the 2D skeletons. Discarding the part distance may merely indicate it is not taken into account for the next steps described below.

Next at step 2207, the skeleton distance $\delta$ between the two 2D skeletons (initially set to 0) is incremented by the obtained part distance p$\delta$ (if not discarded). This step progressively computes skeleton distance $\delta$.

At the same step, a part counter pc (initially set to 0) is incremented by 1 (if p$\delta$ is not discarded) to count the number of parts taken into account in the calculation of $\delta$.

These operations are repeated for each part of the 2D skeletons (i.e. up to thirteen parts in the example of FIG. 2) by looping back to step 2200 to select a new part.

When all the parts have been processed (test 2208), the value δ is output 2209 as the final skeleton distance between the two 2D skeletons. It means that skeleton distance δ is associated with the pair formed of the two 2D skeletons considered.

Optionally, at step 2209, counter pc may be compared to a second predefined threshold (e.g. 8 for 13 parts in the model 20) to determine whether the two 2D skeletons are close enough. If pc is below the second predefined threshold, no skeleton distance is associated with the pair of 2D skeletons. For instance, skeleton distance δ is set to an infinite value.

By using this algorithm, a skeleton distance δ is computed for each pair of 2D skeletons coming from two different source images. For instance all skeleton distances δ(2D-$SK^1_j$,2D-$SK^2_k$) between a 2D skeleton 2D-$SK^1_j$ determined from source image $13_1$ and 2D skeleton 2D-$SK^2_k$ determined from source image $13_2$ are known at the end of step 2061.

Next step is step 2062 consisting in determining matchings between pairs of 2D skeletons. This determining is based on these skeleton distances.

In embodiments, this is made using a graph. This is to obtain one or more one-to-one associations between a 2D skeleton 2D-$SK^1_j$ determined from the first source image $13_1$ and a 2D skeleton 2D-$SK^2_k$ determined from the second source image $13_2$.

The graph may be built with nodes corresponding to the 2D skeletons of the two sets and with weighted links between nodes that are set based on the determined skeleton distances between the corresponding 2D skeletons. In this graph, a node (i.e. a 2D skeleton of a first set) is linked to a plurality of other nodes (2D skeletons of the other set). No link is set between nodes corresponding to 2D skeletons of the same set.

A bipartite solving of this graph as introduced above outputs optimal one-to-one associations between 2D skeletons. It means that a 2D skeleton 2D-$SK^1_j$ of the first set is at the end linked (i.e. matched) to at most one 2D skeleton 2D-$SK^2_k$ of the other set.

The bipartite solving may be based on the link weights only, meaning the one-to-one matchings correspond to the minimums of the sum of the link weights in the graph. Optionally, the nodes may be weighted using the robustness scores indicated above (in which case an appropriate formula between the node weights and the link weights is used).

Once the matched 2D skeletons 2005 (i.e. pairs of 2D skeletons) are known, a weak 3D skeleton W3D-SK is generated from each pair of matched 2D skeletons. This is step 2063. This is to obtain plenty of weak 3D skeletons in the volume.

The 3D skeletons built at step 2063 are said to be "weak" because they are not the final ones.

Step 2063 of forming the 3D skeletons uses inter-view 2D triangulation to convert two matched 2D skeletons into a weak 3D skeleton. 2D triangulation is made each part by each part.

Figure 23:
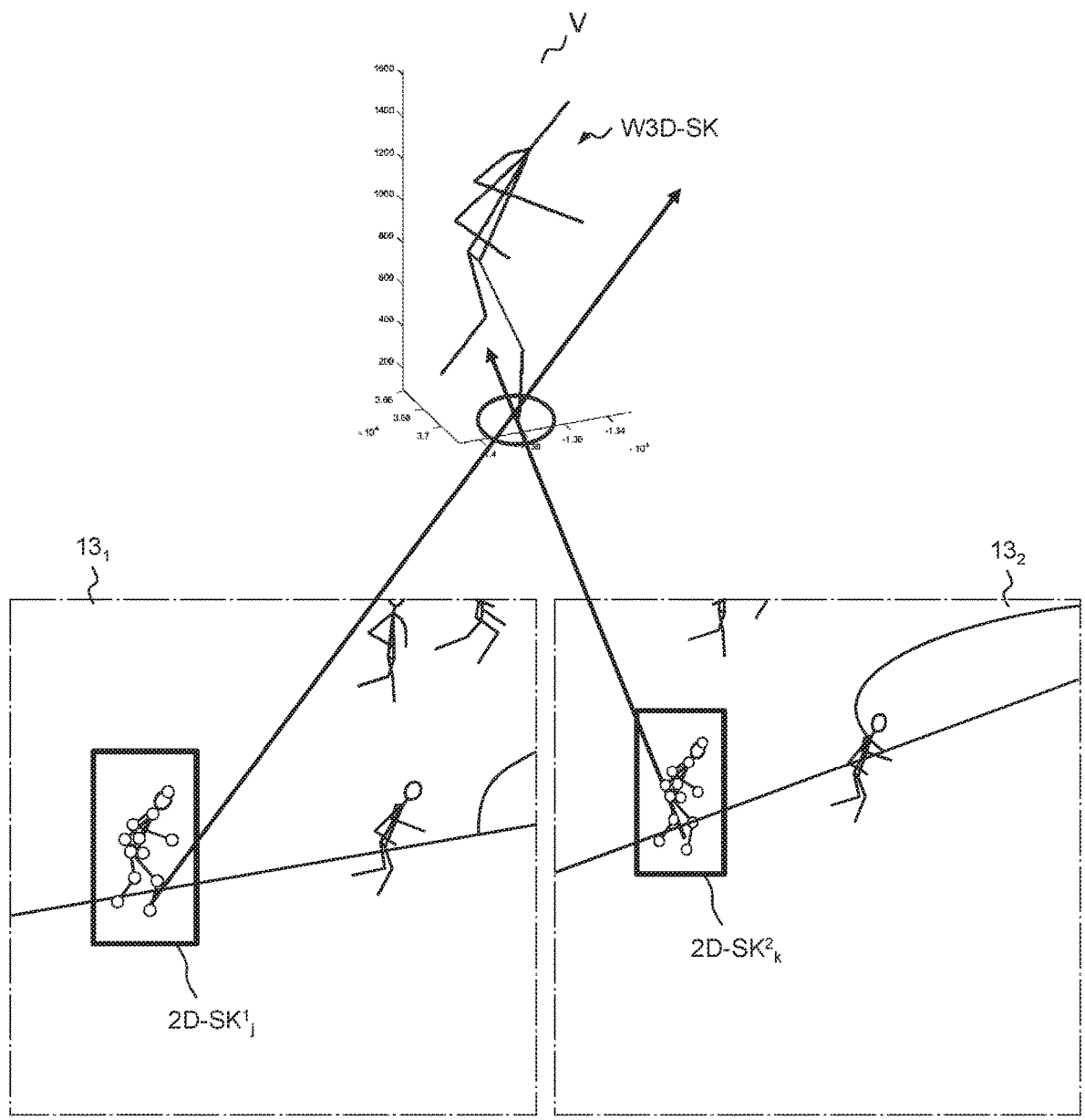
FIG. 23 schematically illustrates a triangulation way to build a weak 3D skeleton from a matching pair of two matched 2D skeletons according to embodiment of the third approach.

An exemplary implementation of this step is illustrated in FIG. 23. It is made of three main sub-steps, namely:

projecting a part (for instance a foot in the shown example) of a first 2D skeleton 2D-$SK^1_j$ of the matching pair as a first line $\Delta_1$ in 3D space (e.g. volume V representing the scene volume when it is defined). The projection corresponds to the line shown in FIG. 5 for instance from a part in the source image. This projection is a geometrical issue based on the extrinsic parameters of the corresponding camera (here camera $12_1$);

projecting the same part of the second 2D skeleton 2D-$SK^2_k$ of the matching pair as a second line $\Delta_2$ in the 3D space; and determining a 3D position (e.g. a voxel V(X,Y,Z)) locating the part (here the foot) for the weak 3D skeleton W3D-SK, based on the first and second lines.

The two lines $\Delta_1$ and $\Delta_2$ rarely intersect one the other in the same 3D position or the same voxel. If they intersect, the intersecting point or voxel is elected as representing the part considered. Otherwise, the closest 3D point or voxel to the two lines is preferably selected. The closeness can be evaluated based on a least square distance approach.

These steps can indeed be repeated for all parts composing the 2D skeletons of the matching pair. It results that a plurality of 3D positions locating, in the 3D space, a plurality of parts forming the weak 3D skeleton is obtained. The weak 3D skeleton W3D-SK is thus formed.

Step 2063 is performed for each matching pairs of 2D skeletons. The result is a plurality of weak 3D skeletons 2006 built in the 3D space. Several weak 3D skeletons correspond to the same 3D object.

That is why these various weak 3D skeletons are then converted into one or more (final) 3D skeletons 3D-SK. This is step 2065. Beforehand, a clustering of the weak 3D skeletons can be performed at step 2064 in order to reduce the complexity of next step 2065.

The clustering may be based on the 2D skeletons from which the 3D weak skeletons are built. For instance, the 3D weak skeletons sharing a common 2D skeleton can be grouped into the same cluster. Such clustering approach aims at grouping the 3D weak skeletons liable to represent the same 3D object.

For illustrative purposes, it is assumed that a first 3D weak skeleton is built from source images $13_1$ and $13_2$ based on a matching pair between 2D-$SK^1_1$ (from $13_1$) and 2D-$SK^2_1$ (from $13_2$); a second 3D weak skeleton is built from source images $13_2$ and $13_3$ (not shown in the Figures) based on a matching pair 2D-$SK^2_1$ (from $13_2$) and 2D-$SK^3_4$ (from $13_3$). The two 3D weak skeletons are grouped into the same cluster because they share the same 2D skeleton, namely 2D-$SK^2_1$.

It is also assumed that a third 3D weak skeleton is built from source images $13_1$ and $13_3$ based on a matching pair between 2D-$SK^1_1$ (from $13_1$) and 2D-$SK^3_4$ (from $13_3$). This third 3D weak skeleton shares the same 2D skeletons as the two first 3D weak skeletons. In this context, the three 3D weak skeletons are coherent and can thus be grouped into the same cluster.

However, if the third 3D weak skeleton was built from a matching pair between 2D-$SK^1_1$ (from $13_1$) and 2D-$SK^3_6$ (from $13_3$) [thus no longer from 2D-$SK^3_4$], it is also grouped in the same cluster as it shares 2D-$SK^1_1$ with the first 3D weak skeleton. The remainder of the process as described below should be appropriate to limit the effect of this incoherent third 3D weak skeleton in the building of the final 3D skeleton.

The combining of weak 3D skeletons of a cluster into a "robust" 3D skeleton can be performed based on spatial closeness criterion and performed part after part.

For instance, 3D positions (or voxels) of the weak 3D skeletons locating/representing the same part of the weak 3D skeletons can be converted into a unique 3D position (or voxel) for the part, i.e. a part forming the "robust" 3D skeleton 3D-SK. As the same process is repeated for each part, the parts forming 3D-SK are progressively built.

Figure 24:
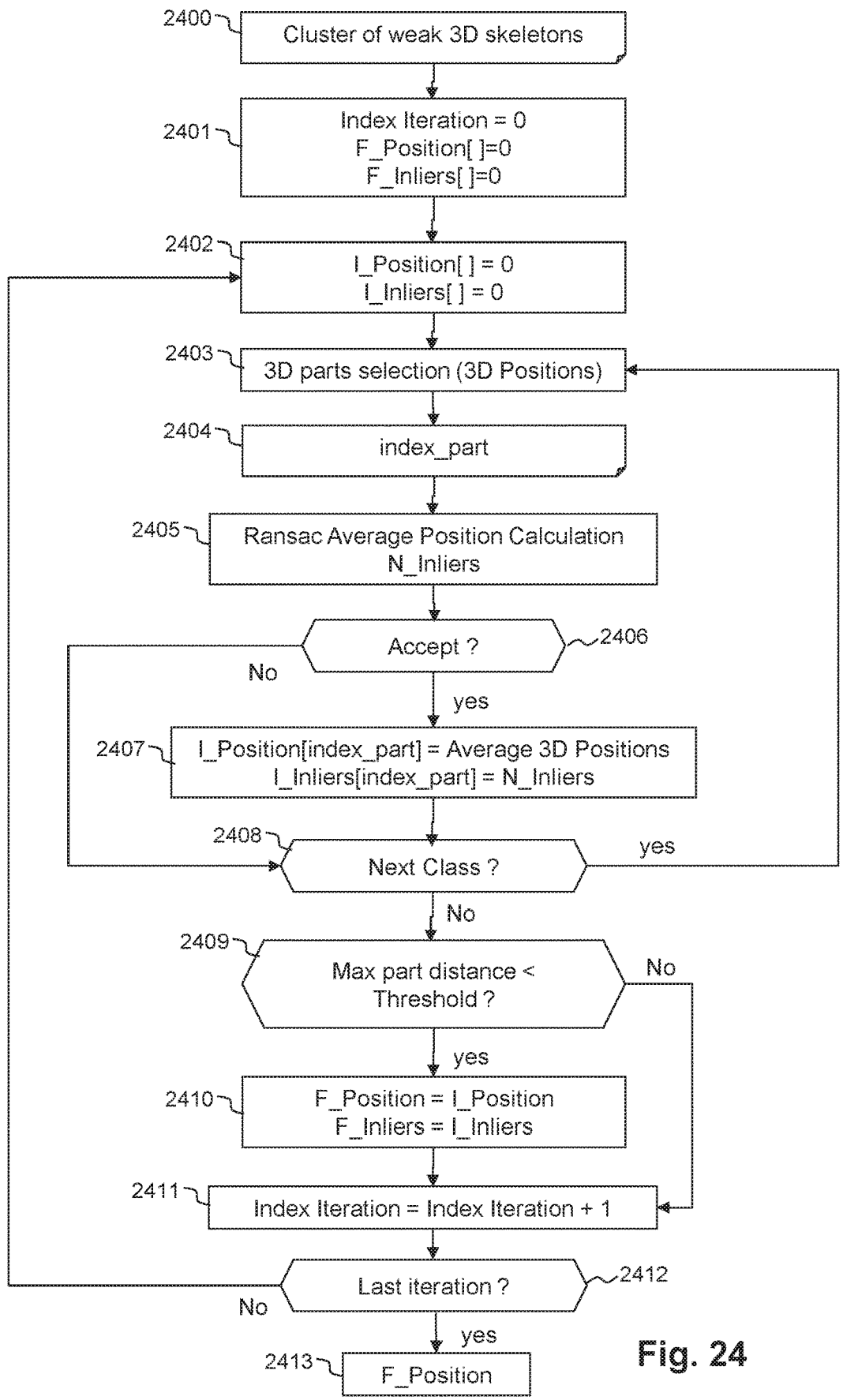
FIG. 24 illustrates, using a flowchart, steps for converting weak 3D skeletons into a robust 3D skeleton according to embodiments of the third approach.

The conversion can be based on spatial closeness. For instance, a RANSAC (RANdom SAmple Consensus) algorithm with a local/global fitting model can be applied. This is illustrated in FIG. 24.

Let consider variable N as being the number (less 1) of parts forming the model 20 (at the end N is 12 in the case of FIG. 2), variable index_part as indexing each part type, table F_Position as defining the final 3D positions of the N parts and table F_Inliers as defining the numbers of inliers for the N parts respectively.

Starting from the cluster 2400 of weak 3D skeletons, step 2401 initializes N to 0 and tables F_Position and F_Inlier to empty tables.

At step 2402, two interim tables I_Position and I_Inliers are initialized to 0 for the current iteration.

At step 2403, the 3D positions corresponding to the same part in the weak 3D skeletons are selected. This part is indexed by variable index_part 2404.

For example, if ten weak 3D skeletons are considered, at most ten 3D positions corresponding to the heads of these skeletons are obtained. Of course, some weak 3D skeletons may be partial and not comprise the part currently considered.

A RANSAC average 3D position is then calculated at step 2405 from the selected 3D positions.

The RANSAC approach calculates a robust average 3D position as the average of selected inliers, i.e. selected 3D positions. These selected 3D positions are accepted as inliers for the computation if their distance to other robust 3D positions is below a threshold.

The number of inliers N_Inliers (i.e. the number of voxels that are close to the average 3D position calculated by the RANSAC algorithm) are calculated. This is a functionality of the RANSAC algorithm.

If this number N_Inliers is higher than a given threshold (e.g. 5) and higher than the number of inliers already stored in F_Inliers[index_part], then the calculated average 3D position is accepted at step 2406. This triggers an interim table updating step 2407 during which the temporary position for the current part, i.e. I_Position[index_part], is set to the calculated average 3D position and the temporary number of inliers for the current part, i.e. I_Inliers[index_part] is set to N_Inliers. This is to memorize the 3D position calculated from the maximum number of inliers for each part, throughout the iterations. Next step is step 2408.

Otherwise, if N_Inliers is less than the threshold or less than F_Inliers[index_part], no update is made and the process goes directly to step 2408.

At step 2408, the next part is considered and the process loops back to step 2403 to consider all 3D positions corresponding to this next part.

When all the parts have been processed, a set of 3D positions for all parts is available and stored in table 'I_Position'. Next step 2409 then consists in checking whether the calculated 3D positions meet some morphological constraints defined by the 3D model 20.

These can be based on distances between 3D positions of parts.

For instance, the constraints may vary from one part to the other. For instance, a common head-neck distance is higher than 10 cm but less than 40 cm, a common pelvis-knee distance is higher than 20 cm but less than 80 cm, and so on. A check may thus be performed on a part-to-part basis.

Alternatively, it may merely be checked that all the 3D positions are comprised within the same constrained volume, e.g. a sphere with a radius of 2 meters for human beings.

In the affirmative of step 2409, the final positions and inliers tables 2401 can be updated 2410 with the interim tables: F_Position=I_Position and F_Inliers=I_Inliers for each part meeting the constraint of step 2409. Next step is step 2411.

In the negative, next step is step 2411.

At step 2411, a next iteration is started by looping back to step 2402. The number of iterations can be predefined.

At the end (test 2412 of last iteration is negative), F_Position defines 2413 the final 3D positions for the parts forming a 3D model. This is the final "robust" 3D skeleton for the current cluster.

Figure 25:
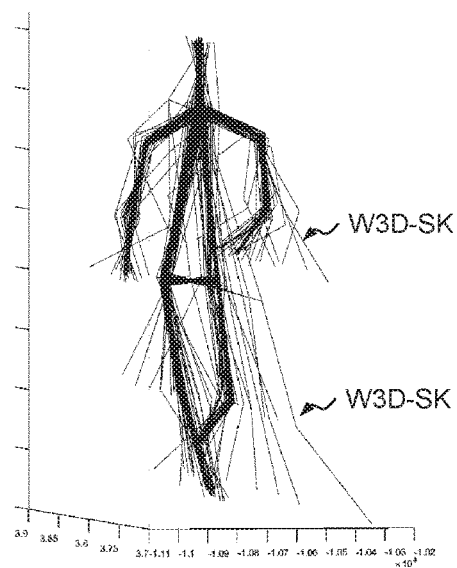
FIG. 25 illustrates bundles of weak 3D skeletons obtained when applying the process of FIG. 24 to generate robust 3D skeletons.
Figure 25:
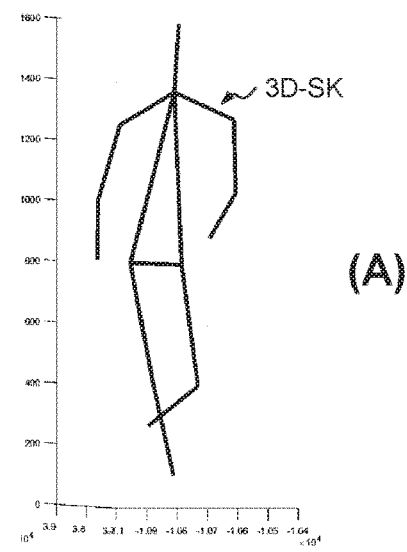
Figure 25:
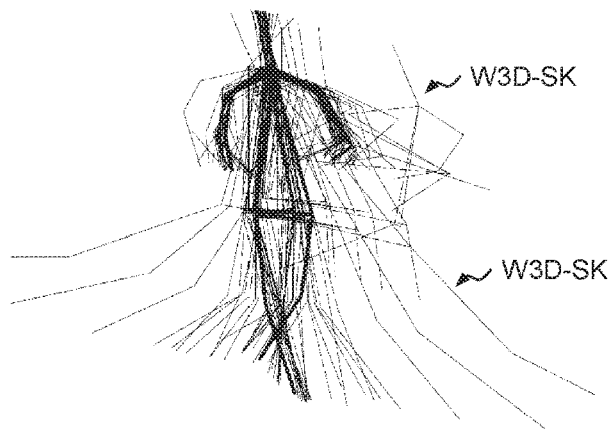
Figure 25:
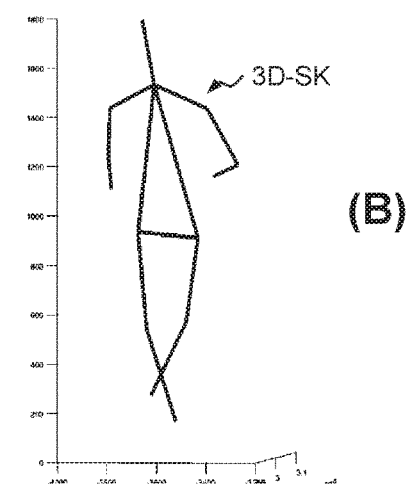
Figure 25:
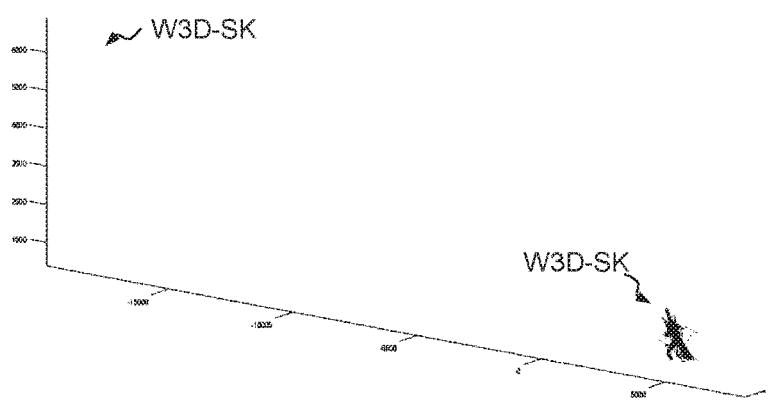
Figure 25:
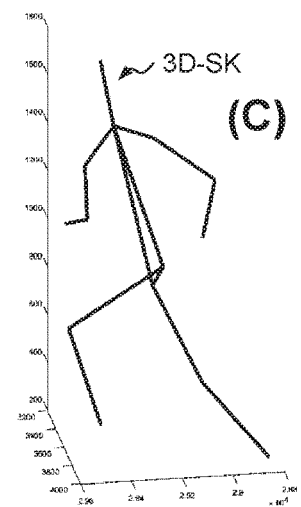

FIG. 25 illustrates the result of such operations on three clusters of weak 3D skeletons W3D-SK to obtain, each time, a final robust 3D skeleton 3D-SK. The three bundles of weak 3D skeletons W3D-SK are shown on the left side of the Figure, while the three final robust 3D skeletons 3D-SK are shown on the right side.

FIG. 25(A) shows a case where the weak 3D skeletons (of the same cluster) have low variability and are located at roughly the 'same' 3D positions. This situation mirrors an efficient matching between the 2D skeletons between the source images as well as a stable and accurate detection of the 2D skeletons from the source images.

FIG. 25(B) shows a case where the weak 3D skeletons have higher variability but are located at roughly the 'same' 3D positions. This situation mirrors an efficient matching between the 2D skeletons from the source images, but an unstable detection of the 2D skeletons (or some parts of the 2D skeletons) from the source images.

Last, FIG. 25(C) shows a case where the weak 3D skeletons have high variability and not located at the 'same' 3D positions. This mirrors a low efficient matching between the 2D skeletons from the source images. Some generated weak 3D skeletons are even false 3D skeleton. However, despite some false 3D skeletons, the majority of the 3D weak skeletons are at roughly the right position.

All of this makes it possible to obtain a final and robust 3D skeleton 3D-SK as shown on the right part of FIG. 25(A), FIG. 25(B) and FIG. 25(C).

Back to FIG. 20, step 2065 is thus performed on each cluster of weak 3D skeletons, thereby generating a plurality of robust 3D skeletons.

A final, and optional, step 2066 may consist in deleting therefrom duplicates or redundant 3D skeletons, i.e. allegedly robust 3D skeletons that correspond to the same 3D object.

First sub-step consists in detecting such duplicates. Two approaches are proposed for illustrative purposes.

In one approach, a gravity center of each 3D skeleton 3D-SK is first computed, for instance as the iso-barycenter of all 3D positions (or voxels) of parts forming the 3D skeleton 3D-SK. Two 3D skeletons may be considered as duplicates or redundant if the distance between their gravity centers is below a predefined threshold.

In another approach, an average 3D distance between each pair of 3D skeletons is first computed. The average 3D distance may be the sum of part distances between the same (existing) parts of the two 3D skeletons. Two 3D skeletons may be considered as duplicates or redundant if their average 3D distance is below a predefined threshold.

Next sub-step thus consists in selecting one of the 3D skeleton duplicates. For instance, the 3D skeleton having the higher number of parts is selected.

Some applications may require that the 3D skeleton or skeletons obtained at step 2065 or 2066 (thus generated using the process of the Figure) be displayed, for instance using the display screen 15. A 2D or 3D image of the 3D object or objects can thus be generated using the obtained 3D skeleton or skeletons. This may be done using the process described above with reference to FIG. 6.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for generating a 3D skeleton of a 3D real world object observed by source cameras in a scene volume, comprising the following steps performed by a computer system:
    obtaining, from memory of the computer system, two simultaneous source 2D images of the scene volume recorded by the source cameras;
    generating, from a first obtained source 2D image, one or more first part 2D maps for one or more respective parts of the 3D real world object, and generating, from a second obtained source 2D image, one or more second part 2D maps for the one or more respective parts of the 3D real world object, each of the first and second part 2D maps for a given part comprising part probabilities for respective 2D samples of the first or second source 2D image representing probabilities that the respective 2D samples correspond to the given part;
    generating one or more sets of part volume 3D data for respectively the one or more parts, wherein generating a set of part volume 3D data for a respective part includes:
        projecting elementary voxels of the scene volume onto projection 2D samples of the first and second part 2D maps corresponding to the respective part; and
        for each elementary voxel:
            obtaining a first part probability of its projection 2D sample in the first part 2D map corresponding to the respective part,
            obtaining a second part probability of its projection 2D sample in the second part 2D map corresponding to the respective part, and
            computing a joint part probability associated with the elementary voxel for the respective part, based on the obtained first and second part probabilities;
    generating one or more parts of the 3D skeleton using the one or more sets of part volume 3D data generated.

2. The method of claim 1, further comprising using a first set of part volume 3D data to restrict an amount of elementary voxels to be projected on part 2D maps to generate a second set of part volume 3D data.

3. The method of claim 2, wherein using the first set of part volume 3D data includes:
    determining part candidates of the 3D real world object from the first set of part volume 3D data,
    defining bounding 3D boxes around the determined part candidates in the scene volume, wherein the number of elementary voxels to be projected on the part 2D maps to generate a second set of part volume 3D data is restricted to the defined bounding boxes.

4. The method of claim 3, wherein using the first set of part volume 3D data further includes merging bounding boxes into a new bounding box where the bounding boxes overlap each other.

5. The method of claim 1, wherein generating a part 2D map from a source 2D image for a respective part includes:
    obtaining one or more scaled versions of the source 2D image,
    generating, from each of the source 2D image and its scaled versions, an intermediary part 2D map for the respective part, the intermediary part 2D map comprising part probabilities for respective 2D samples of the source 2D image or its scaled version representing probabilities that the respective 2D samples correspond to said part of the 3D real world object, and
    forming the part 2D map with, for each 2D sample considered, the highest part probability from the part probabilities of the generated intermediary part 2D maps for the same 2D sample considered.

6. The method of claim 1, wherein computing the joint part probability for an elementary voxel includes dividing the sum of the part probabilities of its projection 2D samples in the part 2D maps corresponding to the respective part, by the number of such part 2D maps.

7. The method of claim 1, wherein generating one or more parts of the 3D skeleton includes:
    determining two or more sets of part candidate or candidates from respectively the part volume 3D data, each part candidate corresponding to an elementary voxel with an associated joint part probability,
    solving a graph to associate together part candidates coming from different sets of part candidates, wherein nodes in the graph correspond to the part candidates of the two or more sets with their associated joint part probabilities and weighted links between nodes are set, and
    selecting associated part candidates as parts of the 3D skeleton.

8. The method of claim 7, wherein exactly two sets of part candidates are used in a graph that correspond to two parts that are adjacent according to a 3D model of the 3D real world object,
    and solving the graph consists in obtaining a one-to-one association between a first part candidate of the first candidate set and a second part candidate of the second candidate set.

9. The method of claim 8, wherein generating one or more parts of the 3D skeleton includes:
    repeating the determining and solving steps for a plurality of pairs of adjacent parts,
    connecting one-to-one-associated part candidates of two or more pairs of adjacent parts to obtain 3D skeleton candidate or candidates, and selecting at least one 3D skeleton candidate from the obtained 3D skeleton candidate or candidates, as a 3D skeleton of the 3D real world object.

10. The method of claim 9, wherein selecting at least one candidate 3D skeleton is based on at least one from:
    a number of parts forming the 3D skeleton candidate according to the 3D model,
    the joint part probabilities associated with the nodes of the 3D skeleton candidate in the graphs,
    the weights set for the links between the nodes of the 3D skeleton candidate in the graphs, and
    a number of source 2D images onto which the 3D skeleton candidate can be projected.

11. The method of claim 7, further comprising generating, from each source 2D image, a part affinity field for the two adjacent parts that includes affinity vectors for respective 2D samples of the source 2D image, the magnitude and direction of each affinity vector representing estimated orientation probability and orientation of an element connecting, according to the 3D model, two said adjacent parts at the respective 2D sample in the source 2D image,
    wherein the weights set for the weighted links are based on the generated part affinity fields.

12. The method of claim 11, wherein setting a weight for a link between a first part candidate of a first candidate set and a second part candidate of a second candidate includes:
    projecting the first and second part candidates onto a generated part affinity field, and
    computing the weight based on affinity vectors located between the two projected part candidates in the generated part affinity field.

13. The method of claim 12, wherein computing the weight includes computing the scalar products of a vector formed by the two projected part candidates and the affinity vectors located between the two projected part candidates.

14. The method of claim 12, wherein setting the weight for the link between the first and second part candidates includes:
    repeating the projecting and computing steps for all the generated part affinity fields to obtain an elementary link weight from each part affinity field, and
    summing the computed elementary link weights to obtain a weight for the link.

15. The method of claim 7, wherein determining part candidate or candidates from part volume 3D data includes determining local maximum or maxima of the joint part probabilities and outputting elementary voxel or voxels corresponding to the determined local maximum or maxima.

16. The method of claim 7, wherein setting a link between two nodes in the graph corresponding to part candidates of two sets depends on morphological constraints defined by the 3D model between the two corresponding parts.

17. The method of claim 7, wherein a weight for a weighted link between two nodes corresponding to part candidates of two sets depends on a distance between the two part candidates.

18. A method for displaying a 3D skeleton of one or more 3D real world objects observed by cameras, comprising the following steps performed by a computer system:
    generating a 3D skeleton of a 3D real world object using the generating method of claim 1,
    selecting a viewpoint in 3D space, and
    displaying, on a display screen, the generated 3D skeleton from the viewpoint.

19. A non-transitory computer-readable medium storing a program which, when executed by a microprocessor or computer system in a device, causes the device to perform the method of claim 1.

20. A system for generating a 3D skeleton of a 3D real world object observed by source cameras in a scene volume, comprising at least one microprocessor configured for carrying out the steps of:
    obtaining, from memory of the computer system, two simultaneous source 2D images of the scene volume recorded by the source cameras;
    generating, from a first obtained source 2D image, one or more first part 2D maps for one or more respective parts of the 3D real world object, and generating, from a second obtained source 2D image, one or more second part 2D maps for the one or more respective parts of the 3D real world object, each of the first and second part 2D maps for a given part comprising part probabilities for respective 2D samples of the first or second source 2D image representing probabilities that the respective 2D samples corresponds to the given part;
    generating one or more sets of part volume 3D data for respectively the one or more parts, wherein generating a set of part volume 3D data for a respective part includes:
        projecting elementary voxels of the scene volume onto projection 2D samples of the first and second part 2D maps corresponding to the respective part; and
        for each elementary voxel:
        obtaining a first part probability of its projection 2D sample in the first part 2D map corresponding to the respective part,
        obtaining a second part probability of its projection 2D sample in the second part 2D map corresponding to the respective part, and
        computing a joint part probability associated with the elementary voxel for the respective part, based on the obtained first and second part probabilities;
    generating one or more parts of the 3D skeleton using the one or more sets of part volume 3D data generated.

21. A system for displaying a 3D skeleton of one or more 3D real world objects observed by cameras, comprising the generating system of claim 20 connected to a display screen, wherein the microprocessor is further configured for carrying out the steps of:
    selecting a viewpoint in 3D space, and
    displaying, on the display screen, the generated 3D skeleton from the viewpoint.

* * * * *